(12) United States Patent
Zwayer et al.

(10) Patent No.: US 12,208,476 B2
(45) Date of Patent: Jan. 28, 2025

(54) SYSTEMS, METHODS, AND APPARATUS TO PREHEAT WELDING WIRE

(71) Applicant: ILLINOIS TOOL WORKS INC., Glenview, IL (US)

(72) Inventors: Jake Zwayer, Appleton, WI (US); Steven Barhorst, Sidney, OH (US); James Lee Uecker, Appleton, WI (US); Christopher Hsu, Appleton, WI (US); Dennis Sigl, Greenville, WI (US); Jon Michael Patterson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 814 days.

(21) Appl. No.: 17/132,712

(22) Filed: Dec. 23, 2020

(65) Prior Publication Data

US 2021/0245289 A1    Aug. 12, 2021

Related U.S. Application Data

(63) Continuation of application No. 15/498,249, filed on Apr. 26, 2017, now abandoned, which is a
(Continued)

(51) Int. Cl.
*B23K 9/10* (2006.01)
*B23K 9/24* (2006.01)

(52) U.S. Cl.
CPC .............. *B23K 9/1093* (2013.01); *B23K 9/24* (2013.01)

(58) Field of Classification Search
CPC .......... B23K 9/09; B23K 9/0956; B23K 9/10; B23K 9/1006; B23K 9/1093; B23K 9/24
See application file for complete search history.

(56) References Cited

U.S. PATENT DOCUMENTS 2,365,958 A   12/1944  Holslag
2,416,047 A    2/1947  Dolan
(Continued)

FOREIGN PATENT DOCUMENTS

AT    413801    6/2006
CA   2072711   12/1992
(Continued)

OTHER PUBLICATIONS

"ALT 304," Miller—The Power of Blue, Jun. 2001.
(Continued)

*Primary Examiner* — Vy T Nguyen
(74) *Attorney, Agent, or Firm* — McAndrews, Held & Malloy, Ltd.

(57) ABSTRACT

A contact tip assembly with a preheating tip comprises a welding-type power source configured to provide welding-type current to a welding-type circuit, the welding-type circuit comprising a welding-type electrode and a first contact tip of a welding torch; an electrode preheating circuit configured to provide preheating current through a first portion of the electrode via a second contact tip of the welding torch; and a preheat controller to: monitor a voltage drop across a second portion of the electrode; adjust at least one of the welding-type current or the preheating current based on the voltage drop, the second portion of the electrode comprising at least part of the first portion of the electrode; and control the preheating current based on a hydrogen reduction goal and based on stored parameters associated with a type of the electrode, a chemistry of the electrode, or a wire size.

21 Claims, 37 Drawing Sheets

Related U.S. Application Data continuation of application No. 15/343,992, filed on Nov. 4, 2016, now Pat. No. 10,675,699.

(60) Provisional application No. 62/329,378, filed on Apr. 29, 2016, provisional application No. 62/265,712, filed on Dec. 10, 2015.

(56) References Cited

U.S. PATENT DOCUMENTS

| | | |
|---|---|---|
| 2,976,462 A | 3/1961 | Miller |
| 3,030,495 A | 4/1962 | Anderson |
| 3,288,982 A | 11/1966 | Haruyoshi |
| 3,549,857 A | 12/1970 | Carter |
| 3,573,550 A | 4/1971 | Baker, Jr. |
| 3,725,629 A | 4/1973 | Vickers |
| 3,809,853 A | 5/1974 | Manz |
| 3,849,871 A | 11/1974 | Kaunitz |
| 3,912,980 A | 10/1975 | Crump |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,309,590 A * | 1/1982 | Stol ................ B23K 9/0213 219/136 |
| 4,329,561 A | 5/1982 | Schafer |
| 4,384,187 A | 5/1983 | Jackson |
| 4,426,565 A | 1/1984 | Rueter |
| 4,447,703 A | 5/1984 | Stol |
| 4,467,176 A | 8/1984 | Mizuno |
| 4,472,619 A * | 9/1984 | Ueda .................. B23K 9/04 219/76.16 |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,547,654 A | 10/1985 | Stol |
| 4,580,026 A | 4/1986 | Stol |
| 4,590,358 A | 5/1986 | Stol |
| 4,614,856 A | 9/1986 | Hori |
| 4,628,182 A | 12/1986 | Hori |
| 4,631,385 A | 12/1986 | Rothermel |
| 4,667,083 A * | 5/1987 | Stol .................. B23K 9/285 219/136 |
| 4,675,494 A | 6/1987 | Dilay |
| 4,728,761 A | 3/1988 | Mucha |
| 4,897,523 A | 1/1990 | Parks |
| 4,904,843 A * | 2/1990 | Hori .................. B23K 9/091 219/136 |
| 4,950,348 A | 8/1990 | Larsen |
| 4,954,691 A | 9/1990 | Parks |
| 4,973,821 A | 11/1990 | Martin |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,521,355 A | 5/1996 | Lorentzen |
| 5,526,561 A | 6/1996 | McGaffigan |
| 5,644,461 A | 7/1997 | Miller |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn et al. |
| 5,760,373 A | 6/1998 | Colling |
| 5,773,799 A | 6/1998 | Maxfield |
| 5,783,799 A | 7/1998 | Geissler |
| 5,832,765 A | 11/1998 | Ohashi |
| 5,844,193 A | 12/1998 | Nomura |
| 5,963,022 A | 10/1999 | Buda |
| 5,968,587 A | 10/1999 | Frankel |
| 5,994,659 A | 11/1999 | Offer |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,077,369 A | 6/2000 | Kusano |
| 6,078,023 A | 6/2000 | Jones |
| 6,090,067 A | 7/2000 | Carter |
| 6,107,602 A | 8/2000 | Geissler |
| 6,115,273 A | 9/2000 | Geissler |
| 6,160,241 A | 12/2000 | Stava |
| 6,169,263 B1 | 1/2001 | Derby |
| 6,204,476 B1 | 3/2001 | Reynolds |
| 6,248,976 B1 | 6/2001 | Blankenship |
| 6,259,059 B1 | 7/2001 | Hsu |
| 6,265,688 B1 | 7/2001 | Lyshkow |
| 6,274,845 B1 | 8/2001 | Stava |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,486,439 B1 | 11/2002 | Spear et al. |
| 6,515,259 B1 | 2/2003 | Hsu |
| 6,559,416 B1 | 5/2003 | Steenis |
| 6,583,386 B1 | 6/2003 | Ivkovich |
| 6,596,970 B2 | 7/2003 | Blankenship |
| 6,624,388 B1 | 9/2003 | Blankenship et al. |
| 6,642,482 B2 | 11/2003 | Rappl |
| 6,670,579 B2 | 12/2003 | Davidson et al. |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,995,338 B2 | 2/2006 | Hutchison |
| 7,002,103 B2 | 2/2006 | Holverson |
| 7,105,775 B2 | 9/2006 | Giese |
| 7,129,443 B2 | 10/2006 | Davidson |
| 7,145,101 B2 | 12/2006 | Tong |
| 7,244,905 B2 | 7/2007 | Das |
| 7,247,815 B2 | 7/2007 | Lajoie |
| 7,265,320 B2 | 9/2007 | Ou |
| 7,304,269 B2 | 12/2007 | Fulmer |
| 7,306,951 B1 | 12/2007 | Benson |
| 7,307,240 B2 | 12/2007 | Holverson |
| 7,351,933 B2 | 4/2008 | Huismann |
| 7,381,923 B2 | 6/2008 | Gordon et al. |
| 7,576,300 B2 | 8/2009 | Giese |
| 7,626,139 B2 | 12/2009 | Matsuguchi |
| 7,663,074 B2 | 2/2010 | Wells |
| 7,683,290 B2 | 3/2010 | Daniel |
| 7,762,830 B2 | 7/2010 | Roberts |
| 8,203,100 B2 | 6/2012 | Ueda |
| 8,288,686 B2 | 10/2012 | Kaufman |
| 8,304,692 B2 | 11/2012 | Ohkubo |
| 8,304,693 B2 | 11/2012 | Ma |
| 8,357,877 B2 | 1/2013 | Ma |
| 8,487,215 B2 | 7/2013 | Holverson |
| 8,604,388 B2 | 12/2013 | Dingeldein |
| 9,095,928 B2 | 8/2015 | Ash |

(56) References Cited

U.S. PATENT DOCUMENTS

| | | |
|---|---|---|
| 9,162,312 B2 | 10/2015 | Ma |
| 9,193,004 B2 | 11/2015 | Enyedy et al. |
| 9,193,005 B2 | 11/2015 | Ma |
| 9,227,262 B2 | 1/2016 | Wiryadinata |
| 9,233,432 B2 | 1/2016 | Zhang |
| 9,403,231 B2 | 8/2016 | Hutchison |
| 9,409,250 B2 | 8/2016 | Daniel |
| 9,463,523 B2 | 10/2016 | Roth |
| 9,539,662 B2 | 1/2017 | Hutchison |
| 9,669,486 B2 | 6/2017 | Dingeldein |
| 9,862,050 B2 | 1/2018 | Cole |
| 9,925,613 B2 | 3/2018 | Rozmarynowski |
| 9,950,383 B2 | 4/2018 | Davidson |
| 10,232,458 B2 | 3/2019 | Grossauer |
| 10,406,621 B2 | 9/2019 | Salsich |
| 10,675,699 B2 | 6/2020 | Hsu |
| 10,843,288 B2 | 11/2020 | Salsich |
| 10,994,362 B2 | 5/2021 | Raudsepp |
| 11,007,597 B2 | 5/2021 | Salsich |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0010756 A1 | 1/2003 | Enyedy |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0072762 A1 | 4/2005 | Delgado |
| 2005/0082268 A1 | 4/2005 | Lajoie |
| 2005/0184039 A1 | 8/2005 | Stava |
| 2005/0199593 A1* | 9/2005 | Ignatchenko .......... B23K 9/173 219/121.45 |
| 2005/0218132 A1 | 10/2005 | Wells |
| 2005/0269306 A1 | 12/2005 | Fulmer |
| 2006/0138115 A1 | 6/2006 | Norrish |
| 2006/0163219 A1 | 7/2006 | Griffin |
| 2006/0163227 A1 | 7/2006 | Hillen |
| 2006/0163229 A1 | 7/2006 | Hutchison |
| 2007/0039935 A1 | 2/2007 | Justice |
| 2007/0051711 A1 | 3/2007 | Kachline |
| 2007/0056945 A1 | 3/2007 | Hammen |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0053978 A1 | 3/2008 | Peters |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0039066 A1 | 2/2009 | Centner |
| 2009/0173726 A1 | 7/2009 | Davidson et al. |
| 2009/0215302 A1 | 8/2009 | Roberts |
| 2010/0012637 A1 | 1/2010 | Jaegar |
| 2010/0059493 A1 | 3/2010 | Mcaninch |
| 2010/0096373 A1 | 4/2010 | Hillen |
| 2010/0096436 A1 | 4/2010 | Nangle |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0168678 A1 | 7/2011 | Takeda |
| 2011/0204034 A1 | 8/2011 | Schartner |
| 2011/0204035 A1 | 8/2011 | Grossauer |
| 2011/0297658 A1 | 8/2011 | Peters |
| 2011/0248007 A1 | 10/2011 | Takeda |
| 2011/0266269 A1 | 11/2011 | Kachline |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0285932 A1 | 11/2012 | Yuan |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0213942 A1 | 8/2013 | Peters |
| 2013/0256276 A1 | 10/2013 | Fisher |
| 2013/0264323 A1 | 10/2013 | Daniel |
| 2013/0270245 A1 | 10/2013 | Holverson |
| 2013/0313241 A1 | 11/2013 | Zander |
| 2014/0008328 A1 | 1/2014 | Enyedy |
| 2014/0008331 A1 | 1/2014 | Ogborn |
| 2014/0008339 A1 | 1/2014 | Ogborn |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1 | 1/2014 | Peters |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0131339 A1 | 5/2014 | Fischer |
| 2014/0158669 A1 | 6/2014 | Davidson |
| 2014/0177109 A1 | 6/2014 | Curtis |
| 2014/0183176 A1 | 7/2014 | Hutchison |
| 2014/0199878 A1 | 7/2014 | Ihde |
| 2014/0217077 A1 | 8/2014 | Davidson |
| 2014/0251965 A1 | 9/2014 | Wiryadinata |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1 | 9/2014 | Peters |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0263251 A1 | 9/2014 | Enyedy |
| 2014/0319103 A1 | 10/2014 | Stabb et al. |
| 2014/0366721 A1 | 12/2014 | Leon |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1* | 7/2015 | Matthews ............... B23K 9/173 219/76.14 |
| 2015/0209906 A1 | 7/2015 | Denney et al. |
| 2015/0209907 A1 | 7/2015 | Narayanan |
| 2015/0209908 A1 | 7/2015 | Peters |

(56) References Cited

U.S. PATENT DOCUMENTS

| | | | |
|---|---|---|---|
| 2015/0209910 A1 | 7/2015 | Denney | |
| 2015/0209913 A1 | 7/2015 | Denney | |
| 2015/0213921 A1 | 7/2015 | Koide | |
| 2015/0251275 A1 | 9/2015 | Denney et al. | |
| 2015/0273612 A1 | 10/2015 | Peters | |
| 2015/0283638 A1 | 10/2015 | Henry | |
| 2015/0283639 A1 | 10/2015 | Henry | |
| 2016/0074954 A1 | 3/2016 | Marschke | |
| 2016/0074973 A1 | 3/2016 | Kachline | |
| 2016/0144444 A1 | 5/2016 | Davidson | |
| 2016/0167151 A1 | 6/2016 | Mehn | |
| 2016/0175975 A1 | 6/2016 | Lattner | |
| 2016/0199939 A1 | 7/2016 | Hartman | |
| 2016/0221105 A1 | 8/2016 | Henry et al. | |
| 2016/0288235 A1 | 10/2016 | Davidson | |
| 2016/0318112 A1 | 11/2016 | Hutchison | |
| 2017/0064804 A1 | 3/2017 | Namburu | |
| 2017/0080512 A1 | 3/2017 | Centner | |
| 2017/0165778 A1 | 6/2017 | Hsu | |
| 2017/0216953 A1 | 8/2017 | Salsich | |
| 2017/0225255 A1 | 8/2017 | Zwayer | |
| 2018/0085842 A1 | 3/2018 | Lattner | |
| 2018/0236585 A1 | 8/2018 | Davidson | |
| 2018/0333798 A1 | 11/2018 | Uecker | |
| 2018/0354052 A1 | 12/2018 | Schartner | |
| 2018/0354053 A1 | 12/2018 | Zwayer | |
| 2018/0354057 A1 | 12/2018 | Sigl | |
| 2018/0354075 A1 | 12/2018 | Liu | |
| 2019/0061039 A1 | 2/2019 | Doyle | |

FOREIGN PATENT DOCUMENTS

| | | | |
|---|---|---|---|
| CA | 2242273 | | 2/2000 |
| CA | 2862671 | | 10/2013 |
| CA | 2883947 | | 3/2014 |
| CH | 472922 | | 5/1969 |
| CN | 1031342 | | 3/1989 |
| CN | 2125475 | | 12/1992 |
| CN | 2181354 | | 11/1994 |
| CN | 1102480 | | 5/1995 |
| CN | 2215372 | | 12/1995 |
| CN | 1191790 | | 9/1998 |
| CN | 1220626 | | 6/1999 |
| CN | 1298778 | | 6/2001 |
| CN | 1496774 | | 5/2004 |
| CN | 1558706 | | 12/2004 |
| CN | 1600486 | | 3/2005 |
| CN | 1640603 | | 7/2005 |
| CN | 1665633 | | 9/2005 |
| CN | 1712168 | | 12/2005 |
| CN | 1714978 | | 1/2006 |
| CN | 1836818 | | 9/2006 |
| CN | 1871093 | | 11/2006 |
| CN | 101041202 | | 9/2007 |
| CN | 101062530 | | 10/2007 |
| CN | 201098775 | | 8/2008 |
| CN | 101360580 | | 2/2009 |
| CN | 101376191 | | 3/2009 |
| CN | 101434017 | | 5/2009 |
| CN | 201249331 | | 6/2009 |
| CN | 101474707 | | 7/2009 |
| CN | 101715378 | | 5/2010 |
| CN | 101804495 | | 8/2010 |
| CN | 101821049 | | 9/2010 |
| CN | 101862886 | | 10/2010 |
| CN | 102059476 | | 5/2011 |
| CN | 102126077 | | 7/2011 |
| CN | 102458749 | | 5/2012 |
| CN | 102470473 | | 5/2012 |
| CN | 102554418 | | 7/2012 |
| CN | 102596475 | | 7/2012 |
| CN | 102649202 | | 8/2012 |
| CN | 102770228 | | 11/2012 |
| CN | 102825370 | | 12/2012 |
| CN | 102861975 | | 1/2013 |
| CN | 102873475 | | 1/2013 |
| CN | 202639618 | | 1/2013 |
| CN | 202824943 | | 3/2013 |
| CN | 103347639 | | 10/2013 |
| CN | 103600161 | | 2/2014 |
| CN | 103624378 | | 3/2014 |
| CN | 104043895 | | 9/2014 |
| CN | 104093516 | | 10/2014 |
| CN | 104115085 | | 10/2014 |
| CN | 104263897 | | 1/2015 |
| CN | 104493368 | | 4/2015 |
| CN | 104508161 | | 4/2015 |
| CN | 104511680 | | 4/2015 |
| CN | 104968465 | | 10/2015 |
| CN | 105246634 | | 1/2016 |
| CN | 105377493 | | 3/2016 |
| CN | 105414726 | | 3/2016 |
| CN | 105710503 | | 6/2016 |
| CN | 105880814 | | 8/2016 |
| CN | 205437448 | | 8/2016 |
| CN | 206065630 | | 4/2017 |
| CN | 206216093 | | 6/2017 |
| CN | 108472759 | | 8/2018 |
| DE | 2228701 | | 12/1972 |
| DE | 2501928 | | 7/1976 |
| DE | 19808383 | | 9/1999 |
| DE | 212004000048 | | 6/2006 |
| DE | 102016010341 | | 3/2017 |
| EP | 0150543 | | 8/1985 |
| EP | 0194045 | | 9/1986 |
| EP | 0204559 | | 12/1986 |
| EP | 0387223 | | 9/1990 |
| EP | 0936019 | A2 | 8/1999 |
| EP | 0936019 | A3 | 3/2001 |
| EP | 1232825 | | 8/2002 |
| EP | 2218537 | | 8/2010 |
| EP | 2286949 | | 2/2011 |
| EP | 2322315 | | 5/2011 |
| EP | 2522453 | | 11/2012 |
| EP | 2892680 | | 7/2015 |
| EP | 2781291 | | 10/2015 |
| FR | 1443701 | | 6/1966 |
| JP | S5719166 | | 2/1982 |
| JP | S57109573 | | 7/1982 |
| JP | S583784 | | 1/1983 |
| JP | S5874278 | | 5/1983 |
| JP | S58119466 | | 7/1983 |
| JP | S60108175 | | 6/1985 |
| JP | S60108176 | | 6/1985 |
| JP | S60170577 | | 9/1985 |
| JP | 61186172 | | 8/1986 |
| JP | S61186172 | | 8/1986 |
| JP | S629773 | | 1/1987 |
| JP | S6297773 | | 5/1987 |
| JP | 01071575 | | 3/1989 |
| JP | S6471575 | | 3/1989 |
| JP | S6471575 | A | 3/1989 |
| JP | H03285768 | | 12/1991 |
| JP | H06277840 | | 10/1994 |
| JP | H07204848 | | 8/1995 |
| JP | H1097327 | | 4/1998 |
| JP | H11156542 | | 6/1999 |
| JP | 2001276971 | | 10/2001 |
| JP | 2003205385 | | 7/2003 |
| JP | 2003311409 | | 11/2003 |
| JP | 2005034853 | | 2/2005 |
| JP | 2006205189 | | 8/2006 |
| JP | 2007504003 | | 3/2007 |
| JP | 2009072814 | | 4/2009 |
| JP | 4950819 | | 6/2012 |
| JP | 2013538691 | A * | 10/2013 |
| JP | 2014176890 | | 9/2014 |
| KR | 1020060133016 | | 12/2006 |
| KR | 20080009816 | | 1/2008 |
| KR | 20100120562 | | 11/2010 |
| KR | 1020120027764 | | 3/2012 |
| KR | 101497460 | | 3/2015 |
| MX | 2011000579 | | 3/2011 |
| SU | 872102 | | 10/1981 |

(56) References Cited

FOREIGN PATENT DOCUMENTS

| WO | 9640465 | 12/1996 | |
|---|---|---|---|
| WO | 9965635 | 12/1999 | |
| WO | 0075634 | 12/2000 | |
| WO | 0132347 | 5/2001 | |
| WO | 0153030 | 7/2001 | |
| WO | 2005030422 | 4/2005 | |
| WO | WO-2005030422 A1 * | 4/2005 | ........... B23K 9/1093 |
| WO | 2010144688 | 12/2010 | |
| WO | 2014140783 | 9/2014 | |
| WO | 2014155180 | 10/2014 | |
| WO | 2015076891 | 5/2015 | |
| WO | 2015124977 | 8/2015 | |
| WO | 2015125008 | 8/2015 | |

OTHER PUBLICATIONS

"Maxstar 200 SD, DX, and LX," Miller Electric Mfg. Co., Oct. 2003.
Bondy et al., "Graph Theory with Applications," Department of Combinatorics and Optimization, University of Waterloo, 1976, p. 7-8.
Canadian Office Action Appln No. 3,005,408 dated Mar. 19, 2019.
Gupta, "A low temperature hydrogen sensor based on palladium nanoparticles," Published in 2014.
Int'l Search Report and Written Opinion for PCT/US2016/065265 dated Mar. 14, 2017 (16 pages).
Int'l Search Report and Written Opinion for PCT/US2018/029770 mailed Sep. 12, 2018 (13 pgs.).
Int'l Search Report and Written Opinion for PCT/US2018/035087 mailed Sep. 19, 2018 (15 pgs.).
Int'l Search Report and Written Opinion for PCT/US2018/036852 mailed Oct. 2, 2018 (17 pgs.).
Int'l Search Report and Written Opinion for PCT/US2018/036898 mailed Oct. 1, 2018 (14 pgs.).
Int'l Search Report and Written Opinion for PCT/US2018/036900 mailed Oct. 5, 2018 (15 pgs.).
Int'l Search Report and Written Opinion for PCT/US2018/036906 mailed Oct. 1, 2018 (15 pgs.).
Int'l Search Report and Written Opinion for PCT/US2018/036914 mailed Oct. 2, 2018 (14 pgs.).
Int'l Search Report and Written Opinion for PCT/US2018/036915 mailed Oct. 1, 2018 (15 pgs).
Int'l Search Report and Written Opinion for PCT/US2018/036919 mailed Oct. 2, 2018 (13 pgs.).
Int'l Search Report and Written Opinion for PCT/US2018/049888 mailed Feb. 1, 2019 (14 pgs.).
Int'l Search Report and Written Opinion for PCT/US2018/052384 mailed Feb. 12, 2019 (12 pgs.).
International Search Report from PCT application No. PCT/US2014/017864, dated Aug. 22, 2014, 9 pgs.
International Search Report from PCT application No. PCT/US2014/041201, dated Nov. 4, 2014, 11 pg.
International Search Report from PCT application No. PCT/US2014/045872, dated Nov. 4, 2014, 10 pgs.
International Search Report from PCT Application No. PCT/US2014/055529, dated Mar. 6, 2015, 9 pgs.
International Search Report from PCT application No. PCT/US2015/045715, dated Jan. 7, 2016, 12 pgs.
International Search Report from PCT application No. PCT/US2015/055040, dated Feb. 3, 2016, 11 pgs.
International Search Report from PCT application No. PCT/US2015/056121, dated Apr. 4, 2016, 11 pgs.
International Search Report from PCT application No. PCT/US2016/017385, dated Jul. 19, 2016, 13 pgs.
International Search Report from PCT application No. PCT/US2013/073490 dated May 13, 2014, 10 pgs.
International Search Report from PCT application No. PCT/US2013/073863 dated May 2, 2014, 15 pgs.
International Search Report from PCT application No. PCT/US2013/077710 dated May 9, 2014, 12 pgs.
International Search Report from PCT application No. PCT/US2014/014241 dated May 9, 2014, 8 pgs.
Lincoln Electric, "Storing and Redrying Electrodes," Published in 2011.
N.A.: "Drahtgluhe", Aug. 23, 2016 (Aug. 23, 2016), XP055510057, Wikipedia, Retrieved from the Internet: URL:https://de.wikipedia.Org/w/index.php?title=Drahtgl%C3%BChe&oldid=157333005, [retrieved on Sep. 26, 2018], with machine translation, 2 pages.
Non-Final Office Action U.S. Appl. No. 15/498,249 dated Sep. 23, 2019 (43 pgs).
Office Action from U.S. Appl. No. 15/498,249 dated Apr. 20, 2018.
PCT International Search Report & Written Opinion of PCT/US2012/063783 dated Mar. 1, 2013, 12 pages.
Pitrun, "The effect of welding parameters on levels of diffusible hydrogen in weld metal deposited using gas shield rutile flux cored wires," Published in 2004.
Int'l Search Report and Written Opinion Appln No. PCT/US2019/050972, mailed Nov. 14, 2019, (13 pgs).
Int'l Search Report and Written Opinion Appln No. PCT/U2019/049109 mailed Dec. 2, 2019 (11 pgs).
PCT, IPRP, issued in connection with PCT/US2018/036898, dated Dec. 19, 2019, 7 pages.
PCT, IPRP, issued in connection with PCT/US2018/036900, dated Dec. 19, 2019, 7 pages.
Int'l Search Report and Written Opinion Appln No. PCT/U2019/067491 mailed Jun. 25, 2020.
Non-Final Office Action U.S. Appl. No. 15/343,992 dated Mar. 7, 2019 (18 pgs.).
European Office Action Appln No. 20164462.2 dated Sep. 7, 2020.
European Office Action Appln No. 18735144.0 dated Dec. 18, 2020.
European Office Action Appln No. 18735144.0 dated Dec. 21, 2020.
European Office Action Appln No. 18735143.2 dated Mar. 24, 2021.
Canadian Office Action Appln. No. 3,066,677 dated Mar. 16, 2021.
Canadian Office Action Appln. No. 3,066,619 dated Mar. 31, 2021.
Canadian Office Action Appln No. 3,119,550 dated Jul. 22, 2022.
Canadian Office Action Appln. No. 3,066,687 dated Mar. 16, 2021.
European Exam Report Appln No. 18735142.4 dated Jun. 22, 2023.
European Exam Report Appln No. 19839586.5 dated Jul. 18, 2023.
European Office Action Appln No. 18735131.7 dated Jul. 13, 2021.
European Office Action Appln No. 18735144.0 dated Jul. 13, 2021.
European Office Action Appln No. 18735144.0 dated Mar. 9, 2022.
European Office Action Appln No. 19769649.5 dated Apr. 26, 2023.
European Office Action Appln No. 19839586.5 dated Jul. 27, 2021.
European Office Action Appln No. 22199347.0 dated Feb. 20, 2023.
European Office Communication with extended European Search Report Appln No. 22164117.8 dated Jul. 7, 2022.
Final Office Action U.S. Appl. No. 16/005,456 dated Jan. 5, 2022 (22 pgs).
Mohamed Cad-el-Hak, "MEMB Design and Fabrication" translated by Haixia Zhang, et. al., Feb. 28, 2010, pp. 458-459.

* cited by examiner

| | Solid Wire | | |
|---|---|---|---|
| DC EP | Standard SAW BOP Welds | RP - SAW BOP Welds - Single Power Source | RP - SAW BOP Welds - Dual Power Sources |
| | TITLE SAW 1 TAKEN BY JZ PROJECT HERCULES DESCRIPTION DC EP | TITLE SAW 2 TAKEN BY JZ PROJECT HERCULES DESCRIPTION DC EP (RP) | TITLE SAW 7 TAKEN BY JZ PROJECT HERCULES DESCRIPTION DC EP (RP) |

| Trial | Mode | WFS | Wire Diam | TS | Amperage | Voltage | Set V | Preheat Amps | Amp After | %Reduc. |
|---|---|---|---|---|---|---|---|---|---|---|
| T1 | DC EP | 100 | 0.125 | 18 | 618.40 | 31.48 | 32 | NA | NA | NA |
| T2 | DC EP | 100 | 0.125 | 18 | 618.40 | 31.48 | 32 | 287 | 509.80 | 17.5614489 |
| T7 | DC EP | 100 | 0.125 | 18 | 618.40 | 31.48 | 32 | 360 | 426.45 | 31.03978008 |

Results from the EP Preheat at 0 amps, 287 amps, and 360

FIG. 10A

Results from the CV+C EP Preheat at 0 amps, and 360 amps.

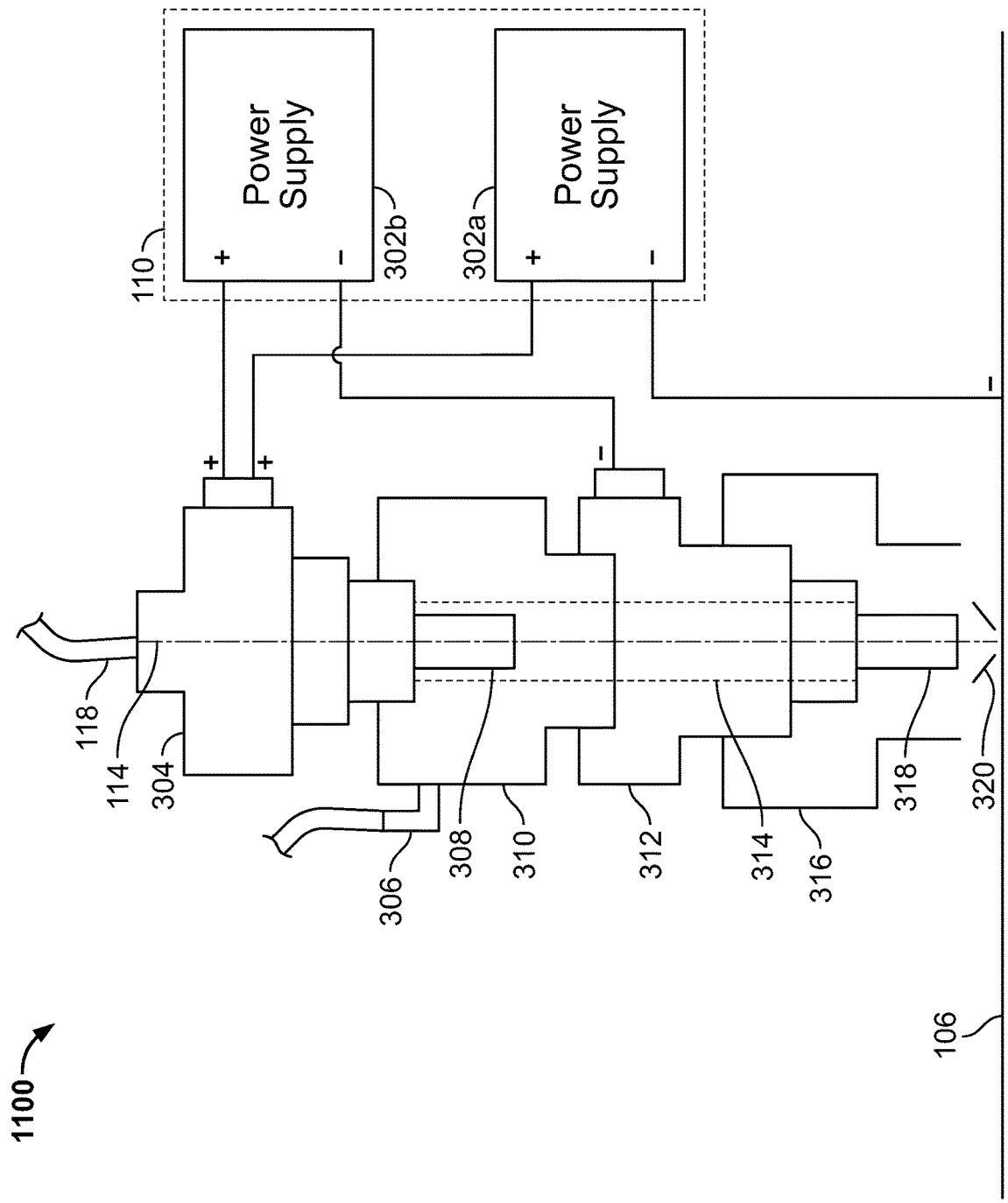

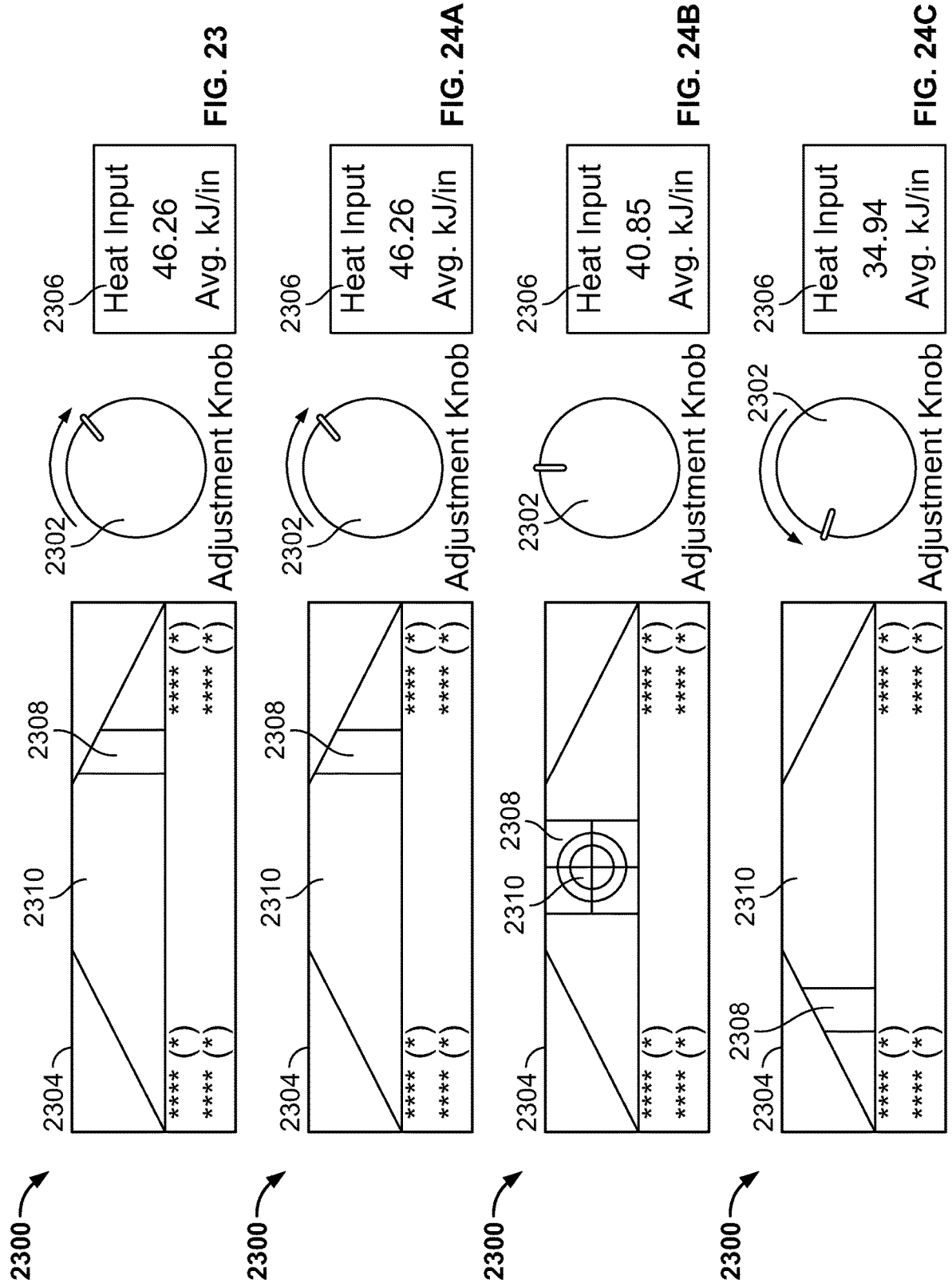

SYSTEMS, METHODS, AND APPARATUS TO PREHEAT WELDING WIRE

RELATED APPLICATIONS

This patent arises from a continuation of U.S. patent application Ser. No. 15/498,249, filed Apr. 26, 2017, entitled "Systems, Methods, and Apparatus to Preheat Welding Wire," which is a continuation of U.S. patent application Ser. No. 15/343,992, filed Nov. 4, 2016, entitled "Systems, Methods, and Apparatus to Preheat Welding Wire" (now U.S. Pat. No. 10,675,699), which claims priority to U.S. Provisional Patent Application Ser. No. 62/265,712 filed Dec. 10, 2015, entitled "Welding Torch for Resistively Preheating Welding Wire," and to U.S. Provisional Patent Application Ser. No. 62/329,378, filed Apr. 29, 2016, entitled "Welding Torch for Resistively Preheating Welding Wire." The entireties of U.S. patent application Ser. No. 15/498,249, U.S. patent application Ser. No. 15/343,992, U.S. Provisional Patent Application Ser. No. 62/265,712, and U.S. Provisional Patent Application Ser. No. 62/329,378 are incorporated herein by reference.

BACKGROUND

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

While very effective in many applications, these welding techniques may experience different initial welding performance based upon whether the weld is started with the electrode "cold" or "hot." In general, a cold electrode start may be considered a start in which the electrode tip and adjacent metals are at or relatively near the ambient temperature. Hot electrode starts, by contrast, are typically those in which the electrode tip and adjacent metals are much more elevated, but below the melting point of the electrode wire. In some applications, it is believed that initiation of welding arcs and welds is facilitated when the electrode is hot. However, the current state of the art does not provide regimes designed to ensure that the electrode is heated prior to initiation of a welding operation.

Certain advancements have been made to the process of electrode preheating. For example, U.S. Patent Publication No. 2014/0021183 A1 to Peters describes a welding torch having a contact tip that has electrically isolated upper and lower portions, each portion providing part of the aggregated welding current waveform. Similarly, U.S. Pat. Nos. 4,447,703, 4,547,654, and 4,667,083, as well as PCT Publication No. WO/2005/030422, describe various preheating techniques using a dual contact tip. Despite the foregoing, a need remains for improved welding strategies that allow for welding initiation with a heated electrode wire so as to improve weld performance.

BRIEF SUMMARY

The invention relates to a wire preheating system, method, and apparatus for use with a welding torch, more particularly, the invention relates to a welding torch that enables continuously fed electrode wire to be preheated for use in various forms of electric welding.

According to a first aspect, a welding system comprises: a contact tip assembly having a first contact tip portion and a second contact tip portion, wherein said first contact tip portion and said second contact tip portion are electrically isolated from each other (except through the electrode wire extending between the first and second contact tip portions) and each of said first contact tip portion and said second contact tip portion makes electrical contact with a same electrode wire during a welding operation; a first power supply operably coupled to said first contact tip portion that provides a welding current to said first contact tip portion during said welding operation; and a second power supply operably coupled to said second contact tip portion that provides a preheat current during said welding operation, wherein said preheat current enters said electrode wire at said second contact tip portion and exits at said first contact tip portion, and wherein said welding current enters said electrode wire at said first contact tip portion and exits via a welding arc at a weldment during said welding operation.

According to a second aspect, a contact tip assembly comprises: a first contact tip portion, wherein said first contact tip portion conducts a welding current provided by a first power supply during a welding operation; and a second contact tip portion, wherein said second contact tip portion conducts a preheat current provided by a second power supply during said welding operation, wherein said first contact tip portion and said second contact tip portion are electrically isolated from each other (except through the electrode wire extending between the first and second contact tip portions) and each of said first contact tip portion and said second contact tip portion makes electrical contact with a same electrode wire during said welding operation, wherein said preheat current enters said electrode wire at said second contact tip portion and exits at said first contact tip portion, and wherein said welding current enters said electrode wire at said first contact tip portion and exits via a welding arc at a weldment during said welding operation.

According to a third aspect, a method of welding comprises: conducting a welding current via a first contact tip portion provided by a first power supply during a welding operation; conducting a preheat current via a second contact tip portion provided by a second power supply during said welding operation; electrically isolating said first contact tip portion from said second contact tip portion; and establishing electrical contact of said first contact tip portion and said second contact tip portion with a same electrode wire during said welding operation, wherein said preheat current enters said electrode wire at said second contact tip portion and exits at said first contact tip portion, and wherein said welding current enters said electrode wire at said first contact tip portion and exits via a welding arc at a weldment during said welding operation. In certain aspects, the method may further comprise: determining a preheat temperature of a portion of the electrode wire positioned between said first contact tip portion and said second contact tip portion, defining a determined preheat temperature; comparing the determined preheat temperature to a target predetermined preheat temperature; and prohibiting said first power supply from providing said welding current to said first contact tip portion when the determined preheat temperature exceeds a predetermined deviation from the target predetermined preheat temperature. In certain aspects, the method may further comprise: calculating a voltage drop across said first contact tip portion and said second contact tip portion.

In certain aspects, the welding torch is a gooseneck welding torch.

In certain aspects, the welding torch is water cooled.

In certain aspects, the preheat current and welding current are supplied by a common power source.

In certain aspects, the welding system calculates a voltage drop across said first contact tip portion and said second contact tip portion.

In certain aspects a dielectric guide is positioned between said first contact tip portion and said second contact tip portion.

In certain aspects, a temperature determining device determines a preheat temperature of a portion of the electrode wire positioned between said first contact tip portion and said second contact tip portion, defining a determined preheat temperature.

In certain aspects, the temperature determining device is a thermometer.

In certain aspects, the temperature determining device is a non-contact infrared temperature sensor.

In certain aspects, the welding system compares the determined preheat temperature to a target predetermined preheat temperature and prohibits said first power supply from providing the welding current to the first contact tip portion when the determined preheat temperature exceeds a predetermined deviation from the target predetermined preheat temperature.

In certain aspects, the welding system compares a preheat voltage, indicative of a wire temperature, to a target predetermined preheat voltage, indicative of a target temperature, and prevents the first power supply from providing the welding current to the first contact tip portion exceeding a predetermined current.

In certain aspects, the welding system has an upper current limit based on a designated voltage, and may have multiple upper current limits corresponding to different designated voltages. When the upper current limit is reached for a particular selected voltage, the welding system shuts off the weld or limits the current to the upper current limit.

In certain aspects, a wire feeder is configured to drive the electrode wire forward to feed the electrode wire and in reverse to retract the electrode wire.

In certain aspects, the wire feeder drives the electrode wire in reverse to retract the electrode wire such that the electrode wire's distal end is substantially at said first contact tip portion as part of an arc starting algorithm.

In certain aspects, the wire feeder drives the electrode wire forward to feed the electrode wire for a predetermined period of time after a welding arc is extinguished as part of an arc ending routine.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIGS. 10a and 10b illustrate deposition testing data.

FIG. 11 illustrates a functional diagram of another example contact tip assembly in which the power supply provides the welding power to the electrode wire.

FIG. 23 illustrates an example user interface device that may be used to implement the user interface of the welding equipment.

FIGS. 24A, 24B, and 24C illustrate example average heat inputs for different preheat levels.

The figures are not to scale. Where appropriate, the same or similar reference numerals are used in the figures to refer to similar or identical elements.

DETAILED DESCRIPTION

Figure 1:
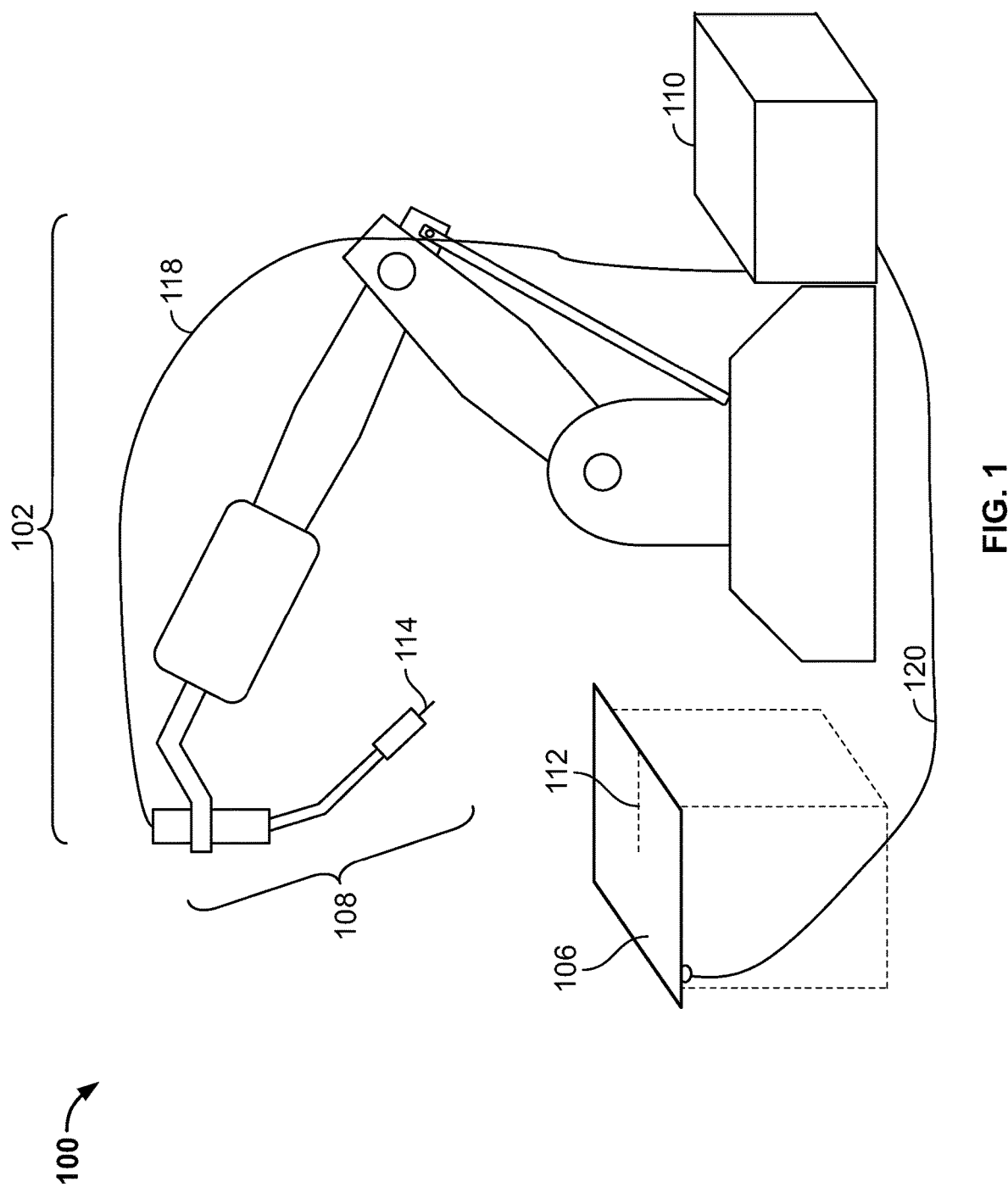
FIG. 1 illustrates an example robotic welding system.

The present disclosure is directed to a system, method, and apparatus for preheating wire electrodes. Preferred embodiments of the present invention are described herein with reference to the figures of the accompanying drawings. Like reference numerals are used throughout the drawings to depict like or similar elements. In the following description, well-known functions or constructions are not described in detail, since such descriptions would obscure the invention in unnecessary detail.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a wire-fed welding-type system refers to a system capable of performing welding (e.g., gas metal arc welding (GMAW), gas tungsten arc welding (GTAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

Disclosed wire fed welding-type systems include a welding-type power source configured to provide welding-type current to a welding-type circuit, the welding-type circuit comprising a welding-type electrode and a first contact tip of a welding torch; an electrode preheating circuit configured to provide preheating current through a portion of the welding-type electrode via a second contact tip of the welding torch; and a voltage sense circuit to monitor a voltage at the welding-type electrode and, based on the voltage, to determine a voltage drop across the portion of the welding-type electrode, the electrode preheating circuit to adjust the first current based on the voltage drop.

In some examples, the electrode preheating circuit is configured to provide the preheating current via the first contact tip, and the portion of the welding-type electrode is between the first and second contact tips of the welding torch. In some examples, the first contact tip is positioned closer to an arc end of the welding-type electrode than the second contact tip. In some examples, the second contact tip is positioned closer to an arc end of the welding-type electrode than the first contact tip. In some examples, the electrode preheating circuit is configured to provide the preheating current via a third contact tip of the welding torch. In some examples, the third contact tip contacts the welding-type electrode such that the welding-type current and the preheating current are superimposed on the portion of the welding-type electrode. In some examples, the third contact tip contacts the welding-type electrode such that the welding-type current does not flow through the portion of the welding-type electrode that conducts the preheating current.

In some example systems, the electrode preheating circuit is configured to selectively subtract a portion of the welding-type current to reduce preheating of the portion of the welding-type electrode and selectively reduce the portion of the welding-type current being subtracted to increase the preheating of the portion of the welding-type electrode. Some examples further include a stickout sense circuit to determine an electrode stickout distance of the welding-type electrode, the electrode preheating circuit to control the preheating current through the portion of the welding-type electrode based on the electrode stickout distance. In some examples, the stickout sense circuit comprises a welding-type current sensor to measure the welding-type current, the stickout sense circuit to determine the electrode stickout distance based on the measurement of the welding-type current.

Some example systems further include an enthalpy measurement circuit to determine an enthalpy applied to an electrode based on at least one of a measured arc voltage, a measured welding-type current, or a measured preheating current, or the voltage drop across the portion of the electrode, the electrode preheating circuit to control the preheating current based on the determined enthalpy and a target enthalpy to be applied to the workpiece. Some examples further include a short circuit detector to detect a short circuit condition at the welding-type electrode during a constant voltage mode, a pulse mode, and/or any other waveform mode of the welding-type power source. Some examples further include a power source controller to: when the short circuit detector detects the short circuit condition, control the welding-type power source to clear the short circuit condition using a constant current mode; and when the short circuit detector detects that the short circuit condition is cleared, control the welding-type power source to use the constant voltage mode, the pulse mode, and/or any other waveform mode. Some examples further include a motor controller to: when the short circuit detector detects the short circuit condition, control a wire feed motor to pause and/or retract the welding-type electrode; and when the short circuit detector detects that the short circuit condition is cleared, control the wire feed motor to advance the welding-type electrode.

Disclosed example methods include performing a welding operation in a spray transfer welding mode and reducing a current of the welding operation while accelerating a wire feed rate of the welding operation to cause wire to be fed into a weld puddle.

Disclosed example welding-type systems include a filler deposition device to heat a filler material and to deposit heated filler material on a workpiece in one or more deposition passes without an electrical arc and a welding-type device to perform one or more passes on the workpiece with the electrical arc. In some examples, the preheating circuit is switched off to increase (e.g., maximize) heat input for root capture in a root pass of a multi-pass welding operation, and switched on to increase (e.g., maximize) deposition in fill and/or cap passes of the multi-pass welding operation.

Disclosed example welding-type systems include a welding-type power source to provide welding-type power to an electrode wire at a welding torch; an electrode wire preheater to preheat the electrode wire; a wire feed motor to feed the electrode wire to the electrode wire preheater; a sensor to detect a short circuit event at the welding torch, where sensor includes at least one of a motor torque sensor or an arc voltage sensor; and a preheat controller to control the electrode wire preheater to slow and/or stop preheating the electrode wire in response to detecting the short circuit event, a stubbing event, a wire hang-up event, and/or a feeding anomaly event at the welding torch. Some example systems further include a motor controller to cause the motor to retract the electrode wire by at least a predetermined distance in response a short circuit.

Disclosed example welding-type systems include a welding-type power source to provide welding-type power to an electrode wire at a welding torch; an electrode wire preheater to preheat the electrode wire; a preheat monitor to monitor a preheating signal generated by the electrode wire preheater and, based on the preheating signal, to identify an anomaly in the preheating signal and/or arc signals based on at least one of a threshold signal level, a time derivative of the preheating signal, an integral of the preheating signal, a statistical analysis of the preheating signal, or a stability over a time period of the preheating signal, the preheating signal comprising at least one of a preheat voltage, a preheat current, a preheat power, a preheat enthalpy, or a preheat circuit impedance, the statistical analysis comprising at least one of a mean of the preheating signal, a standard deviation of the preheating signal, or a root mean squared value of the preheating signal.

Disclosed example welding-type systems include a welding-type power source to provide welding-type power to an electrode wire at a welding torch and an electrode wire preheater to preheat the electrode wire by radiating heat to the electrode wire. In some examples, the electrode wire preheater includes a wire liner for the electrode wire, the electrode wire to travel through the wire liner toward the welding torch and a preheating power source to heat at least a portion of the wire liner, the at least the portion of the wire liner to preheat the electrode wire at the electrode wire travels through the at least the portion of the wire liner.

Disclosed example welding-type systems include a welding-type power source to provide welding-type power to an electrode wire at a welding torch to support an electrical arc and an electrode wire preheater to preheat the electrode wire by at least one of redirecting or focusing light generated by the electrical arc toward the electrode wire.

Disclosed example welding-type systems include a welding-type power source to provide welding-type power to an electrode wire at a welding torch and an electrode wire preheater to preheat the electrode wire. The example electrode wire preheater includes one or more infrared heating lamps positioned within the welding torch.

Disclosed example welding-type systems include a welding-type power source to provide welding-type power to an electrode wire at a welding torch; an electrode wire preheater to preheat the electrode wire; and a clamping diode to clamp a voltage between the electrode wire preheater and the electrode wire to less than an arc initiation voltage.

Disclosed example welding-type systems include a welding-type power source to provide welding-type power to an electrode wire at a welding torch, the welding-type power source to provide less than a threshold current to the electrode wire during a cladding operation; an electrode wire preheater to preheat the electrode wire near a melting point of the electrode wire such that the current provided by the welding-type power source is sufficient to melt the electrode wire; and a motor controller to control a wire feed motor to oscillate the electrode wire, the oscillation of the electrode wire to cause melted portions of the electrode wire to be ejected from the electrode wire toward a workpiece. The melted portions of the electrode wire are melted by the current provided by the welding-type power source.

Disclosed example welding-type systems include a welding-type power source to provide at least one of welding-type power and preheating power to an electrode wire at a welding torch; a first circuit to direct the welding-type power to a first contact tip in the welding torch; a second circuit to direct the welding-type power and the preheating power to a second contact tip in the welding torch, where the first contact tip is closer than the second contact tip to a tip of the electrode wire; and a switching circuit. The switching circuit controls the first circuit to direct the welding-type power to the first contact tip prior to arc initiation while controlling the second circuit not to direct the welding-type power and the preheating power to the second contact tip and controls the second circuit to direct the welding-type power and the preheating power to the second contact tip after arc initiation while controlling the first circuit not to direct the welding-type power to the first contact tip.

Disclosed example welding-type systems include a welding-type power source to provide welding-type power to an electrode wire at a submerged arc welding torch; an electrode wire preheating device to preheat the electrode wire; and an electrode wire motor to move a tip of the electrode wire within a deposition envelope of the submerged arc welding torch.

Disclosed example welding-type systems include an electrode wire preheating device to preheat an electrode wire at a welding torch; a welding-type power source to provide welding-type power to the electrode wire at the welding torch; and a preheating controller to, in response to detecting a trigger pull at the welding torch: cause the electrode wire preheating device to preheat the electrode wire at the welding torch; detect that the electrode wire has at least a threshold voltage; and enable the welding-type power source to provide the welding-type power to the electrode wire to enable a start of a weld operation.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Referring to FIG. 1, an example welding system 100 is shown in which a robot 102 is used to weld a workpiece 106 using a welding tool 108, such as the illustrated bent-neck (i.e., gooseneck design) welding torch (or, when under manual control, a handheld torch), to which power is delivered by welding equipment 110 via conduit 118 and returned by way of a ground conduit 120. The welding equipment 110 may comprise, inter alia, one or more power sources (each generally referred to herein as a "power supply"), a source of a shield gas, a wire feeder, and other devices. Other devices may include, for example, water coolers, fume extraction devices, one or more controllers, sensors, user interfaces, communication devices (wired and/or wireless), etc.

The welding system 100 of FIG. 1 may form a weld (e.g., at weld joint 112) between two components in a weldment by any known electric welding techniques. Known electric welding techniques include, inter alia, shielded metal arc welding (SMAW), MIG, flux-cored arc welding (FCAW), TIG, laser welding, sub-arc welding (SAW), stud welding, friction stir welding, and resistance welding. MIG, TIG, hot wire cladding, hot wire TIG, hot wire brazing, multiple arc applications, and SAW welding techniques, inter alia, may involve automated or semi-automated external metal filler (e.g., via a wire feeder). In multiple arc applications (e.g., open arc or sub-arc), the preheater may pre-heat the wire into a pool with an arc between the wire and the pool. Optionally, in any embodiment, the welding equipment 110 may be arc welding equipment having one or more power supplies, and associated circuitry, that provides a direct current (DC), alternating current (AC), or a combination thereof to an electrode wire 114 of a welding tool (e.g., welding tool 108). The welding tool 108 may be, for example, a TIG torch, a MIG torch, or a flux cored torch (commonly called a MIG "gun"). The electrode wire 114 may be tubular-type electrode, a solid type wire, a flux-core wire, a seamless metal core wire, and/or any other type of electrode wire.

As will be discussed below, the welding tool 108 may employ a contact tip assembly 206 that heats the electrode wire 114 prior to forming a welding arc 320 using the electrode wire 114. Suitable electrode wire 114 types includes, for example, tubular wire, metal cored wire, aluminum wire, solid gas metal arc welding (GMAW) wire, composite GMAW wire, gas-shielded FCAW wire, SAW wire, self-shielded wire, etc. In one aspect, the electrode wire 114 may employ a combination of tubular wire and reverse polarity current, which increases the metal transfer stability by changing it from globular transfer to a streaming spray. By preheating prior to wire exiting the first tip and fed in the arc (where the material transfer takes place), the tubular electrode wire 114 acts more like a solid wire in that the material transfer is a more uniform spray or streaming spray. Moreover, there is a reduction in out-gassing events and very fine spatter-causing events, which are normally seen while welding with metal core wire. Such a configuration enables the tubular wire to function in a manner similar to a solid wire type streaming spray. Yet another benefit of preheating is alleviating wire flip due to poor wire cast and helix control in wire manufacturing (which may be more pronounced in tubular wire than solid wire) because the undesired wire twist will be reduced in the preheating section.

Figure 2A:
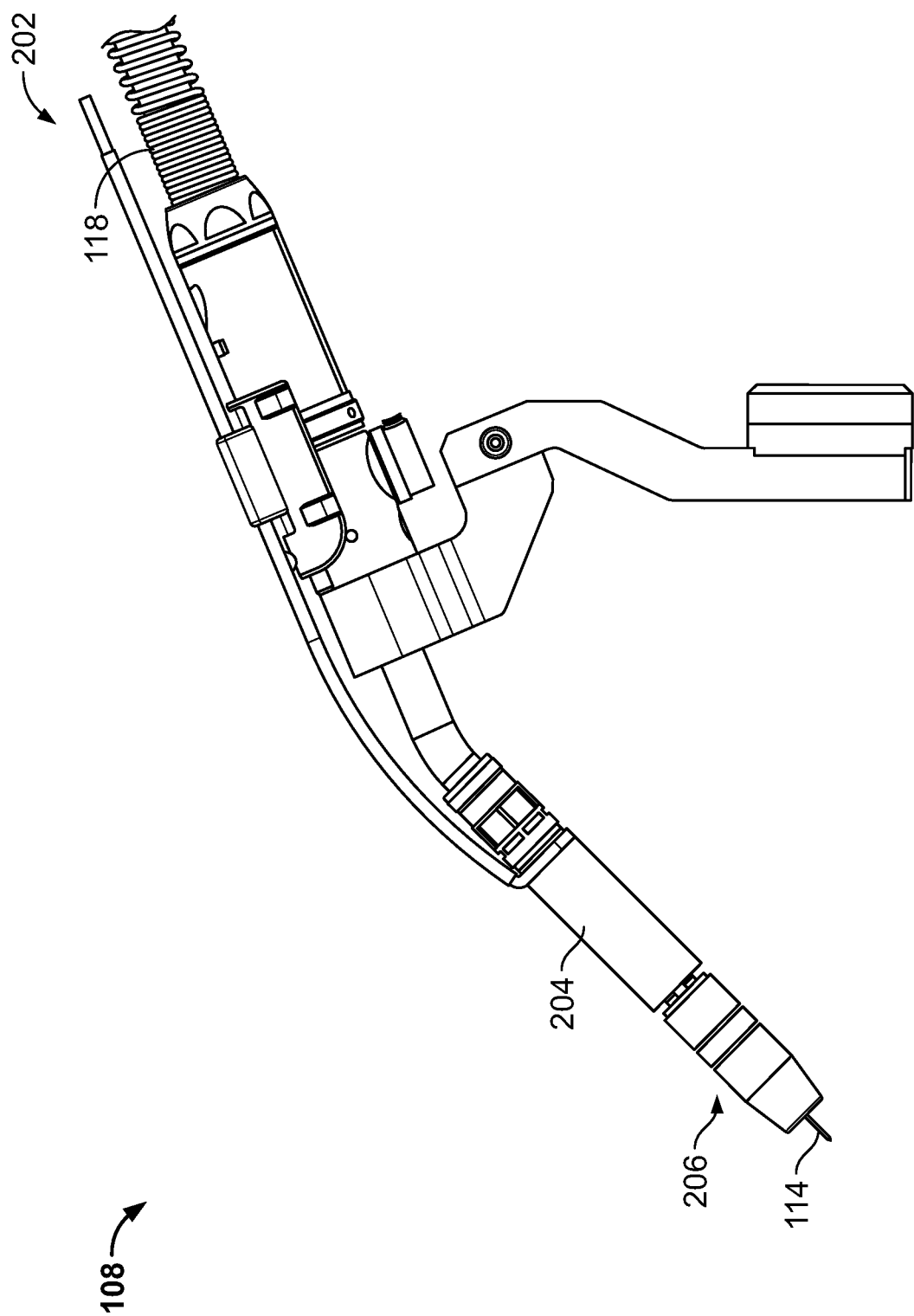
FIG. 2a illustrates a side view of an example robotic gooseneck welding torch with an air cooled preheater section.
Figure 2B:
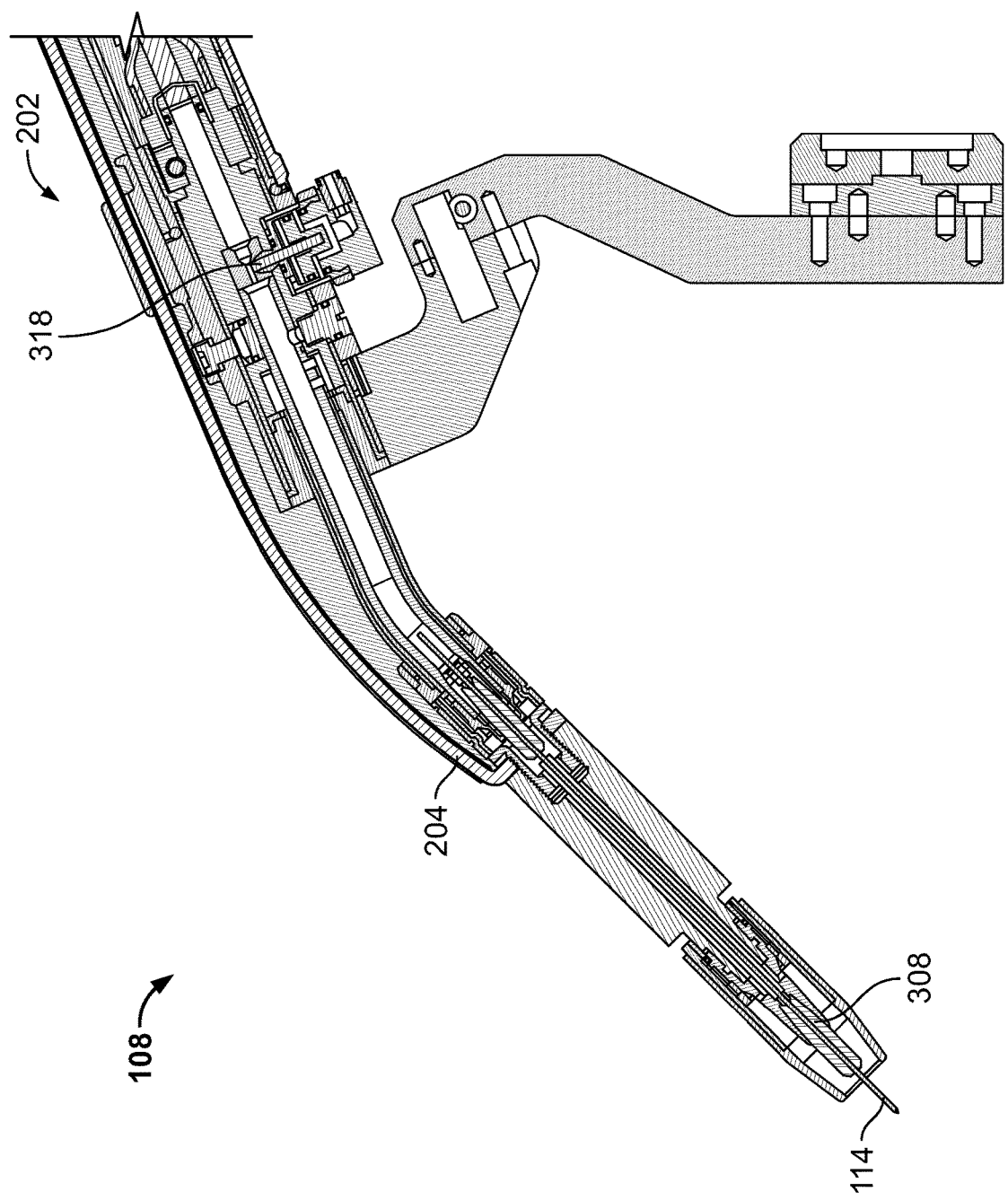
FIG. 2b illustrates a cross sectional side view of an example robotic gooseneck welding torch with an air cooled preheater section.
Figure 2C:
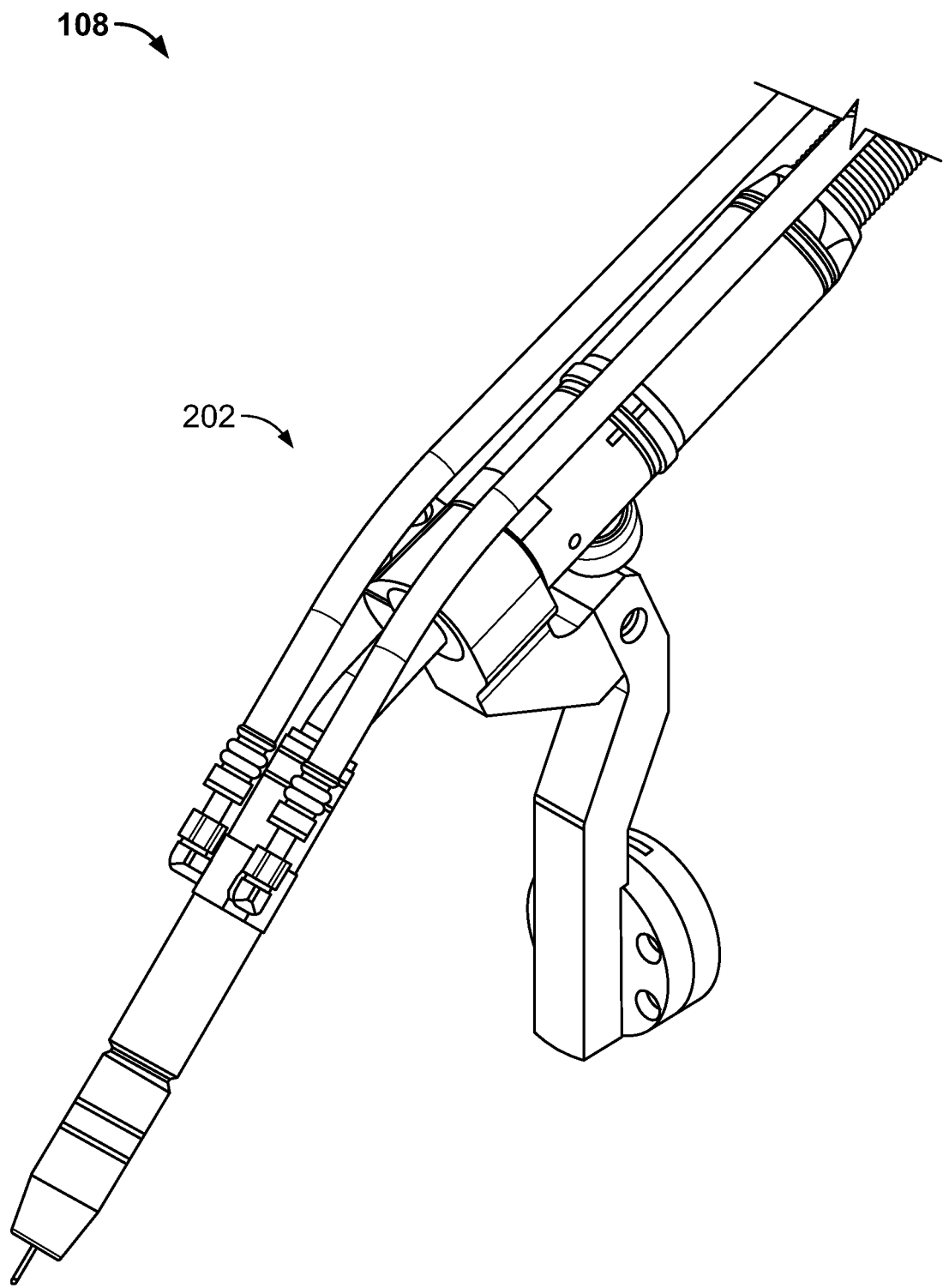
FIG. 2c illustrates a perspective view of an example robotic gooseneck welding torch with liquid cooled weld cables.
Figure 2D:
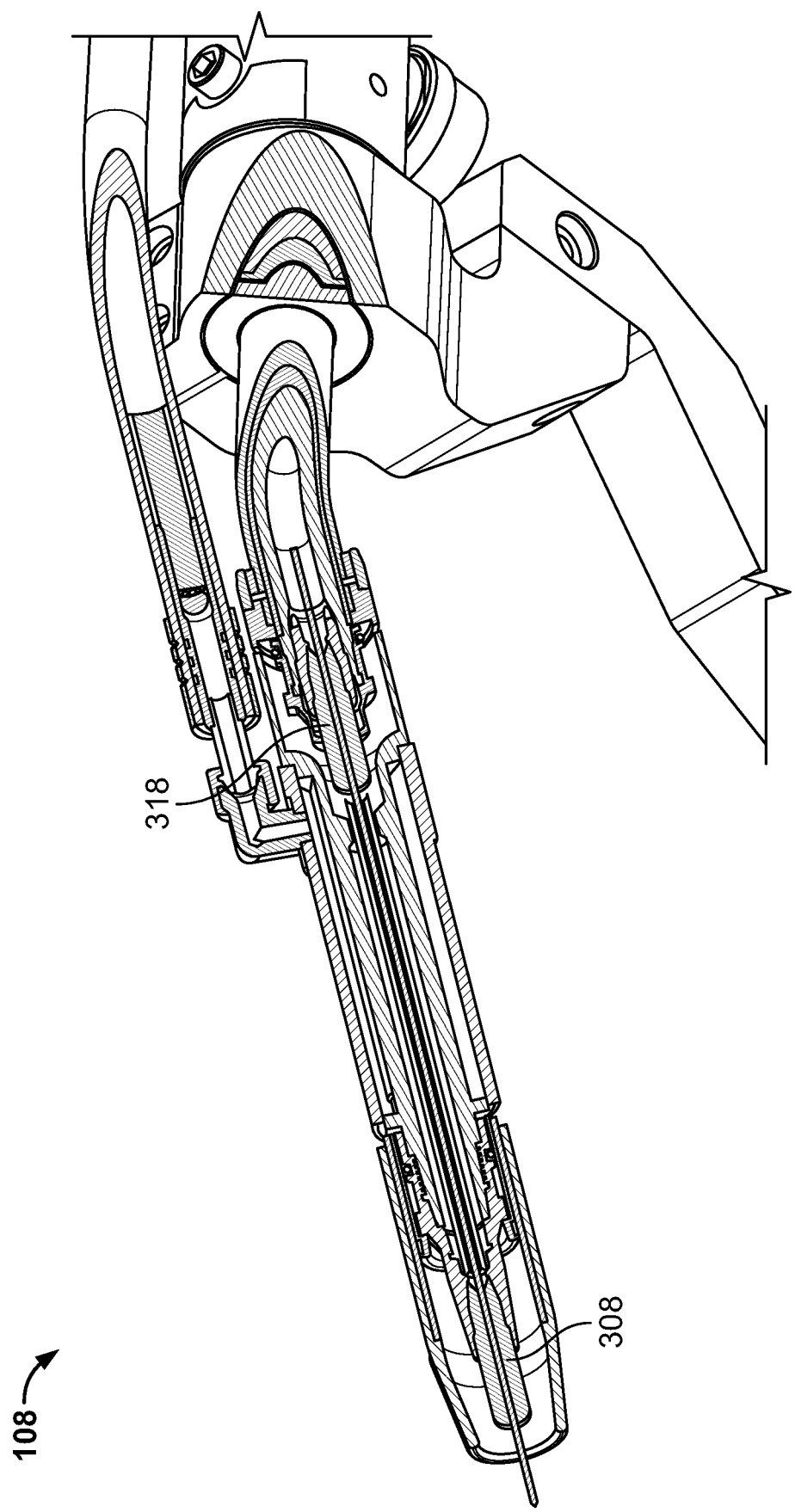
FIG. 2d illustrates a cross sectional perspective view of an example robotic gooseneck welding torch with liquid cooled weld cables.

As will be discussed with regard to FIG. 2a through 2d, the welding tool 108 may be a gooseneck torch, such as those used with robotic welding, but other shapes are contemplated, including virtually any neck bend angle greater than zero, handheld versions for low hydrogen FCAW welding, handhelds for GMAW, straight-neck hard automation torches, straight-neck SAW torches, etc. FIG. 2a illustrates a side view of an example robotic gooseneck welding torch with an air cooled preheater section. FIG. 2b illustrates a cross sectional side view of an example robotic gooseneck welding torch with an air cooled preheater section. FIG. 2c illustrates a perspective view of an example robotic gooseneck welding torch with liquid cooled weld cables. FIG. 2d illustrates a cross sectional perspective view of an example robotic gooseneck welding torch with liquid cooled weld cables, where the copper conductor partially shown. In certain aspects, a plurality of ceramic guides or rollers may be used to provide a preheater with a bend in it, which might have contact advantages with the contact tips and allow for unique form factors. In other aspects, the neck may be straight and the robot mounting bracket has the bend.

There are, however, a number of advantages to the gooseneck torch design. The gooseneck torch design, for example, allows for better access to the weld joint 112, as well as automation capabilities in heavy equipment applications. The gooseneck torch design also allows for heavier deposition welding in tighter spaces compared to, for example, a tandem torch design. Thus, in operation, the electrode wire 114 delivers the welding current to the point of welding (e.g., the weld joint 112) on the workpiece 106 (e.g., a weldment) to form a welding arc 320.

In the welding system 100, the robot 102, which is operatively coupled to welding equipment 110 via conduit 118 and ground conduit 120, controls the location of the welding tool 108 and operation of the electrode wire 114 (e.g., via a wire feeder) by manipulating the welding tool 108 and triggering the starting and stopping of the current flow (whether a preheat current and/or welding current) to the electrode wire 114 by sending, for example, a trigger signal to the welding equipment 110. When welding current is flowing, a welding arc 320 is developed between the electrode wire 114 and the workpiece 106, which ultimately produces a weldment. The conduit 118 and the electrode wire 114 thus deliver welding current and voltage sufficient to create the electric welding arc 320 between the electrode wire 114 and the workpiece 106. At the point of welding between the electrode wire 114 and the workpiece 106, the welding arc 320 locally melts the workpiece 106 and electrode wire 114 supplied to the weld joint 112, thereby forming a weld joint 112 when the metal cools.

In certain aspects, in lieu of a robot 102's robotic arm, a human operator may control the location and operation of the electrode wire 114. For example, an operator wearing welding headwear and welding a workpiece 106 using a handheld torch to which power is delivered by welding equipment 110 via conduit 118. In operation, as with the system 100 of FIG. 1, an electrode wire 114 delivers the current to the point of welding on the workpiece 106 (e.g., a weldment). The operator, however, could control the location and operation of the electrode wire 114 by manipulating the handheld torch and triggering the starting and stopping of the current flow via, for example, a trigger. A handheld torch generally comprises a handle, a trigger, a conductor tube, a nozzle at the distal end of the conductor tube, and, as disclosed herein, a contact tip assembly 206. Applying pressure to the trigger (i.e., actuating the trigger) initiates the welding process by sending a trigger signal to the welding equipment 110, whereby welding current is provided, and the wire feeder is activated as needed (e.g., to drive the electrode wire 114 forward to feed the electrode wire 114 and in reverse to retract the electrode wire 114). Commonly owned U.S. Pat. No. 6,858,818 to Craig S. Knoener, for example, describes an example system and method of controlling a wire feeder of a welding-type system. The subject disclosure may be practiced together with spin arc and reciprocating wire feed. In one example, the bottom tip may be moved to cause a preheated wire to spin. In another example, the wire may be moved axially forward and backward prior to be pre-heated by reverse wire feed motor upstream. Both spin and reverse wire feed on its own may have a positive effect in wire melt off rate and deposition. When they are combined, the effect on deposition rate may be compounded.

FIG. 2A illustrates a perspective view of an example robotic gooseneck welding torch 108. The illustrated gooseneck torch 108 generally includes a torch body 202, a gooseneck 204 extending from a forward end of the torch body 202, and a contact tip assembly 206 at a distal end of the gooseneck 204, or through the radius of the gooseneck 204. The conduit 118 of the welding system 100 operably couples to a rear end of the torch body 202, which is further operably coupled to the robot 102 and welding equipment 110. The conduit 118 supplies, inter alia, electrical current, shielding gas, and a consumable electrode (e.g., electrode wire 114) to the torch body 202. The electrical current, shielding gas, and consumable electrode travel through the torch body 202 to the gooseneck 204 and ultimately exit through an orifice at the distal end of the contact tip assembly 206 where a welding arc 320 is ultimately formed. In certain aspects, gooseneck torch 108 may be fluid cooled, such as air-cooled and/or liquid-cooled (e.g., water-cooled). In one embodiment, the liquid cooling mechanism surrounds the preheat contact tips and transfers away extra heat from the preheater inside the torch body.

To facilitate maintenance, the gooseneck torch 108 may be configured with interchangeable parts and consumables. For example, the gooseneck torch 108 may include a quick change add on and/or a second contact tip that allows adaptation of an existing water cooled/air cooled torch. Commonly owned U.S. Patent Publication No. 2010/0012637, for example, discloses a suitable gooseneck locking mechanism for a robotic torch having a torch body and a gooseneck that includes a connector receiver disposed in the torch body.

The packaging of power source for pre-heat can take one of a variety of forms. In a preferred aspect, the pre-heat power supply may be integral with the welding power supply, or inside the same housing. Inside the same box, the pre-heat power supply can be an auxiliary power supply with its own separate transformer feeding from the mains; however it is also possible for the pre-heat power supply to share the same primary and iron core of transformer for welding current by feeding off a dedicated secondary winding. An integrated box provides simplicity in inter-connection, installation and service. Another embodiment is that the pre-heat power supply is separately packaged in its own housing with benefit of retrofitting into existing installations and to permit a "mix-and-match" flexibility in pairing with other power sources, such as for those suitable for open arc welding and sub-arc welding. Separate packaging also requires communications between the controller inside the welding power source and the preheating power source. Communication may be provided through digital networking, or more specifically industrial serial bus, CANbus, or Ethernet/IP. Separate packaging may also result in combining the power output of pre-heat power source and the output of the welding power source, possibly in the feeder, or in a junction box before the torch, or in the torch itself.

In open arc welding, there are two derivatives, high deposition welding commonly seen in shipbuilding and heavy equipment fabrication (commonly groove, butt and fillet joint, 15-40 ipm travel speed); and high speed welding commonly seen in automotive (commonly lap joint, 70-120 ipm travel speed). Pre-heat improves deposition and/or travel speed in both cases. In open arc, GMAW with solid or metal core wire may be used; or FCAW with fluxed cored wire may be used as a process. In sub-arc welding, solid or metal core wire may be used. In both open arc and sub-arc, multiple wire and/or arc combination is possible. For example, the lead wire has pre-heat and arc, but the trail wire has only pre-heat but no arc. Another example is that both lead wire and trail wire has preheat and arc. Yet another example is that there are 3 wires, where the first and third wire has both pre-heat and arc, but the middle wire has preheat only but no arc. There are many permutations possible. The third group of applications is resistive preheating with another non-consumable heat source such as laser, plasma, or TIG, for welding, brazing, cladding, and hardfacing. The wire is pre-heated by resistive preheat and fed into a liquid puddle melted by laser, plasma, or TIG.

In some examples, the second contact tip (e.g., further from the arc) is a spring loaded, one-size-fits-all contact tip. The spring pressure in the second contact tip improves electrical contact despite electrical erosion and/or mechanical wear on the contact tip. Conventional spring loaded contact tips are relatively expensive and are easily damaged by exposure to the arc and/or burn-back. However, using the spring loaded second contact tip that is not exposed to the arc and is not exposed to burn-back improves the longevity of the spring loaded contact tip. Because the torch accommodates different wire sizes, and a multi-size or universal second tip improves convenience to the weld operator by reducing the number of tips to be matched to the wire diameter, (e.g., the first contact tip). The construction of the spring-loaded contact tip may be one piece (e.g., a tubular structure with slots so that the tines are adaptive to different wire diameter and apply pressure and reliable contact) or two or more pieces. For weld operators who are accustomed to conventional guns and only having a single contact tip (e.g., the tip closer to the arc), the weld operator is rarely or never required to replace the second contact tip, thereby improving the weld operator experience using multiple contact tips.

Figure 3:
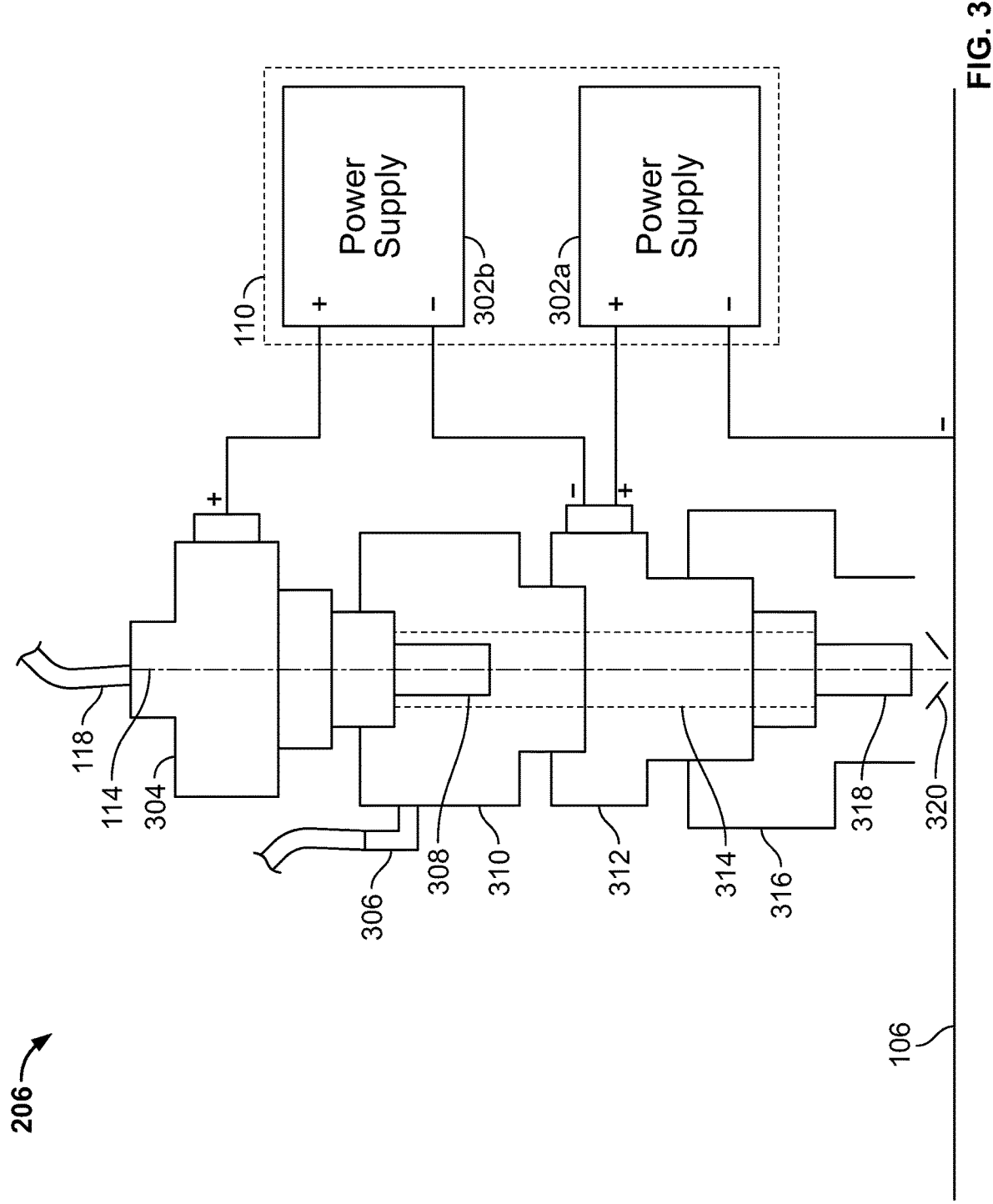
FIG. 3 illustrates a functional diagram of an exemplary contact tip assembly.

FIG. 3 illustrates a functional diagram of an exemplary contact tip assembly 206, which may be used with welding system 100, whether robotic or manually operated. As illustrated, the contact tip assembly 206 may comprise a first body portion 304, a gas shielding inlet 306, a first contact tip 318, a second body portion 310, a third body portion 312, a ceramic guide 314, a gas nozzle 316, and a second contact tip 308. While the first, second, and third body portions 304, 310, 312 are illustrated as separate components, one of skill in the art, having reviewed the present disclosure, would recognize that one or more of said body portions 304, 310, 312 may be fabricated as a single component. In certain aspects, the contact tip assembly 206 may be added to an existing welding torch. For example, the contact tip assembly 206 can be attached to a distal end of a standard welding setup and then used for resistive preheating. Similarly, the contact tip assembly 206 may be provided as a PLC retrofit with custom software, thereby enabling integration with existing systems that already have power sources and feeders.

In some examples, the first contact tip 318 and/or the second contact tip 308 are modular and/or removable so as to be easily serviceable by a user of the welding system 100. For example, the first contact tip 318 and/or the second contact tip 308 may be implemented as replaceable cartridges. In some examples, the welding equipment 110 monitors identifies one or more indicators that the first contact tip 318 and/or the second contact tip 308 should be replaced, such as measurements of the used time of the first contact tip 318 and/or the second contact tip 308, temperature(s) of the first contact tip 318 and/or the second contact tip 308, amperage in the first contact tip 318 and/or the second contact tip 308 and/or the wire, voltage between the first contact tip 318 and/or the second contact tip 308 and/or the wire, enthalpy in the wire, and/or any other data.

In operation, the electrode wire 114 passes from the gooseneck 204 through a first contact tip 318 and a second contact tip 308, between which a second power supply 302b generates a preheat current to heat the electrode wire 114. Specifically, the preheat current enters the electrode wire 114 via the second contact tip 308 and exits via the first contact tip 318. At the first contact tip 318, a welding current may also enter the electrode wire 114. The welding current is generated, or otherwise provided by, a first power supply 302a. The welding current exits the electrode wire 114 via the workpiece 106, which in turn generates the welding arc 320. That is, the electrode wire 114, when energized for welding via a welding current, carries a high electrical potential. When the electrode wire 114 makes contact with a target metal workpiece 106, an electrical circuit is completed and the welding current flows through the electrode wire 114, across the metal work piece(s) 106, and to ground. The welding current causes the electrode wire 114 and the parent metal of the work piece(s) 106 in contact with the electrode wire 114 to melt, thereby joining the work pieces as the melt solidifies. By preheating the electrode wire 114, a welding arc 320 may be generated with drastically reduced arc energy. The preheat current can range from, for example, 75 A to 400 A, when the distance between electrodes is 5.5 inches. Generally speaking, the preheat current is proportional to the distance between the two contact tips and the electrode wire 114 size. That is, the smaller the distance, the more current needed. The preheat current may flow in either direction between the electrodes.

To avoid unwanted kinking, buckling, or jamming of the electrode wire 114, a guide 314 may be provided to guide the electrode wire 114 as it travels from the second contact tip 308 to the first contact tip 318. The guide 314 may be fabricated from ceramic, a dielectric material, a glass-ceramic polycrystalline material, and/or another non-conductive material. The contact tip assembly 206 may further comprise a spring loaded device, or equivalent device, that reduces wire kinking, buckling, and jamming, while increasing wire contact efficiency by keeping the electrode wire 114 taught and/or straight.

In certain aspects, the second contact tip may be positioned at the wire feeder (e.g., at welding equipment 110) or another extended distance, to introduce the preheat current, in which case the preheat current may exit a contact tip in the gooseneck torch 108. The contact tip in the gooseneck torch 108 may be the same, or different, from the contact tip where the welding current is introduced to the electrode wire 114. The preheat contact tip(s) may be further positioned along the electrode wire 114 to facilitate use with Push-Pull Guns, such as those available from Miller Electric of Appleton, Wis. The liner could be made from ceramic rollers so the preheat current could be injected back at the feeder and be a very low value due to the length of the liner.

The welding current is generated, or otherwise provided by, a first power supply 302a, while the preheat current is generated, or otherwise provided by, a second power supply 302b. The first power supply 302a and the second power supply 302b may ultimately share a common power source (e.g., a common generator or line current connection), but the current from the common power source is converted, inverted, and/or regulated to yield the two separate currents—the preheat current and the welding current. For instance, the preheat operation may be facilitated with a single power source and associated converter circuitry. In which case, three leads may extend from the welding equipment 110 or an auxiliary power line in the welder, which could eliminate the need for the second power supply 302b.

In certain aspects, in lieu of a distinct contact tip assembly 206, the first contact tip 318 and a second contact tip 308 may be positioned on each side of the gooseneck bend. For example, as illustrated by FIG. 2b, a preheat section may be curved (e.g., non-straight). That is, wire is fed through a section of the torch that has a bend greater than 0 degrees or a neck that would be considered a "gooseneck". The second contact tip 308 may be positioned before the initial bend and the first contact tip 318 after the bend is complete. Such an arrangement may add the benefit to the connectivity of the heated wire moving through the portion of the neck between the two contact tips. Such an arrangement results in a more reliable connection between the two contact tips where an off axis, machined dielectric insert was previously needed.

The preheat current and welding current may be DC, AC, or a combination thereof. For example, the welding current may be AC, while the preheat current may be DC, or vice versa. Similarly, the welding current may be DC electrode negative (DCEN) or a variety of other power schemes. In certain aspects, the welding current waveform may be further controlled, including constant voltage, constant current, and/or pulsed (e.g., AccuPulse). In certain aspects, constant voltage and/or constant power, constant penetration, and/or constant enthalpy may be used to facilitate preheat instead of constant current. For example, it may be desirable to control the amount of penetration into the workpiece. In certain aspects, there may be variations in contact tip to work distances that under constant voltage weld processes will increase or decrease the weld current in order to maintain a voltage at or close to the target voltage command, and thus changing the amount of penetration/heat input into the weld piece. By adjusting the amount of preheat current in response to changes to contact tip to work changes the penetration/heat input can be advantageously controlled. Furthermore, penetration can be changed to reflect a desired weld bead/penetration profile. For example, the preheat current may be changed into a plurality of waveforms, such as, but not limited to, a pulse type waveform to achieve the desired weld bead/penetration profile.

The current could be line frequency AC delivered from a simple transformer with primary phase control. Controlling the current and voltage delivered to the preheat section may be simpler using a CC, CV, or constant power depending on how the control is implemented as well as the power supply configuration to do it. In another aspect, the welding power source for consumable arc welding (GMAW and SAW) may include regulating a constant welding current output and adapt wire speed to maintain arc length or arc voltage set-point (e.g., CC+V process control). In yet another aspect, the welding power source may include regulating a constant welding voltage output (or arc length) and adapt wire speed to maintain arc current set-point (e.g., CV+C process control). The CC+V and CV+C process controls allow for accommodation of wire stick-out variation and pre-heat current/temperature variation by adapting wire feed speed (or variable deposition). In yet another aspect, the power source may include regulating a constant welding current output, the feeder maintains constant deposition, and the pre-heat power source adapts preheat current (or pre-heat power) to maintain constant arc voltage (or arc length). It can be appreciated that the addition of pre-heat current/power adds a new degree of freedom to the wire welding processes (GMAW and SAW) that allows flexibility and controllability in maintaining constant weld penetration and weld width (arc current), deposition (wire speed) and process stability (arc length or voltage). These control schemes may be switched during the welding process, for example, CV+C for arc start only, and other control schemes for the main weld.

Using an advanced controlled welding waveform allows for the reduction in heat input, distortion, and improvements in bead geometry at high deposition rates. Thus, expanding the operating range of pulse welding, reducing rotational transfer at high deposition rates, and reducing spatter caused by rotational spray. By preheating the electrode wire 114, the operating range for pulse programs can be extended to higher depositions. This is possible because of the lower power that is needed to transfer the material at those deposition rates. Before, the pulse width/frequency/peak amperage were too high at higher deposition rates, that the benefits of pulsing were no longer present. By preheating the electrode wire 114, the operator is able to use similar pulse programs for higher rates (e.g., 600 inches per minute (ipm)), which was previously only available at slower rates, such as 300 ipm. Preheating the electrode wire 114 also maximizes the benefit for pulse welding with low background current. Furthermore, using a metal core with a custom pulse configuration in combination with the contact tip assembly 206 allows for heavier deposition welding at a higher quality. By preheating the electrode wire 114, it behaves similarly to a solid wire and its transfer style.

Additionally or alternatively, preheating the electrode wire 114 enables the background current of the pulse waveform to be reduced substantially, as its primary function may be changed from growing a ball to merely sustaining an arc between the electrode wire 114 and the workpiece 106. Conventionally, the background current of the pulse waveform is used to grow the droplet or ball, which is subsequently deposited to the workpiece 106. The example power supply 302a may implement the pulse waveform based on the preheating power applied to the electrode wire 114 by the preheat power supply 302b.

The welding system 100 may be configured to monitor the exit temperature of the electrode wire 114 between the preheat contact tips (e.g., the preheat temperature), as illustrated, between the first contact tip 318 and the second contact tip 308. The preheat temperature may be monitored using one or more temperature determining devices, such as a thermometer, positioned adjacent the electrode wire 114, or otherwise operably positioned, to facilitate periodic or real-time welding feedback. Example thermometers may include both contact sensors and non-contact sensors, such as non-contact infrared temperature sensors, thermistors, and/or thermocouples. An infrared thermometer determines temperature from a portion of the thermal radiation emitted by the electrode wire 114 to yield a measured preheat temperature. The temperature determining device may, in addition to or in lieu of the thermometers, comprise one or more sensors and/or algorithms that calculate the preheat temperature of the electrode wire 114. For example, the system may dynamically calculate temperature based on, for example, a current or voltage. In certain aspects, the thermometer may measure the temperature of the dielectric guide or first contact tip to infer the wire temperature.

In operation, the operator may set a target predetermined preheat temperature whereby the welding system 100 dynamically monitors the preheat temperature of the electrode wire 114 and adjusts the preheat current via the second power supply 102b to compensate for any deviation (or other difference) of the measured preheat temperature from the target predetermined preheat temperature. Similarly, controls may be set such that a welding operation cannot be performed until the electrode wire 114 has been preheated to the predetermined preheat temperature.

Figure 4:
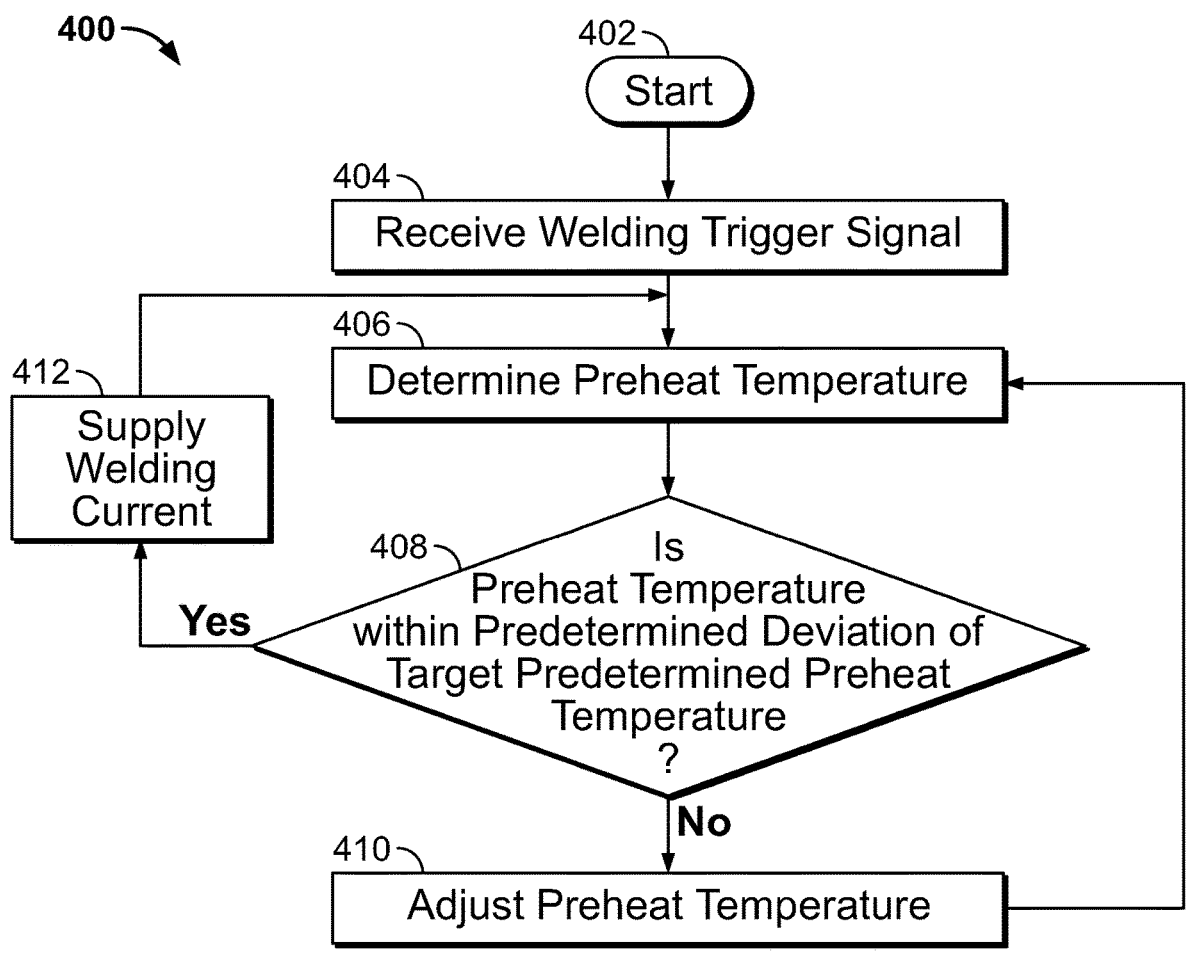
FIG. 4 illustrates a flow chart of an example process for providing a welding current based upon the preheat temperature of an electrode wire.

FIG. 4 illustrates a flow chart 400 of an example process for providing a welding current based upon the preheat temperature of the electrode wire 114. The process starts at block 402 in response to, for example, activating the welding system 100 or receiving a trigger signal requesting that the welding system 100 provide a welding current to the electrode wire 114.

At block 404, the welding system 100 receives a trigger signal requesting that the welding system 100 supply a welding current to the welding tool 108 (e.g., the electrode wire 114 via the first contact tip 318). The trigger signal may be digital or analog and provided in response to an output from the robot 102 or actuation of a trigger by an operator.

At block 406, the welding system 100 determines the preheat temperature of the electrode wire 114 using one or more sensors and/or algorithms of a temperature determining device, defining a determined preheat temperature. The determined preheat temperature may be a measured preheat temperature or a calculated preheat temperature. For example, as discussed with reference to FIG. 3, a thermometer may be positioned to determine the temperature of the electrode wire 114 portion between the first contact tip 318 and the second contact tip 308. The welding system 100 may also be configured to calculate the preheat temperature of the electrode wire 114 using one or more devices and/or algorithms, thereby obviating the requirement for a thermometer (or provided in addition to the thermometer). For example, the welding system 100 may employ an internal loop to calculate the preheat temperature of the electrode wire 114 based upon the preheat current, voltage, and/or power supplied to the electrode wire, in addition to the heat generated by the resistive heating at the stickout (e.g., the portion of electrode wire 114 that extends beyond the contact tip where welding current is introduced, as illustrated, the first contact tip 318). If a thermometer is also present, the measured preheat temperature may be compared to a calculated preheat temperature and optionally used to train the algorithm.

The welding system 100 may determine the preheat temperature of the electrode wire 114 at predetermine intervals (e.g., between about 1 and 60 seconds, more preferably between about 1 and 10 seconds) or dynamically (e.g., in real-time). The welding system 100 may further store the determined preheat temperatures to a database, thereby enabling the operators to track, view, and analyze the determined preheat temperature over a given period of time, which may prove useful in identifying a potential cause of defect.

At block 408, the welding system 100 determines whether the determined preheat temperature falls within a predetermined operable range of a target predetermined preheat temperature. That is, the predetermined operable range may permit a predetermined deviation from the target predetermined preheat temperature. For instance, if the predetermined deviation is set to 10% and the target predetermined preheat temperature may be X degrees, the predetermined operable range would range from 0.9X to 1.1X. While a predetermined deviation of 10% is provide as an example, the predetermined deviation may be any deviation desired by the operator and, therefore, should not be limited to 10%. In certain aspects, an alert may be provided to the operator if the determined preheat temperature is consistently on the high or the low end of the predetermined operable range, indicating that adjustment may be needed. For example, an alert may be provided if the determined preheat temperature is on the high or the low end of the predetermined operable range for a predetermined period of time (e.g., about 1 min to 60 seconds, more preferably about 15 to 60 seconds). If the welding system 100 determines that the determined preheat temperature falls within the predetermined operable range of a target predetermined preheat temperature, the process proceeds to block 412. If the welding system 100 determines that the determined preheat temperature falls outside of the predetermined operable range of a target predetermined preheat temperature, the process proceeds to block 410.

At block 410, the welding system 100 may adjust the preheat temperature of the electrode wire 114. The preheat temperature may be adjusted by increasing or decreasing the preheat current, power, and/or voltage supplied by the welding system 100 to the portion of electrode wire 114 to be preheated. An example process for monitoring and adjusting the preheat temperature of the electrode wire 114 is described in greater detail with regard to FIG. 5.

At block 412, the welding system 100 supplies a welding current to the welding tool 108 to facilitate a welding operation. The temperature monitoring loop, however, may be repeated until the trigger signal is no longer received by returning to block 404.

A current pulse may be used to calculate any voltage drop across the first contact tip 318 and the second contact tip 308, a process that may be integrated as part of a calibration routine. The welding system 100 may be configured to account for the voltage drop across the contact tips (e.g., subtracting it out). For example, a one millisecond current pulse (or energy pulse) may be used to gauge voltage drop. Further, the voltage drop may be determined by measuring two pulses to isolate contact resistance with wire resistance. This initial voltage measurement may be determined through both contact tips and a cold section of welding wire, which establishes a constant contact resistance and the resulting voltage drop across the contacts that can be subtracted out of the voltage drop across the preheat section measured as the wire heats up. This then determines the resistive drop across the heated wire. Knowing the temperature coefficient of resistance of the wire, the average wire temperature can then be determined. Knowing the speed of the wire and the power delivered to the wire, the peak wire temperature can be determined.

Figure 5:
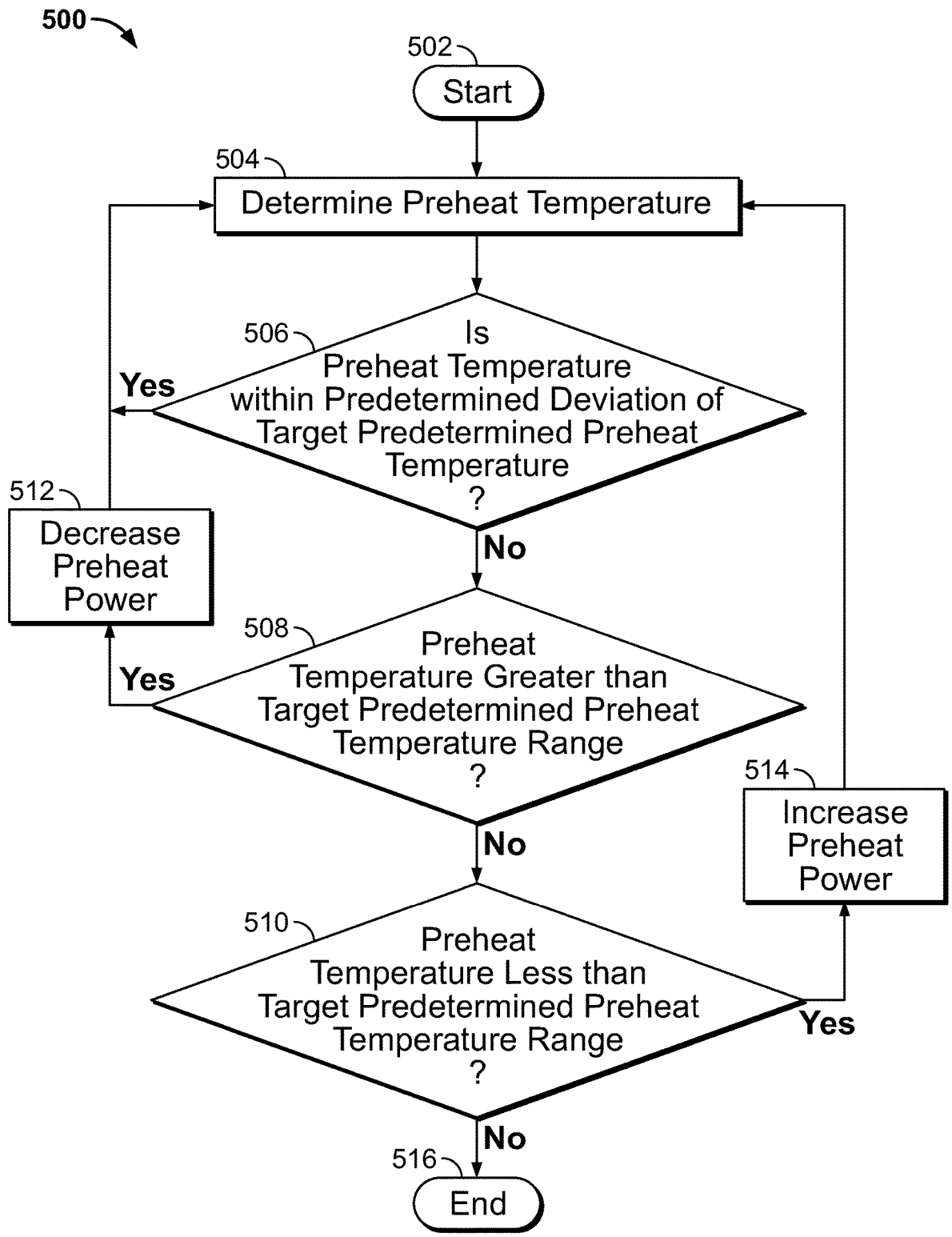
FIG. 5 illustrates a flow chart of an example process for monitoring and adjusting the preheat temperature of an electrode wire.

FIG. 5 illustrates a flow chart 500 of an example process for monitoring and adjusting the preheat temperature of the electrode wire 114. The process starts at block 502 in response to, for example, receiving a signal requesting that the welding system 100 provide a welding current to the electrode wire 114.

At block 504, the welding system 100 determines the preheat temperature of the electrode wire 114 using one or more sensors or algorithms substantially as discussed with regard to block 406 of FIG. 4.

At block 506, the welding system 100 determines whether the determined preheat temperature falls within a predetermined operable range of a target predetermined preheat temperature substantially as discussed with regard to block 408 of FIG. 4. If the welding system 100 determines that the determined preheat temperature falls within the predetermined operable range of a target predetermined preheat temperature, the process returns to block 504, thereby effectively entering a loop. If the welding system 100 determines that the determined preheat temperature falls outside of the predetermined operable range of a target predetermined preheat temperature, the process proceeds to block 508.

At block 508, the welding system 100 determines whether the determined preheat temperature is greater than the predetermined operable range. The predetermined operable range may include specified deviation(s) from the predetermined preheat temperature. If the welding system 100 determines that the determined preheat temperature is greater than the predetermined operable range, the process proceeds to block 512. If the welding system 100 determines that the determined preheat temperature is not greater than the predetermined operable range, the process proceeds to block 510.

At block 510, the welding system 100 determines whether the determined preheat temperature is less than the predetermined operable range. If the welding system 100 determines that the determined preheat temperature is less than the predetermined operable range, the process proceeds to block 514. If the welding system 100 determines that the determined preheat temperature is not less than the predetermined operable range, the process proceeds to block 516 and optionally alerts to operator to a malfunction or error.

At block 512, the welding system 100 increases the preheat temperature of the electrode wire 114. The preheat temperature may be increased by increasing the preheat current, power, and/or voltage supplied by the welding system 100 to the portion of electrode wire 114 to be preheated. The preheat current, power, and/or voltage may be increased at predetermined intervals (i.e., X amps, X watts, X volts, etc.) until the preheat temperature of the electrode wire 114 is determined to be within the predetermined operable range or at the target predetermined preheat temperature, which may be determined at block 504. Effectively, an internal loop is established between blocks 504 and 508 until the preheat temperature is found to be within predetermined deviation of target predetermined preheat temperature at block 506.

At block 514, the welding system 100 decreases the preheat temperature of the electrode wire 114. The preheat temperature may be decreased by decreasing the preheat current, power, and/or voltage supplied by the welding system 100 to the portion of electrode wire 114 to be preheated. The preheat current, power, and/or voltage may be similarly decreased at predetermined intervals (i.e., X amps, X watts, X volts, etc.) until the preheat temperature of the electrode wire 114 is determined to be within the predetermined operable range or at the target predetermined preheat temperature, which may be determined at block 504. Effectively, an internal loop is established between blocks 504 and 510 until the preheat temperature is found to be within predetermined deviation of target predetermined preheat temperature at block 506.

At block 516, the welding system 100 ends the process. The process may end as the result of, for example, an abort signal, error signal, or discontinuation of the welding operation (e.g., the welding system 100 is shut off, put into idle mode, etc.).

Determining electrode stickout may also be used to make heating adjustments to the electrode wire 114. To ensure that the distal end of the electrode wire 114 is heated to the predetermined preheat temperature, the welding system 100 may be configured with an arc starting algorithm whereby the wire feeder draws the electrode wire 114 in reverse such that the distal end of the electrode wire 114 is substantially at the first contact tip 318, thereby heating the distal end of the electrode wire 114. This could be accomplished by monitoring the voltage drop between the contact tips until the wire is retracted such that it does not make contact with the first contact tip. Then the wire can be slowly fed forward until contact is made. Preheating the electrode wire 114 at the start, as well as with the other arc starting algorithms disclosed herein, are beneficial in that they yield high quality arc starts and mitigate traditional arc starting shortfalls, such as wire batons, multiple hard-shorting events, lack of fusion/penetration, etc., which can take place in non-preheated starts.

Figure 6A:
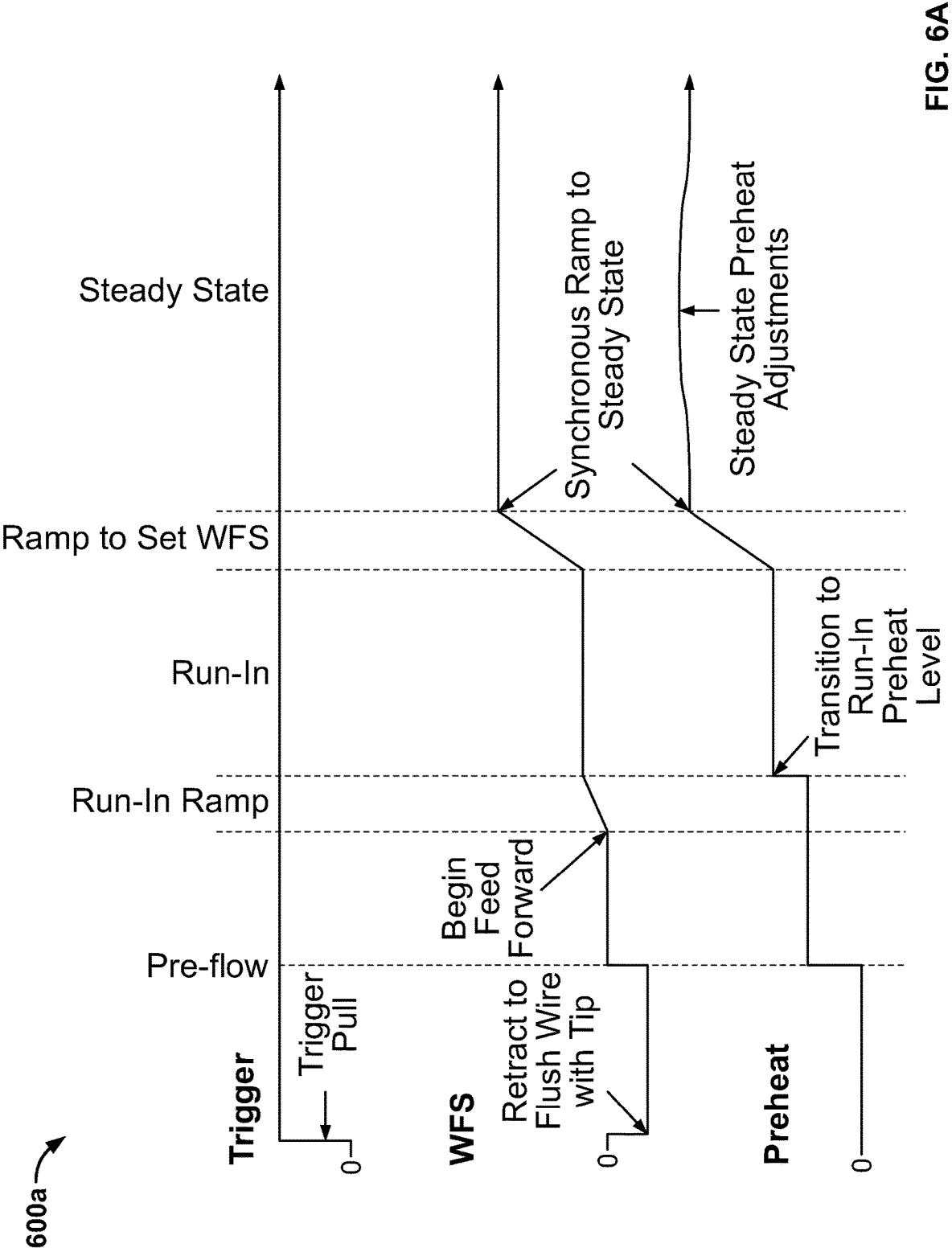
FIG. 6a illustrates a timing diagram for an example weld starting sequence.
Figure 6B:
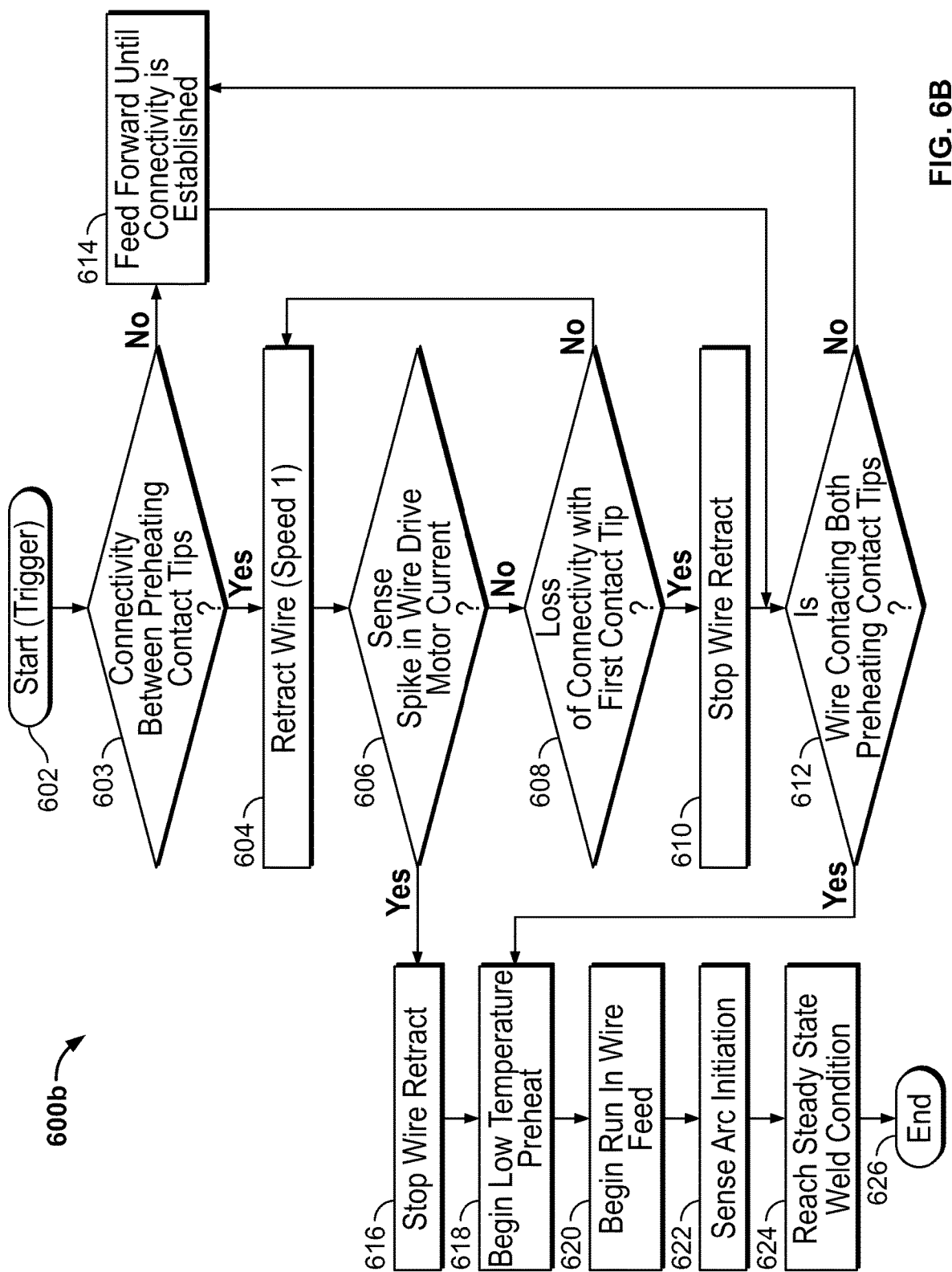
FIG. 6b illustrates a flow diagram of an example weld starting sequence.

FIGS. 6a and 6b illustrate, respectively, a timing diagram 600a and a flow diagram 600b of example weld starting sequences, in other words, a routine for synchronous wire heating and feeding prior to the start of forming the arc. When the trigger is actuated, a low level preheat current is generated and directed to the electrode wire 114 to begin heating the electrode wire 114. When the electrode wire 114 reaches its desired run-in speed, the preheat is then increased to a higher preheat level to accommodate for the speed of the moving electrode wire 114. As is understood by those of skill in the art, a run-in speed is the speed at which the electrode wire 114 is initially fed before it contacts the workpiece. Generally speaking, run-in speed is slower than the wire feed speed (WFS), which helps with arc starts and mitigates burnback. Once an arc is detected, the preheat current increases at a predetermined rate, which is commensurate with the WFS's ramp to a designated speed. Once at the desired WFS, steady state heating takes place. For clarity, the increased or decreased current occurs through the preheating power source, not the welding power source. This starting routine may be performed in combination with a contact tip to work distance prediction process. Once the welding equipment 110 has determined the current contact tip to work distance, the electrode wire 114 could be retracted such that the distal end of the electrode wire 114 is flush with the end of the contact tip. This would allow for full preheating of the electrode stickout. This contact tip to work distance could be predicted during pulse welding, or by pulsing quickly at the end of each weld completed in a CV-Spray transfer mode. Weld current feedback could also be used to determine contact tip to work distance changes. For example, the weld current could be compared to a known weld current that corresponds to one or more contact tip to work distances. The amount of preheat could then be increased or decreased based on the weld current feedback measured at the given wire feed speed. The voltage drop feedback could be used for, inter alia, predictive maintenance (e.g., contact tip wear), capturing welding anomalies, providing warnings to the operator, generating initial electrode wire 114 temperature estimations, and/or adjusting the configuration or algorithm of the welding equipment 110. In certain aspects, the torch may be used for resistive preheating applications where there is no arc after the preheated section. Further, handheld versions of the torch could be made for burning off hydrogen in flux cored arc welding applications, as well as other situations where ultra-low hydrogen would be desirable. Accordingly, a hydrogen sensor may be added to the torch to monitor the amounts of hydrogen being burnt off the electrode wire 114 or the amount that is going into the weld.

With reference to FIG. 6b, an example weld starting process 600b may be initiated by actuating the trigger of the torch at block 602. At block 603, the welding equipment 110 determines whether the wire is contacting both preheating contact tips. The wire may not be contacting both preheating tips if, for example, the wire was changed. If the wire is contacting both preheating contact tips (block 603), at block 604, the welding equipment 110 may retract the electrode wire 114 a predetermined distance. If the wire is not contacting both preheating contact tips (block 603), at block 614 the welding equipment 110 feeds the wire forward until contact is first detected.

If the welding equipment 110 detects a spike in the wire drive motor current, the welding equipment 110 may stop retracting the electrode wire 114 at block 616, otherwise the process continues to block 608. At block 608, the welding equipment 110 determines whether a loss in connectivity exists with regard to the first contact tip. If there is no loss in connectivity, the process returns to block 602. If there is a loss in connectivity, the process proceeds to block 610, where the electrode wire 114 stops retracting. After stopping the wire retracting at block 610, or after feeding the wire forward at block 614, at block 612 the welding equipment determines whether the wire is contacting both preheating contact tips. If the wire is not contacting both contact tips (block 612), control returns to block 614 to continue feeding the wire forward. By retracting and/or feeding the wire, the welding equipment 110 may ensure that the distal end of the electrode wire 114 is at the first electrode (mitigating stickout). Once connectivity with the first electrode is reestablished, a low temperature preheat is applied at block 618 to the electrode wire 114, which is stationary, between the two contact tips. At block 620, the welding equipment 110 begins driving the electrode wire 114 at run-in speed while feeding it with a preheat current. At block 622, the welding equipment 110 detects initiation of the arc between the electrode wire 114 and weldment, after which the welding equipment 110 reaches a steady state welding condition and WFS. The process may terminate at block 626 (e.g., upon releasing the trigger).

In some examples, after beginning the low current preheat at block 612, the welding equipment 110 pauses the wire feed to permit the heating effects of the low current preheat to permeate the wire and reduce the length of wire that is effectively cold (e.g., below a threshold temperature). In some examples, after beginning the low current preheat at block 612, the welding equipment repeats blocks 604, 606, 608 and 610, at a slower feed forward speed (e.g., slower than a nominal run-in speed) and a slow retract speed, so that the length of cold wire extending beyond the first contact tip is reduced (e.g., minimized). The first iteration of blocks 604, 606, 608 and 610 can be done at higher speeds, with the second iteration performed at a slower wire feed speed to improve precision. The pause in the wire feed can be quicker also to stop the wire feed before preheating the wire.

In the context of laser welding with resistive preheating (e.g., without an arc) and/or laser brazing with resistive preheating, reducing or minimizing the "cold wire" section and/or reducing or minimizing cycle time at the beginning of the process may be desirable. Cold wire refers to the un-preheated wire extending beyond the bottom (first) contact tip.

In some examples, blocks 604, 610 and 612 may be used to preset the wire extension prior to arc start. The sequence may be performed in between the robot weld cycles or when the robot is not welding. By moving the wire back and forth and between the two tips to determine the exact wire end position, the welding equipment feeds the wire outside the bottom tip for a distance slightly below the contact-tip-to-work distance (CTWD) for arc start robot teach position ready for the next arc start. The actual wire run-in speed and run-in time (or cycle time) can be reduced (e.g., minimized) due to the short distance wire travel for arc start.

Figure 6C:
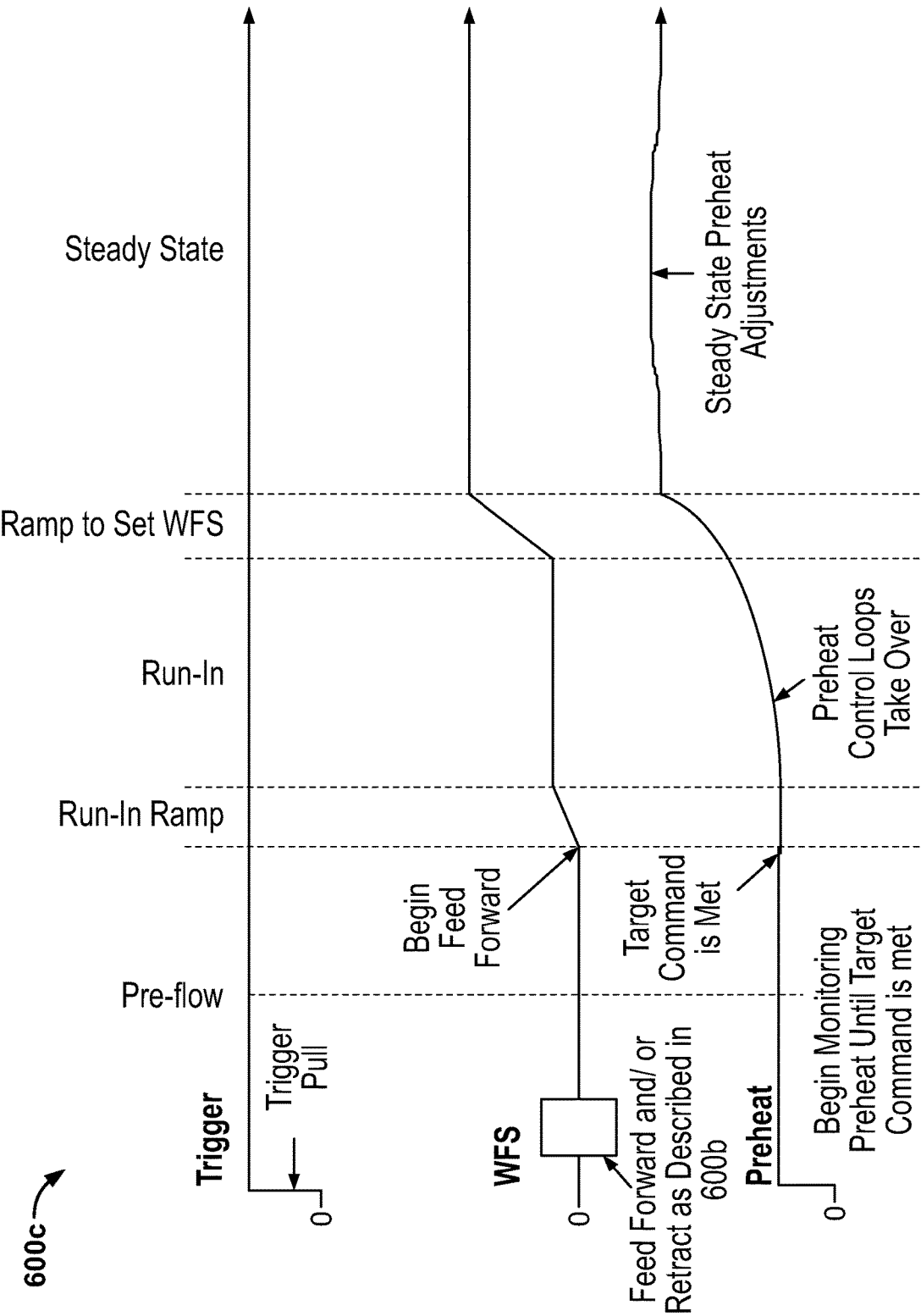
FIG. 6c illustrates a timing diagram for another example weld starting sequence.

FIG. 6c is a timing diagram 600c illustrating another example routine for synchronous wire heating and feeding prior to the start of forming the arc. In the timing diagram 600c, the wire does not advance until a target wire preheat temperature and/or a wire preheat voltage indicative of the wire preheat temperature is achieved. When the preheat target is met, a preheat control loop (e.g., a voltage controlled weld control loop (e.g., constant voltage) and/or a current controlled weld control loop (e.g., constant current)) takes control of the preheat voltage and/or preheat current. When the preheat target is met, wire advancement begins using a run-in wire speed.

Figure 6D:
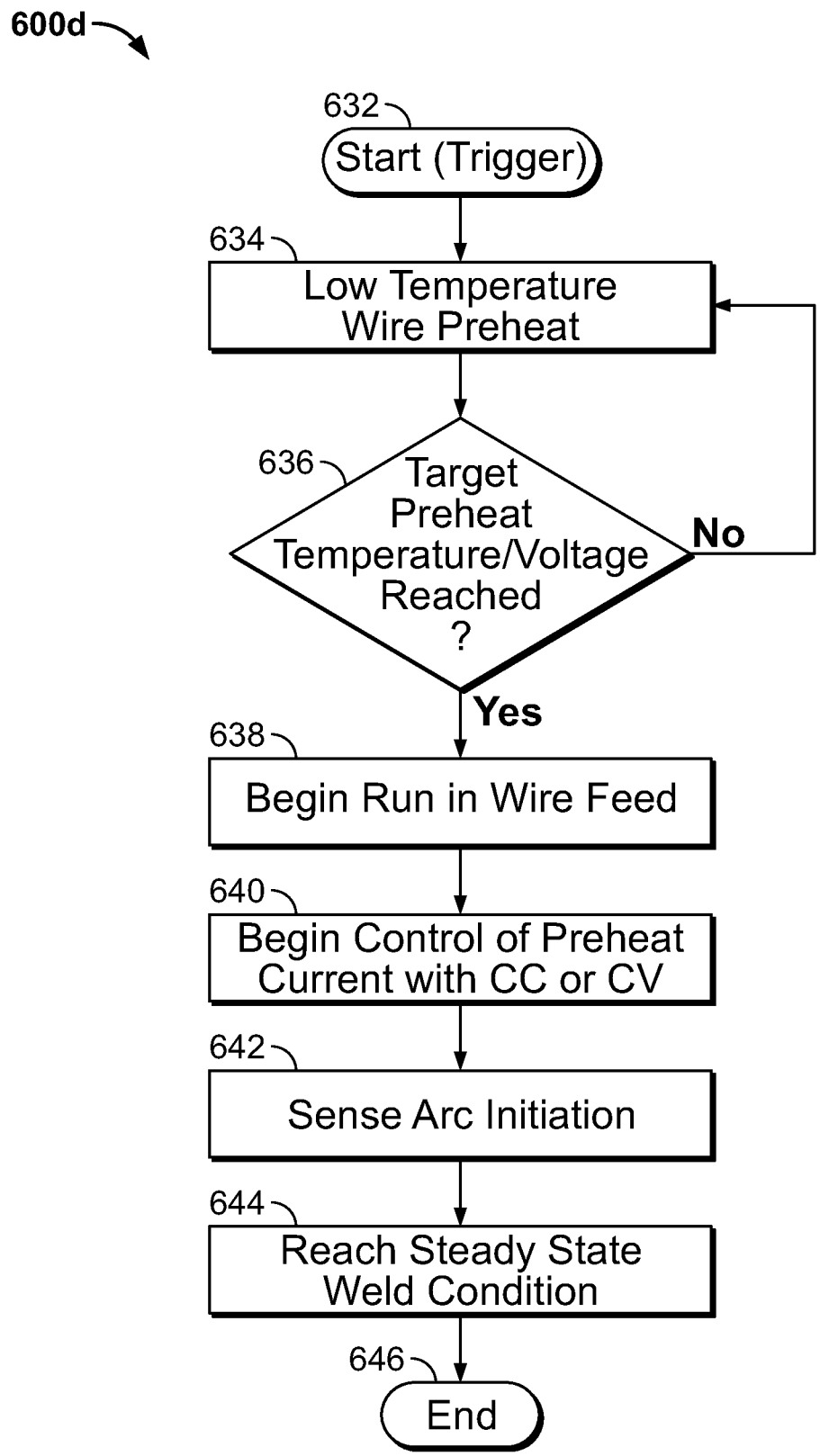
FIG. 6d illustrates a flow diagram of another example weld starting sequence.

With reference to FIG. 6d, an example weld starting process 600d corresponding to the timing diagram 600c of FIG. 6c may be initiated by actuating the trigger of the torch at block 632. At block 634, the welding equipment 110 performs a low temperature wire preheating. If the welding equipment 110 detects that the target wire preheat temperature and/or target preheat voltage is not reached at block 636, control returns to block 634. When the target wire preheat temperature and/or the target preheat voltage is reached at block 636, the welding equipment 110 beings a run-in wire feed at block 638. At block 640, the welding equipment 110 beings control of the preheat current using a voltage controlled weld control loop (e.g., constant voltage) and/or a current controlled weld control loop (e.g., constant current). At block 642, the welding equipment 110 detects initiation of the arc between the electrode wire 114 and weldment. At block 644, the welding equipment 110 reaches a steady state welding condition and WFS. The process may terminate at block 646 (e.g., upon releasing the trigger).

Figure 6E:
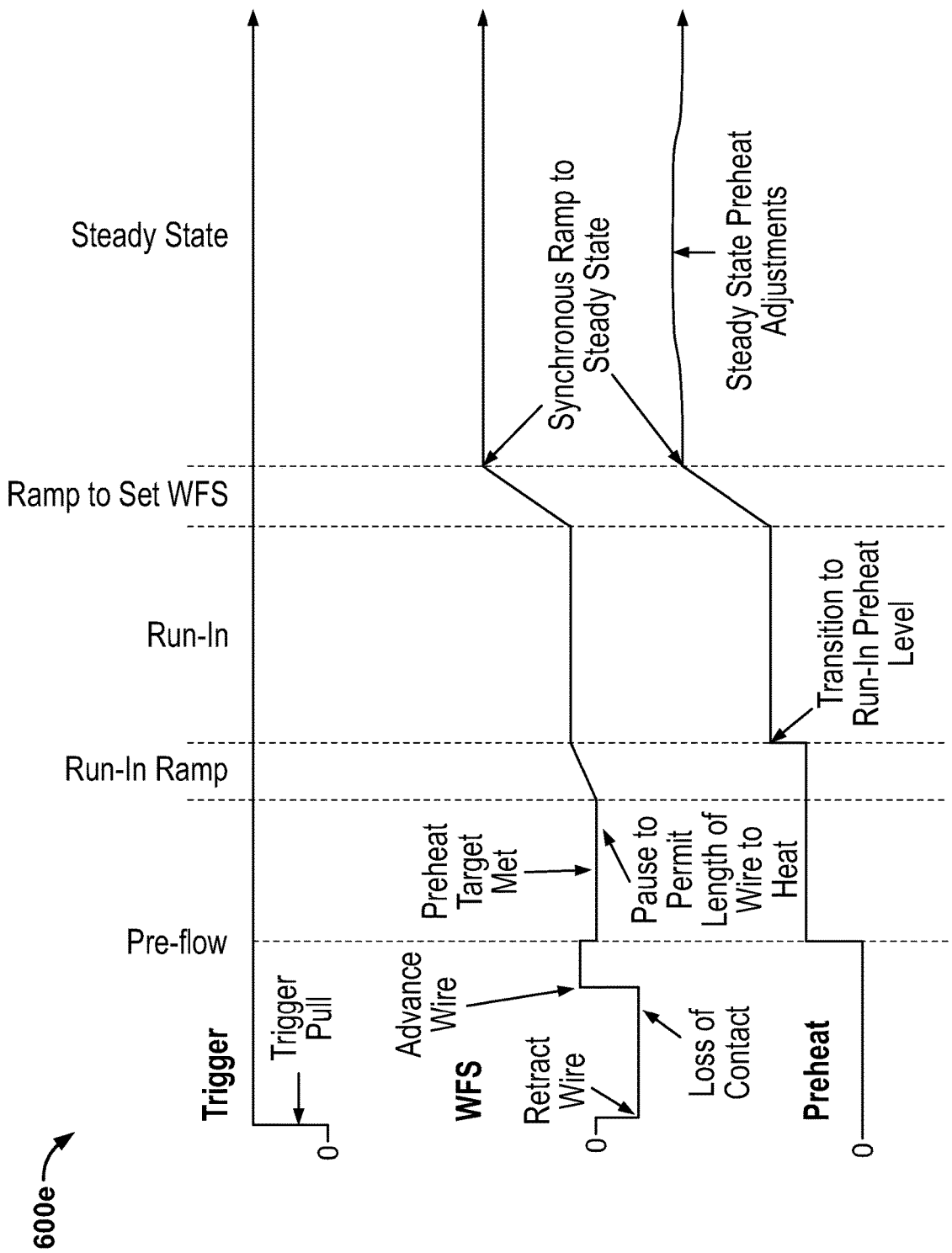
FIG. 6e illustrates another example timing diagram of the example weld starting sequence of FIG. 6b.

FIG. 6e illustrates an example timing diagram 600e of another example weld starting sequence. The timing diagram 600e and weld starting sequence of FIG. 6e is similar to the timing diagram 600a and starting sequence depicted in FIG. 6a, except that the timing diagram 600e illustrates a loss of contact between the wire and the first contact tip while retracting the wire prior to preheating, and then advancement of the wire to reestablish contact between the wire and the first contact tip.

Figure 6F:
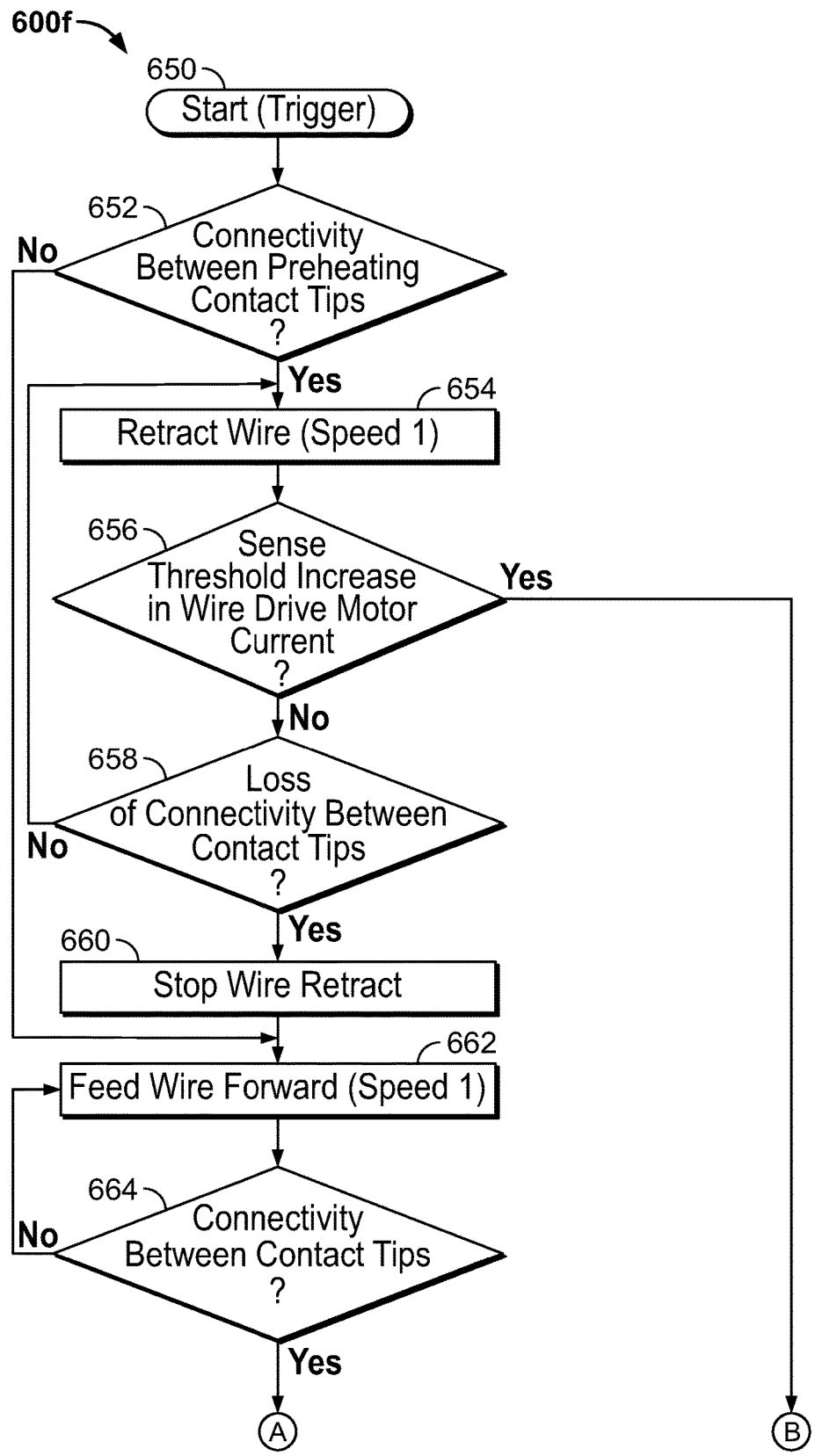
FIG. 6f illustrates a flow diagram of another example weld starting sequence.
Figure 6F:
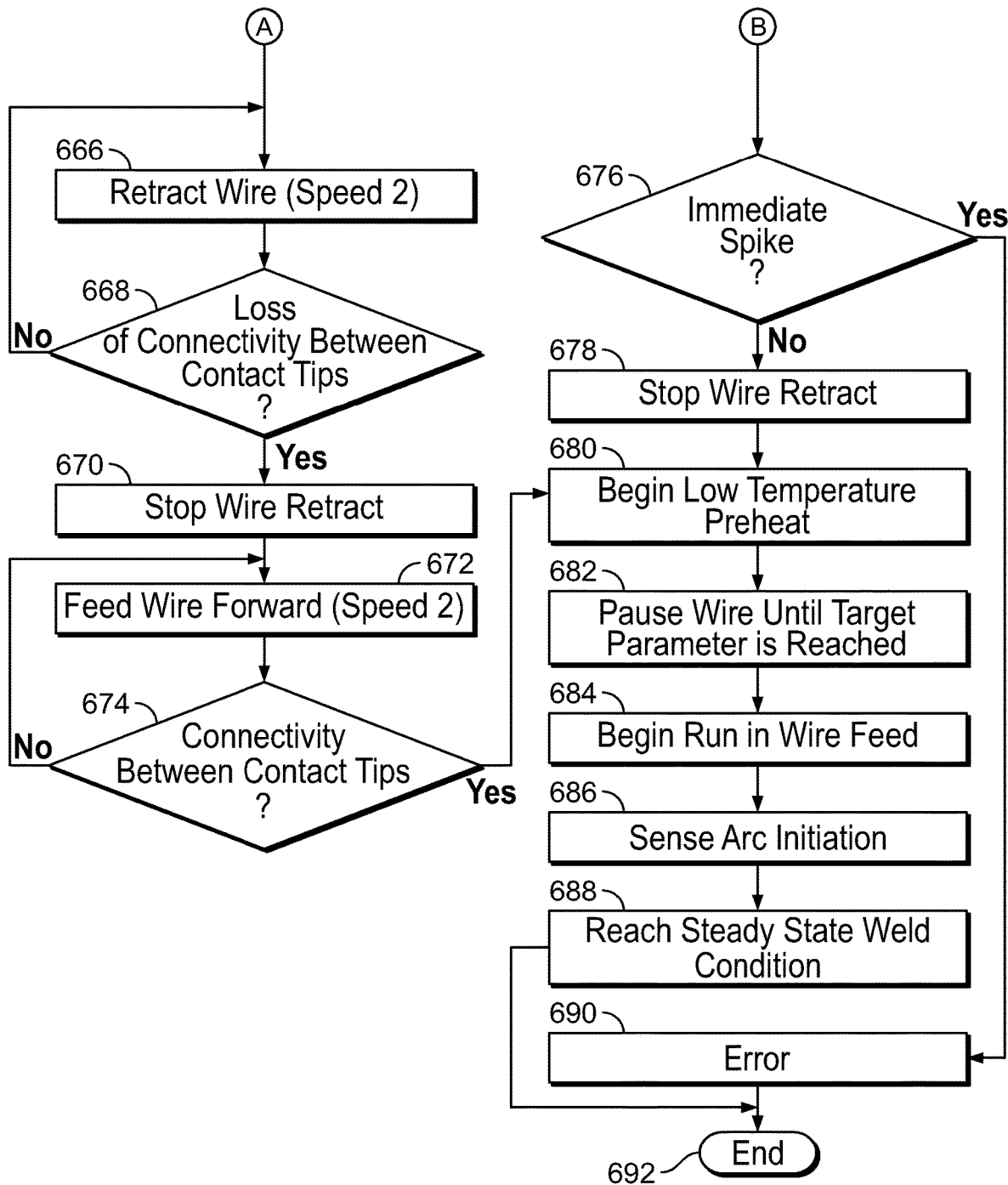

With reference to FIG. 6f, an example weld starting process 600f may be initiated by actuating the trigger of the torch at block 650. At block 652, the weld equipment 110 determines whether connectivity between the preheating contact tips is detected. If connectivity between the preheating contact tips is detected (block 652), at block 654 the welding equipment 110 retracts the wire at a first retraction speed (e.g., speed 1). At block 656, the welding equipment 110 determines whether a threshold increase in the wire drive motor current is sensed. If a threshold increase in the wire drive motor current is not sensed (block 656), at block 658 the welding equipment determines whether a loss in connectivity between the preheating contact tips is sensed. While a loss in connectivity between the preheating contact tips is not sensed (block 658), control returns to block 654 to continue retracting the wire. On the other hand, when a loss in connectivity between the preheating contact tips is sensed (block 658), the welding equipment 110 stops retracting the wire at block 660.

After stopping retraction of the wire (block 660), or if connectivity between the preheating contact tips is not detected (block 652), at block 662 the welding equipment feeds the wire forward at a first forward speed (e.g., speed 1). At block 664, the weld equipment 110 determines whether connectivity between the preheating contact tips is detected. If connectivity between the preheating contact tips is not detected (block 664), control returns to block 662 to continue feeding the wire.

When connectivity between the preheating contact tips is detected (block 664), at block 666 the welding equipment retracts the wire at a second retraction speed (e.g., slower than the first retraction speed). At block 668 the welding equipment determines whether a loss in connectivity between the preheating contact tips is sensed. While a loss in connectivity between the preheating contact tips is not sensed (block 668), control returns to block 664 to continue retracting the wire. On the other hand, when a loss in connectivity between the preheating contact tips is sensed (block 668), at block 670 the welding equipment stops the wire retraction.

At block 672, the welding equipment feeds the wire forward at a second feed speed (e.g., slower than the first feed speed). At block 674, the weld equipment 110 determines whether connectivity between the preheating contact tips is detected. If connectivity between the preheating contact tips is not detected (block 674), control returns to block 672 to continue feeding the wire.

When the welding equipment senses a threshold increase in the wire drive motor current (e.g., at least a threshold increase in the wire drive motor current) (block 656), at block 676, the welding equipment 110 determines whether the current spike is an immediate or rapid spike. For example, an immediate or rapid spike may be identified if the current increases at higher than a threshold slew rate, and/or if the current increases above a threshold current in less than a threshold time. If the current spike is an immediate or rapid spike (block 676), the welding equipment identifies an error at block 690. The process may terminate at block 692 (e.g., upon releasing the trigger or upon identifying an error at block 690).

If the current increase is not an immediate or rapid spike (block 676), at block 678 the welding equipment 110 stops the wire retraction.

After stopping the wire retraction (block 678) and/or after detecting connectivity between the contact tips (block 674), a low temperature preheat (e.g., low current preheat) is applied at block 680 to the electrode wire 114, which is stationary, between the two contact tips. At block 682, the welding equipment 110 pauses the forward feeding of the wire 114 until a target parameter (e.g., temperature, voltage, etc.) is reached. At block 684, the welding equipment 110 begins driving the electrode wire 114 at run-in speed while feeding it with a preheat current. At block 686, the welding equipment 110 detects initiation of the arc between the electrode wire 114 and weldment, after which the welding equipment 110 reaches a steady state welding condition and WFS at block 688.

Figure 7:
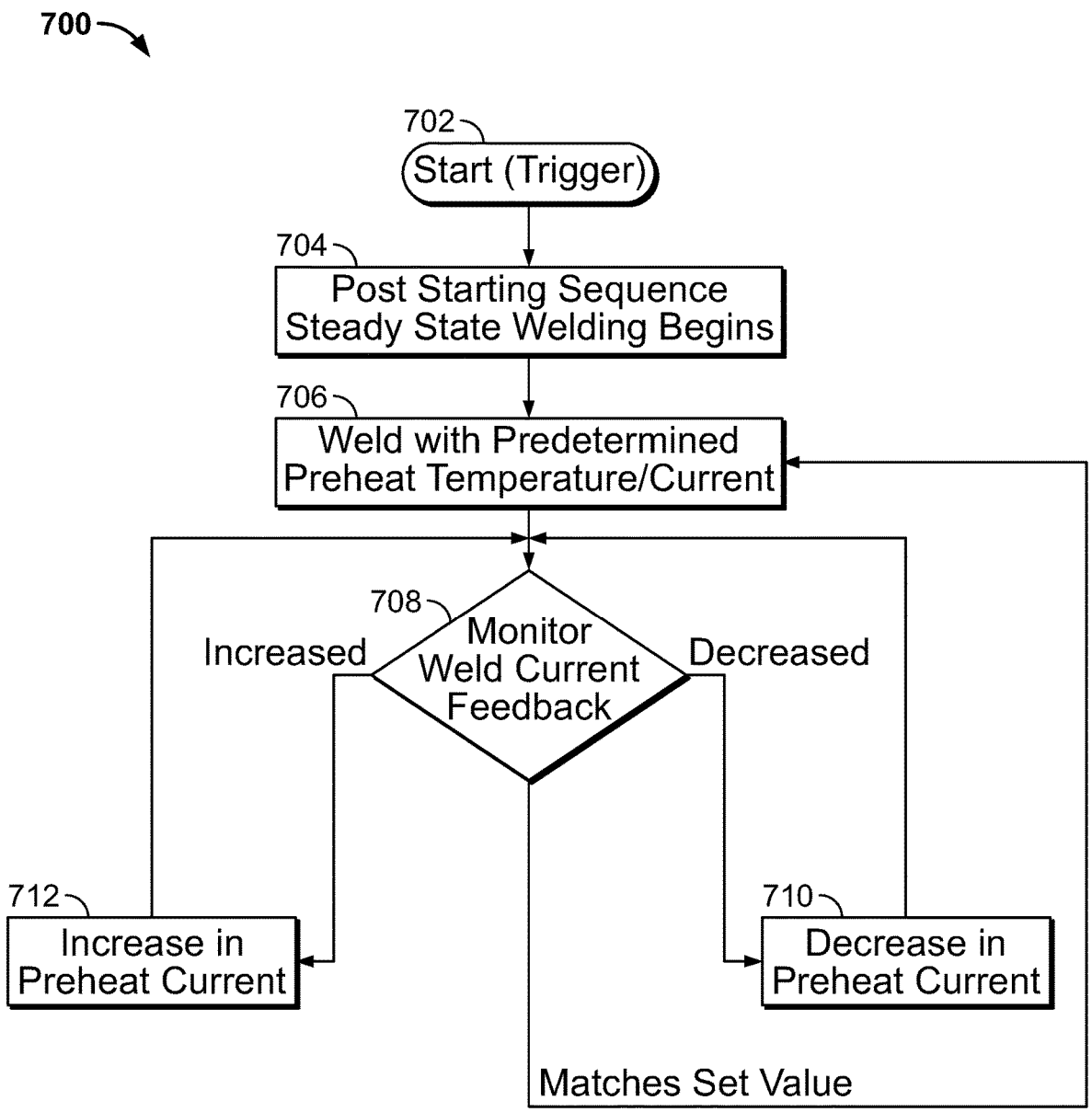
FIG. 7 illustrates a flow diagram of an example weld control scheme.

FIG. 7 illustrates a flow diagram 700 of an example weld control scheme. The resistive preheat welding process is monitored as to allow for a constant heat input process. In this process of welding, if something in the path of the arc causes the welding current to exceed a predetermined set current, the welding equipment 110 will adjust the preheat setting in order maintain the predetermined set current, thereby maintaining a constant heat output from the welding arc. A similar process may be done to account for a decreased welding current. The process may be adjusted for a constant penetration mode, whereby the welding current could be maintained while the preheat current is adjusted, allowing for a constant penetration depth. In one aspect, a synergic mode may be employed where the operator does not have to decide anything other than the ordinary welding parameters and the preheating condition would be fully synergic and self-adjusting. In other example modes the end user has some control of the preheating conditions taking place. In operation, the operator may set, for example, the desired preheat amount, the desired penetration level, the desired heat input level, etc.

With reference to FIG. 7, an example weld starting process 700 may be initiated by actuating the trigger of the torch at block 702. At block 704, the welding equipment 110 commences steady state welding (e.g., block 624 of FIG. 6b), which may occur after concluding starting sequence. At block 706, the welding equipment 110 welds with predetermined preheat temperature, current, voltage, impedance, power, and/or enthalpy. For example, a predetermined preheat temperature of 800 degrees Celsius. At block 708, the welding equipment 110 monitors weld current feedback to maintain the predetermined preheat temperature and/or current. If the weld current and/or voltage are too low, the welding equipment 110 decreases the preheat current at block 712. Conversely, if the weld current and/or voltage are too high, the welding equipment 110 increases the preheat current at block 710. The process continues until it is terminated upon, for example, releasing the trigger.

The welding system 100 may be configured with an arc ending routine, which allows for the elimination of microwelds from the contact tip to electrode wire 114. The ending routine may comprise one or more steps, including, for example, continuing wire movement, forward and/or reverse, after the welding arc 320 is extinguished. Thus, the wire feeder drives the electrode wire forward and/or reverses to feed the electrode wire for a predetermined period of time or predetermined distance after the welding arc 320 is extinguished as part of the arc ending routine. Additionally, the preheat current may also be ramped down (i.e., decreased) at a slower rate to avoid fast solidification inside the contact tip.

Creating preheating controls based off weld feedback and/or stickout distance, such as those used in the arc start and ending routines, reduces overall downtime that can result from over preheated wire feeding and welding issues, as well as make the system easier for end users to calibrate and use effectively.

Finally, the welding system 100 may be configured with an emergency shutdown routine (or procedure). In an emergency shutdown routine, energy may be managed upon emergency power loss to avoid breakage of the electrode wire 114 due to excessive preheating. For example, the preheat current may be shut off, or dropped down to a predetermined emergency preheat current value. Managing the arc outage routine (e.g., during, inter alia, an emergency shutdown routine) avoids electrode wire 114 jams and microweld formations in the outermost contact tip, thus resulting in decreased overall down time of the welding system 100 and a more forgiving process in general (e.g., permitting for increase deviation).

Referring to FIGS. 8a through 8d, the preheat power source 302b may be a low cost capacitor discharge type and the preheat is provided as a heat pulse train, for the purpose of providing a series of hot spots in the electrode wire 114 before it enters the contact tip 318. In another embodiment, the power source can be a switch-mode power supply capable of delivering a high narrow pulse (e.g. 1000 A for 1 ms). The purpose is to create a procession of preheated hot spots in the wire extension so that hot spot reaches liquidus temperature before the wire section that precedes it. Chunks of solid wire may be detached at the hot spot. This may improve the melt off rate significantly at the same average welding current. In implementation, the stored energy in the capacitor may discharge into a load with little circuit inductance, such as having the capacitor positioned near two contact tips. The capacitor charge circuit can be located away from the contact tip, such as, for example, packaged inside the wire feeder or main welding power supply with cables inside the torch composite cable to complete the circuit to the preheat energy storage device. One implementation is having contact tips 308 and 318 gapped 1 mm in between. This will create a very high but short current pulse to superheat a band of wire e.g. 1 mm length just before it enters the bottom tip, so the wire is fully supported to avoid buckle. After the hot spot exits the bottom tip, it will be further heated by extension resistive joule heating and eventually accumulates enthalpy and reaches melting point while the wire ahead has not. In one embodiment, the wire is fed at constant speed. In another embodiment, the wire feeding is momentarily stopped when the capacitor discharge takes place to prevent wire melting from contact resistance at a sliding physical contact with the contact tips 308 and 318.

The paragraphs below are related to using a capacitor discharge circuit to create an instantaneously high current spike, e.g. over 500 A, typically over 1,000 A or over 5000 A but very quick, e.g. less than 1 millisecond, typically tens of microseconds. Referring to FIG. 6a, a capacitor bank is located very close to the torch body, possibly at rear end of the torch body itself so that the parasitic inductance to the contact tips is minimized. The capacitor(s) are charged to hold energy by a charging circuit. A semiconductor switch, e.g. SCR, will discharge the stored energy into the contact tips so that the wire between the tips are "super-heated" and creating a hot spot. As the pre-heated hot spots pass through the bottom tip and continue to be heated up by the extension joule heating, as they approach the arc. It is possible that hot spot closest to the arc can melt before the solid wire ahead of it, and the liquid is squeezed by Lorentz force of the welding current, and "chunk" of un-melted wire may fall off into the puddle. This will greatly increase the deposition rate.

Figure 8A:
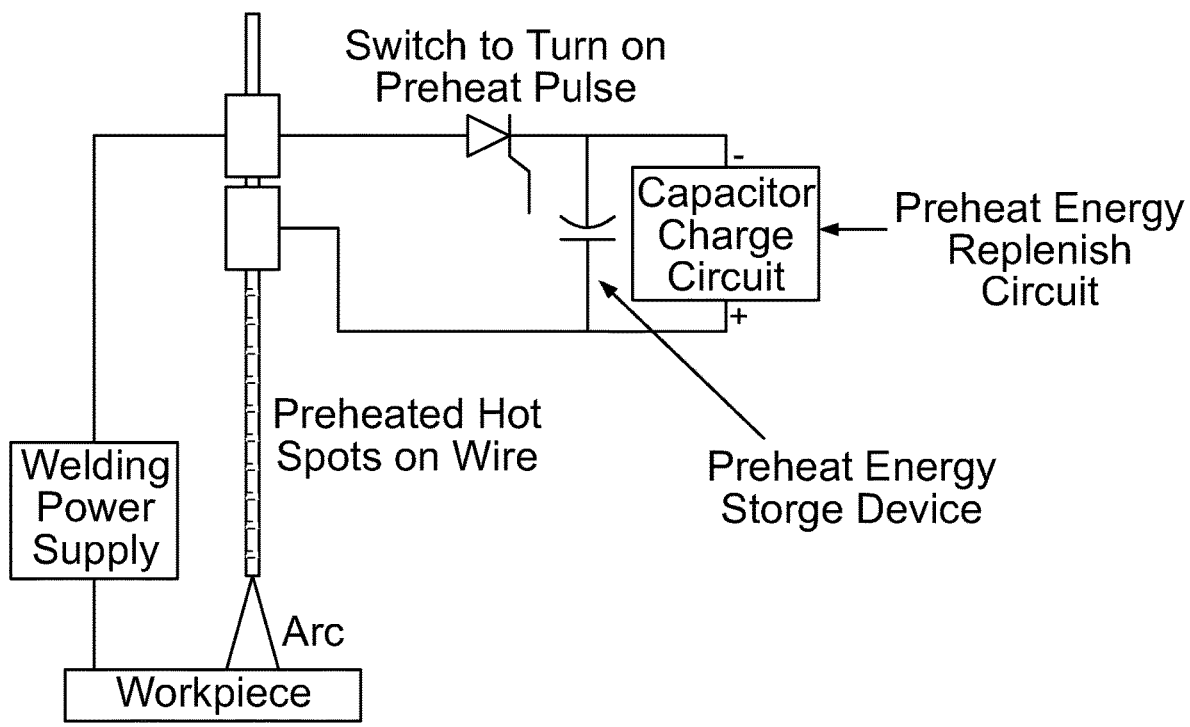
FIGS. 8a through 8d illustrate example pulsed preheat power supplies that can create a pattern of preheated hot spots on the wire.
Figure 8B:
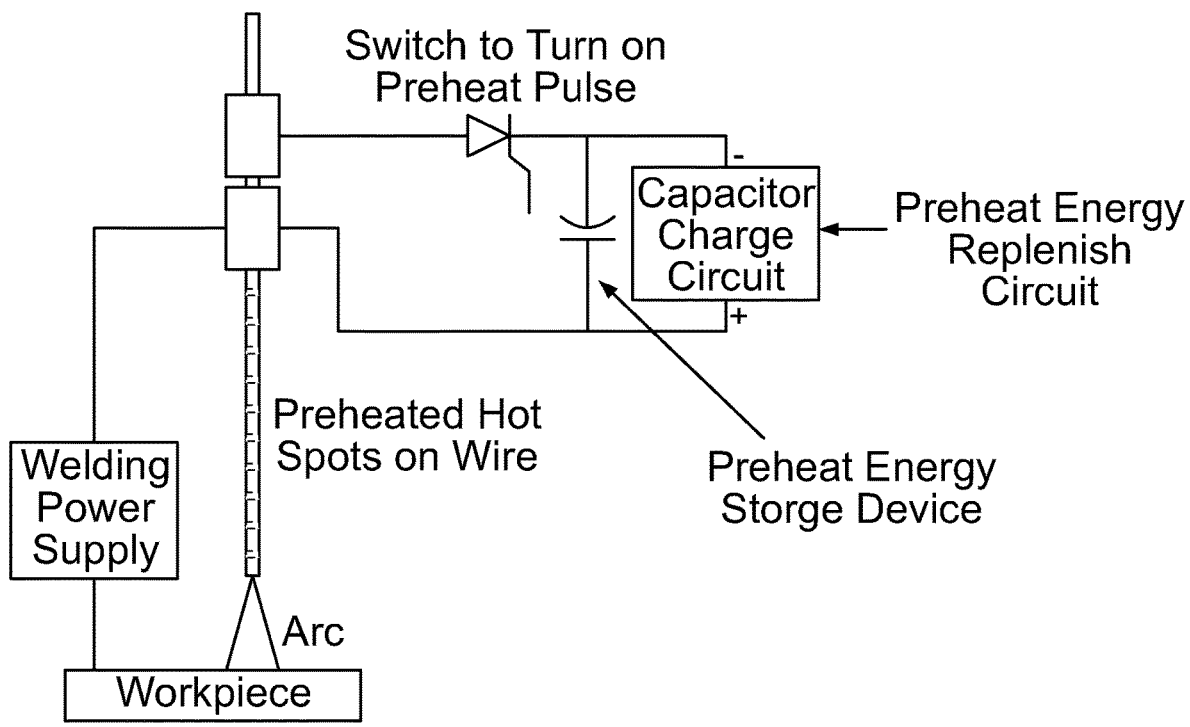
Figure 8C:
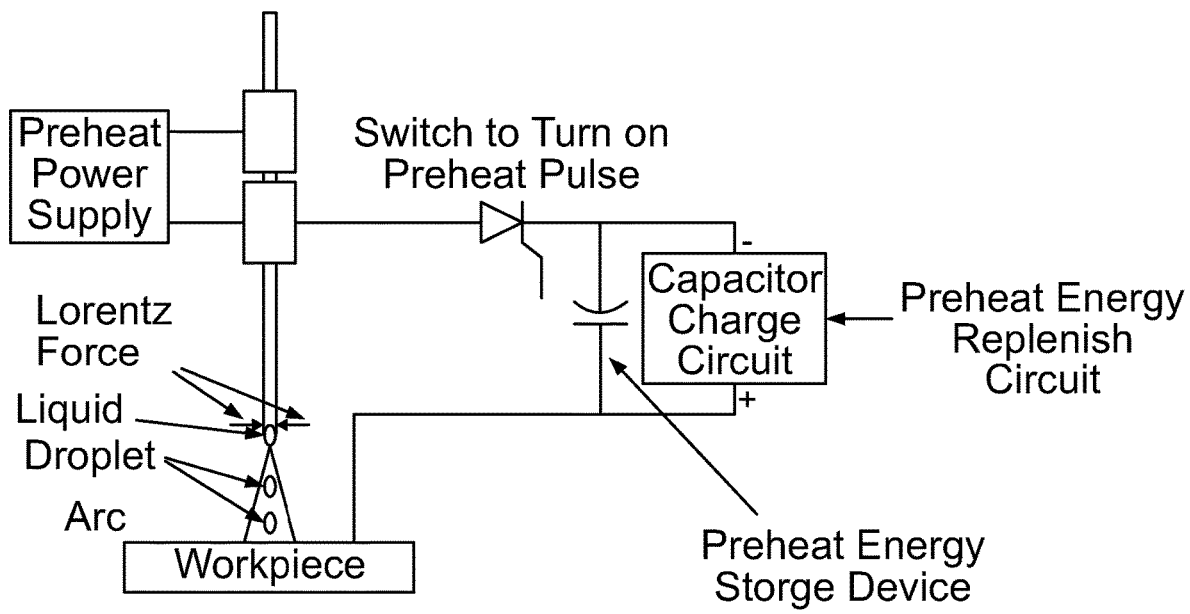
Figure 8D:
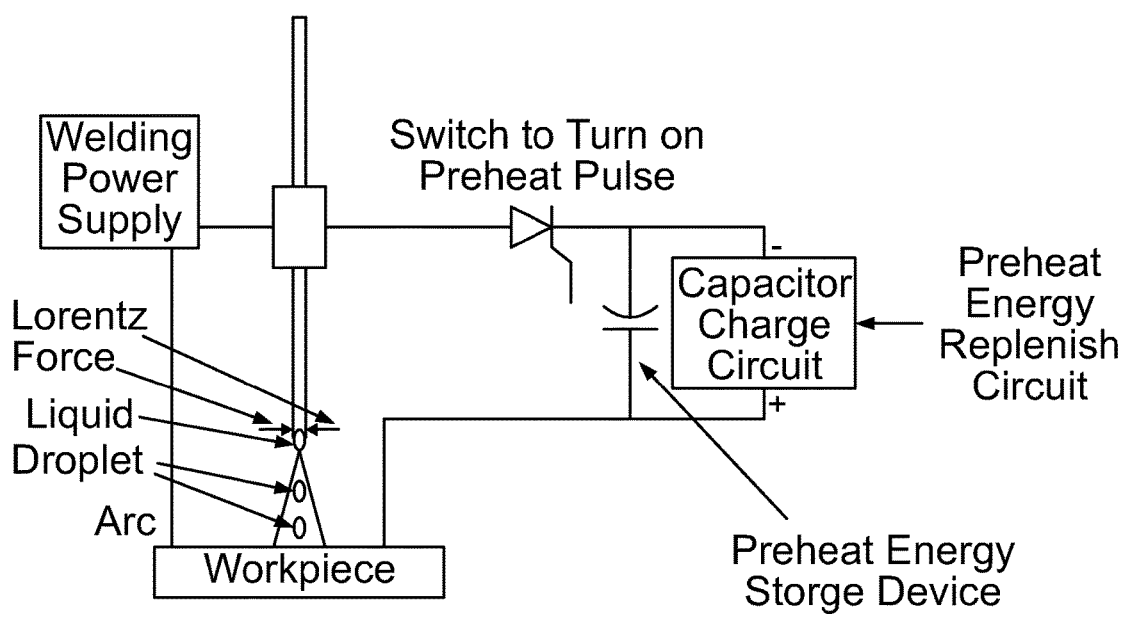

Referring to FIG. 8b. The power supply is connected to the bottom tip instead of the top tip. This may minimize interference between the welding circuit and the capacitor discharge circuit. Referring to FIG. 8c, the preheat power source may be a DC, or AC supply with CV, CC, or constant power output, essentially elevating the wire to approach a percent of but below the melting temperature. Referring to FIG. 8c and FIG. 8d, the capacitor discharge circuit serves as a pulse welding power supply but at a much higher peak current level to create a very large Lorentz force to squeeze the liquid at the end of the wire extension just before it reaches the arc. The timing of discharging the cap is important, ideally catching the liquid at the end of the wire extension during its down-swing (in oscillation). Referring to FIG. 8d, it only needs one tip and both power supplies connect to the same tip. This may simplify the design. The welding power supply may be a constant current, constant voltage or a DC pulse output. In case of pulse output from the welding power supply, the capacitor discharge circuit discharge at the end of the pulse. During the welding pulse, the liquid at the end of the wire extension is growing in size, so that the end of the weld pulse, a very high current peak is applied with large Lorentz force for liquid detachment. Another scenario is the welding pulse is a series of small pulses, but the last pulse incorporates the capacitor discharge super pulse for detachment.

Again referring to FIGS. 8c and 8d, the capacitor discharge circuit may facilitate an arc start. During the arc start sequence, the preheat energy storage capacitor(s) may be precharged and the switch is turned on, as the wire is fed towards the workpiece at run-in speed. Upon first contact between the wire and the workpiece, the capacitor(s) may discharge through the imperfect contact and its high contact resistance. The quick rise of current from the discharge results in a crisper and more reliable arc start than that from demanding high current from the welding power supply overcoming the weld cable inductance.

In another embodiment, the contact tip may be positioned before the gooseneck, while a high temperature, but electrically insulating liner, may be embedded inside the gooseneck for guiding the wire towards the front end of the gun. This may create a very long wire extension (essentially the entire linear gooseneck length) for wire extension heating, without the trouble of loss of gas shielding, wire flip etc. associated with conventional long extension welding. Yet another embodiment may be to use a copper shoe shaped interior of the gooseneck for passing welding current, not on the single spot as in conventional contact tube (hole), but gradually over a sliding curved surface so that the welding current is passed from the copper shoe gradually over to the welding wire (with infinite spots).

In some other examples, the second contact tip 308 is positioned inside the wire feeder ahead of the power pin of the torch, which conducts welding current to the first contact tip 318 near the arc, so that the wire is preheated for the entire length of the welding torch between the feeder and the first contact tip 318 at low preheat current. The wire is gradually warmed as the wire is conveyed from the feeder towards the front of the torch.

Figure 9C:
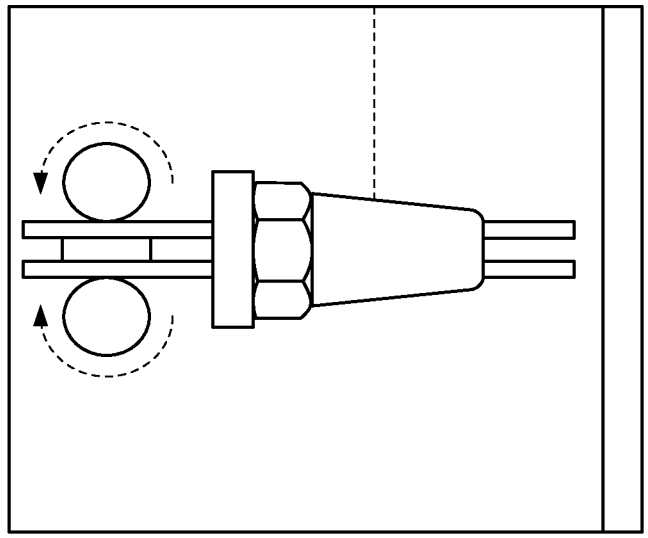
FIGS. 9a through 9c illustrate a preheat torch various wire configurations.
Figure 9B:
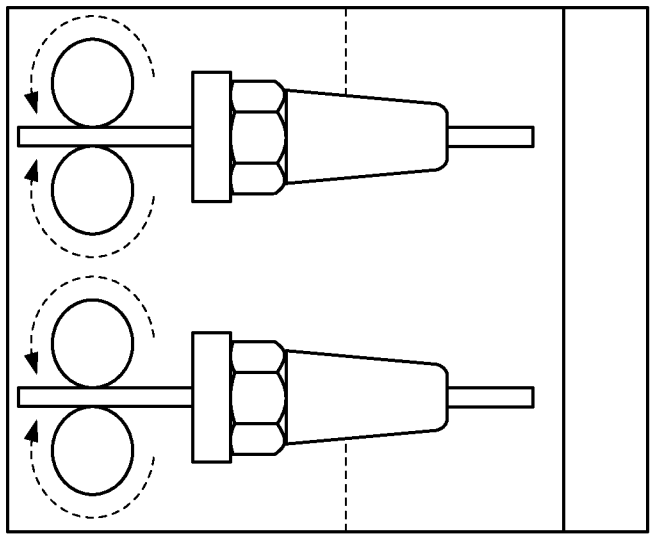
Figure 9A:
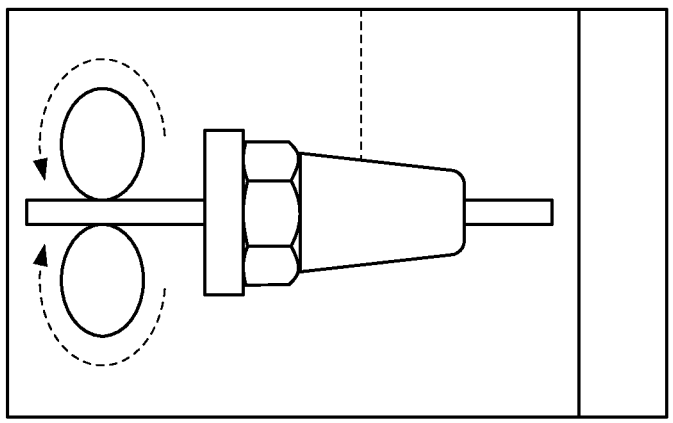

As illustrated in FIGS. 9a through 9c, the preheat torch can be used in combination with a submerged arc power supply in a single preheated wire, a tandem preheated wire (two power sources), and/or a twin preheated wire configuration (one power source). For example, FIG. 9a illustrates a submerged arc (SAW) power supply in a single preheated wire configuration. The wire may be preheated with CV AC, CV EP, CV EN, CV+C AC, CV+C EP, CV+C EN, CC AC, CC EP, CC EN, CC+V AC, CC+V EP, and/or CC+V EN. FIG. 9b illustrates a submerged arc power supply in a tandem preheated wire configuration. Wire could be used in a standard SAW configuration or any variation of the previously mentioned. The wire may be preheated with CV AC, CV EP, CV EN, CV+C AC, CV+C EP, CV+C EN, CC AC, CC EP, CC EN, CC+V AC, CC+V EP, and/or CC+V EN. In certain aspects, 1 wire may be preheated and one normal (Front-Back wires). Moreover, different polarity combinations may be employed for each wire (EP, EN, AC, CV+C, CC+V). One example tandem SAW configuration in FIG. 9b for certain applications is that the lead arc is DCEP on unheated solid wire for penetration, and the trail arc is DCEN on resistively preheated metal core wire for deposition. Finally, FIG. 9c illustrates a submerged arc power supply in a single preheated wire configuration. The wire may be preheated with CV AC, CV EP, CV EN, CV+C AC, CV+C EP, CV+C EN, CC AC, CC EP, CC EN, CC+V AC, CC+V EP, and/or CC+V EN.

Figure 10B:
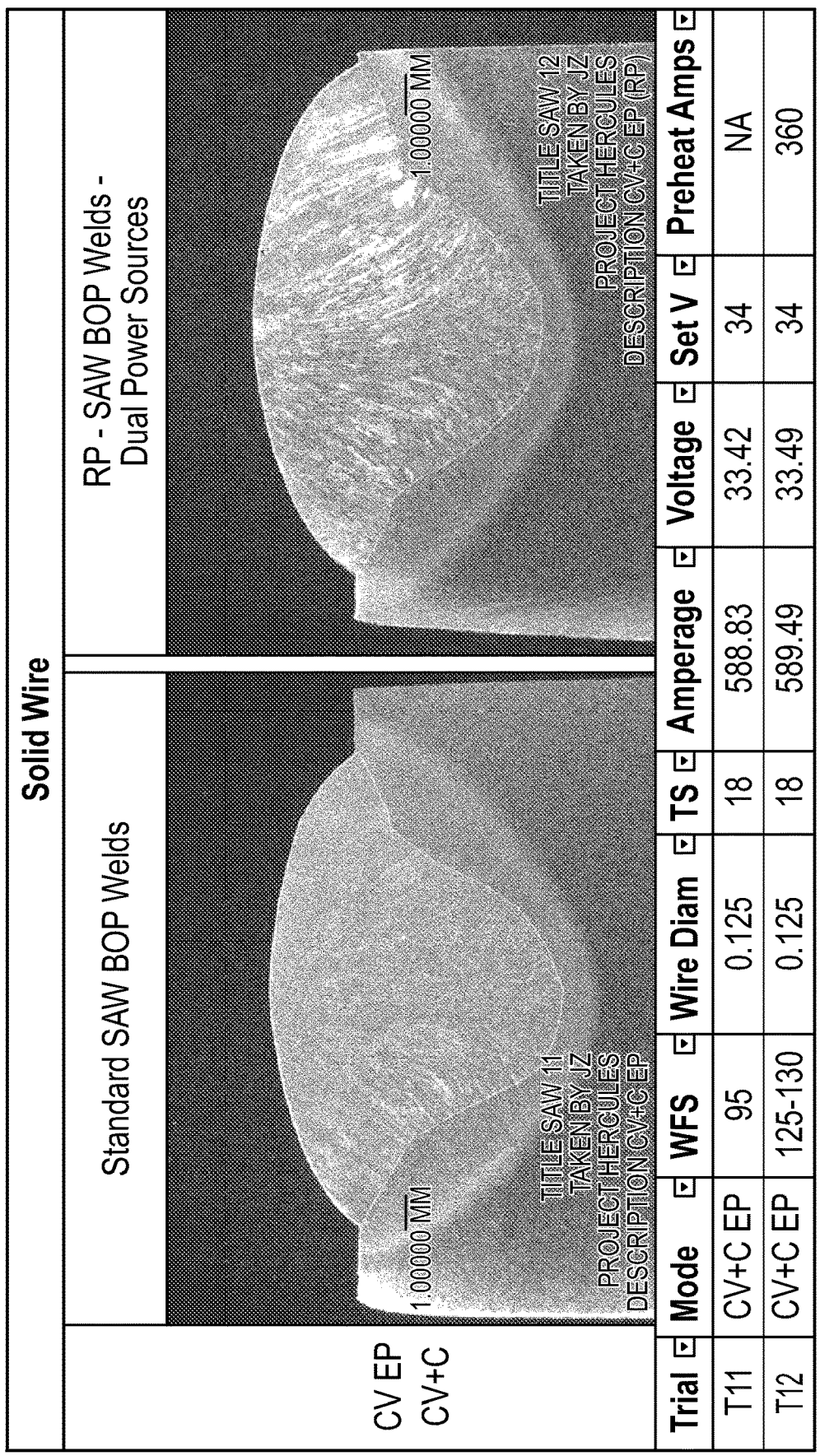

Results of testing in CV EP, EN, and AC are summarized in FIGS. 10a and 10b. The results demonstrate a reduction in heat input and/or a gain in deposition of roughly 20-30% in most cases. The results also demonstrate a reduction in penetration as the heat input decreased (shown in FIG. 10a). The results of the testing EP, EN, and AC in the CV+C mode showed 20-25% gains in deposition as the wire feed speed was increased to maintain a desired amperage. The penetration in this case was nearly identical to the non-preheated weld of the same amperage (i.e., FIG. 10b). Testing in all scenarios was done with both metal core and solid welding wire. Weld tests also show that disclosed example resistive preheating systems can produce the effect of heat input reduction/deposition increase equivalent to an electrical stickout of 5 inches or greater.

FIG. 11 illustrates a functional diagram of another example contact tip assembly 1100. The contact tip assembly 1100 is similar to the assembly 206 illustrated in FIG. 3. The assembly 1100 includes the power supply 302a to provide the welding power to the electrode wire 114 (e.g., for generating the welding arc 320 or other welding power transfer). The assembly 1100 also includes the power supply 302b to generate a preheat current to heat the electrode wire 114.

The assembly includes the first contact tip 318 and the second contact tip 308. The preheating power supply 302b has the same electrical connections to the second contact tip 308 and the first contact tip 318 as described above with reference to FIG. 3. Instead of the welding power supply 302a being electrically connected to the first contact tip 318 (e.g., via the positive polarity connection) and the workpiece 106 (e.g., via the negative polarity connection) illustrated in FIG. 3 above, the welding power supply 302a is electrically connected to the second contact tip 308 via the positive polarity connection and to the workpiece 106 via the negative polarity connection.

In the example assembly of FIG. 11, the preheat power supply 302b provides preheating current to the portion of the electrode wire 114 between the contact tips 308, 318, which may occur before welding and/or during welding. In operation, the welding power supply 302a provides the welding current to support the arc 320. In the configuration of FIG. 11, the energy provided by the welding power supply 302a also preheats the electrode wire 114 between the second contact tip 308 and the arc 320. In some examples, the preheat power supply 302b provides power to preheat the electrode wire 114 in conjunction with the energy provided by the welding power supply 302a, thereby reducing the power to be delivered by the welding power supply 302a.

Figure 12:
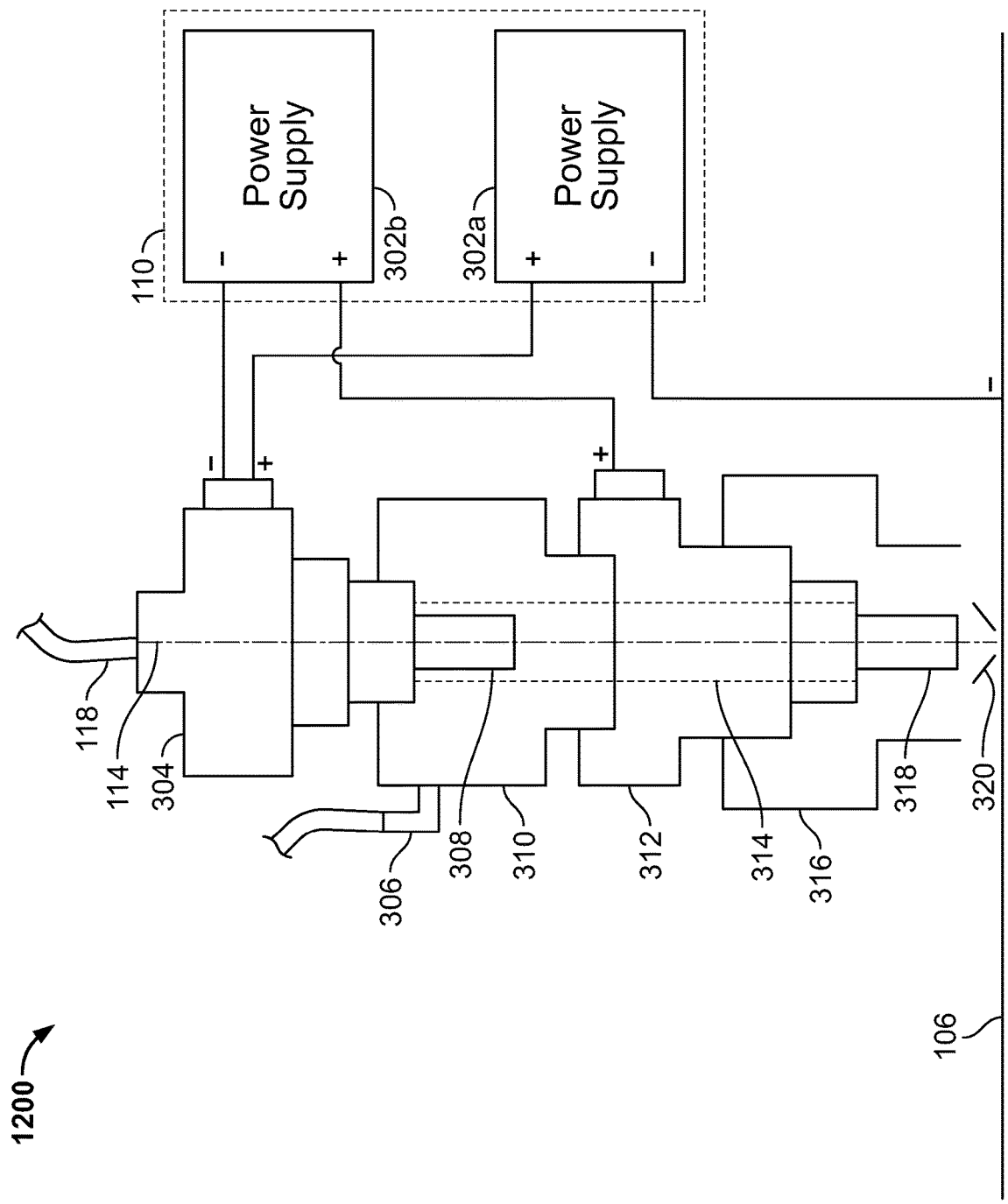
FIG. 12 illustrates a functional diagram of another example contact tip assembly in which the electrical connections between preheat power supply and the contact tips are reversed relative to the connections in FIG. 11.

FIG. 12 illustrates a functional diagram of another example contact tip assembly 1200. The assembly 1200 is similar to the assembly 1100 of FIG. 11. However, the electrical connections between preheat power supply 302b and the contact tips 308, 318 are reversed relative to the connections in FIG. 11. In other words, the preheating power supply 302b is electrically connected to the second contact tip 308 via the negative polarity connection and is electrically connected to the first contact tip 318 via the positive polarity connection.

In the example assembly 1200, the power supply 302b may provide preheating power to the portion of the wire between the contact tips 308, 318 while the welding power supply 302a is not providing power (e.g., while not welding). When the welding power supply 302a provides the welding power to the assembly 1200, the preheat power supply 302b is switched off and/or used to reduce a portion of the welding power provided by the welding power supply 302a to control preheating of the electrode wire 114 by the welding power supply 302a.

Figure 13:
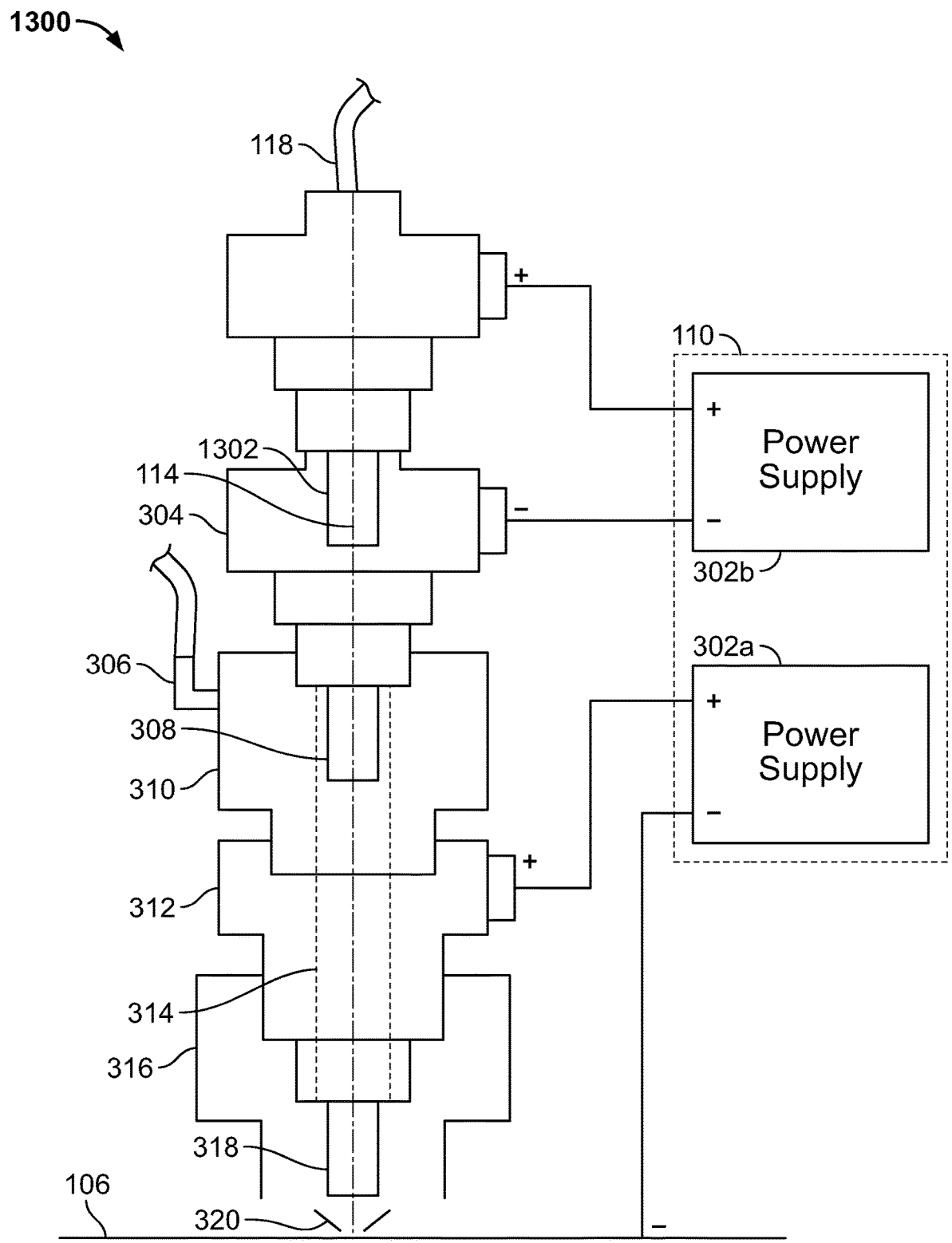
FIG. 13 illustrates a functional diagram of another example contact tip assembly in which the power supply provides the welding power to the electrode wire.

FIG. 13 illustrates a functional diagram of another example contact tip assembly 1300. The assembly 1300 includes the power supply 302a to provide the welding power to the electrode wire 114 (e.g., for generating the welding arc 320 or other welding power transfer). The assembly 1300 also includes the power supply 302b to generate a preheat current to heat the electrode wire 114. The welding power supply 302a is electrically connected to the first contact tip 318 (e.g., via the positive polarity connection) and the workpiece 106 (e.g., via the negative polarity connection).

In the assembly 1300 of FIG. 13, the preheating power supply 302b is electrically connected to the electrode wire 114 such that the welding current provided by the power supply 302a is not superimposed on the wire with the preheating current provided by the preheat power supply 302b. To this end, the example assembly 1300 includes a third contact tip 1302, to which the preheat power supply 302b is electrically connected. While FIG. 13 illustrates an example in which the preheating power supply 302b is electrically connected to the third contact tip 1302 via the positive polarity connection and is electrically connected to the second contact tip 308 via the negative polarity connection, in other examples the polarities of the connections are reversed.

Figure 14:
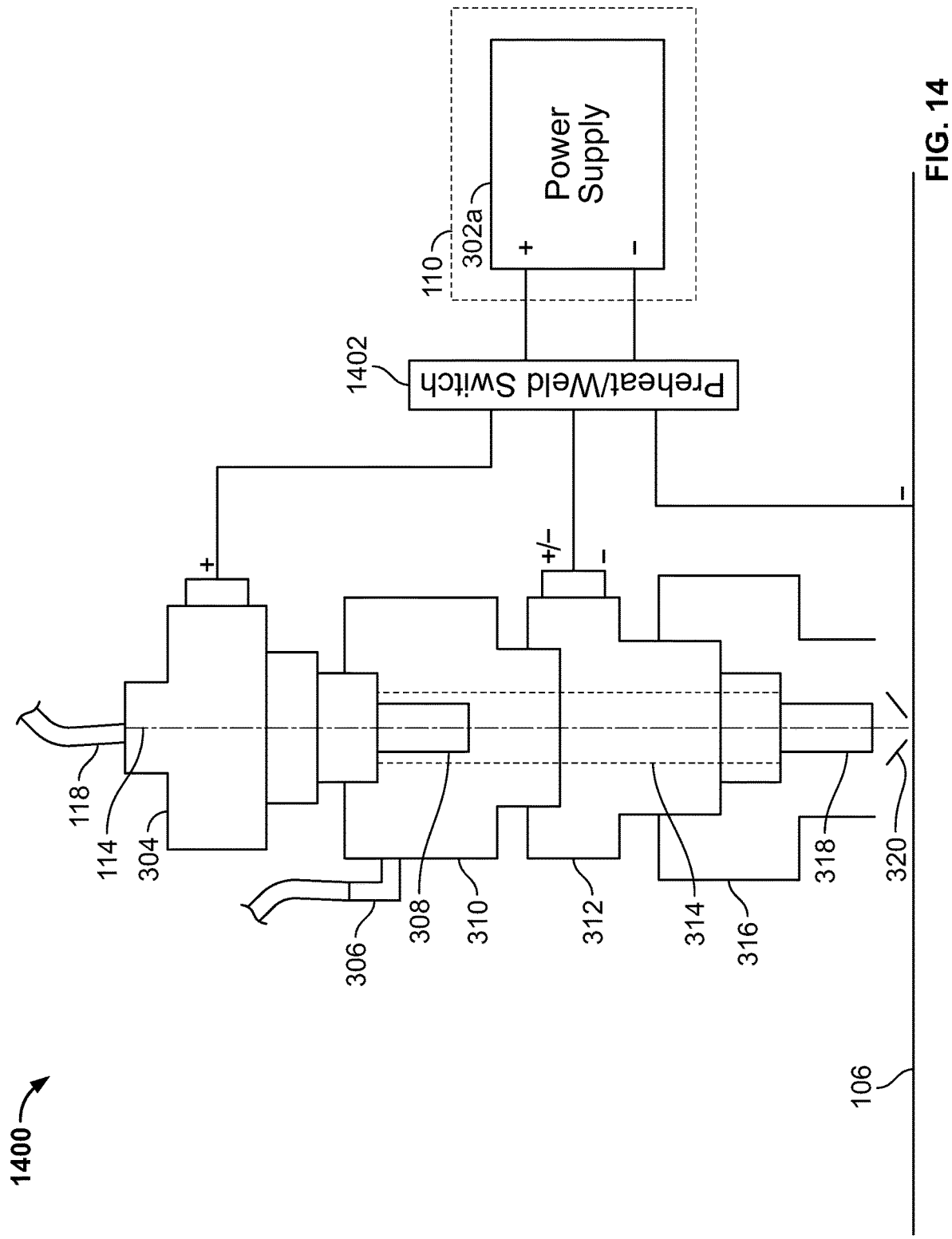
FIG. 14 illustrates a functional diagram of another example contact tip assembly in which a single power supply that provides both preheating power and welding power to the electrode via the first contact tip and/or the second contact tip.

FIG. 14 illustrates a functional diagram of another example contact tip assembly 1400. The assembly 1400 includes a single power supply that provides both preheating power and welding power to the electrode wire 114 via the first contact tip 318 and/or the second contact tip 308. To control the direction of preheating and/or welding power to the contact tips 308, 318, the assembly 1400 includes a preheat/weld switch 1402. The preheat/weld switch 1402 switches the electrical connections between the welding power supply 302a and the first contact tip 318, the second contact tip 308, and/or the workpiece 106.

The welding power supply 302a provides preheating to the electrode wire 114 by, for example, controlling the preheat/weld switch 1402 to connect the positive polarity terminal of the welding power supply 302a to one of the contact tips 308, 318 and to connect the negative polarity terminal of the welding power supply 302a to the other of the contact tips 308, 318. The welding power supply 302a provides welding to the electrode wire 114 by, for example, controlling the preheat/weld switch 1402 to connect the positive polarity terminal of the welding power supply 302a to one of the workpiece 106 or one of the contact tips 308, 318 and to connect the negative polarity terminal of the welding power supply 302a to the other of the workpiece 106 or one of the contact tips 308, 318 (e.g., based on whether DCEN or DCEP is being used).

If the preheat/weld switch 1402 connects one of the terminals of the welding power supply 302a to the second contact tip 308 and connects the other of the terminals of the welding power supply 302a to the workpiece 106, the welding current supplied by the welding power supply 302a also provides preheating to the electrode wire 114. In some examples, the preheat/weld switch 1402 alternates between connecting the welding power supply 302a to a first set of electrical connections for preheating the electrode wire 114 (e.g., connecting to the contact tips 308, 318), to a second set of electrical connections for welding (e.g., connecting to the workpiece 106 and the first contact tip 318), and/or to a third set of electrical connections for simultaneously preheating the electrode wire 114 and welding (e.g., connecting to the workpiece 106 and the second contact tip 308).

Figure 15:
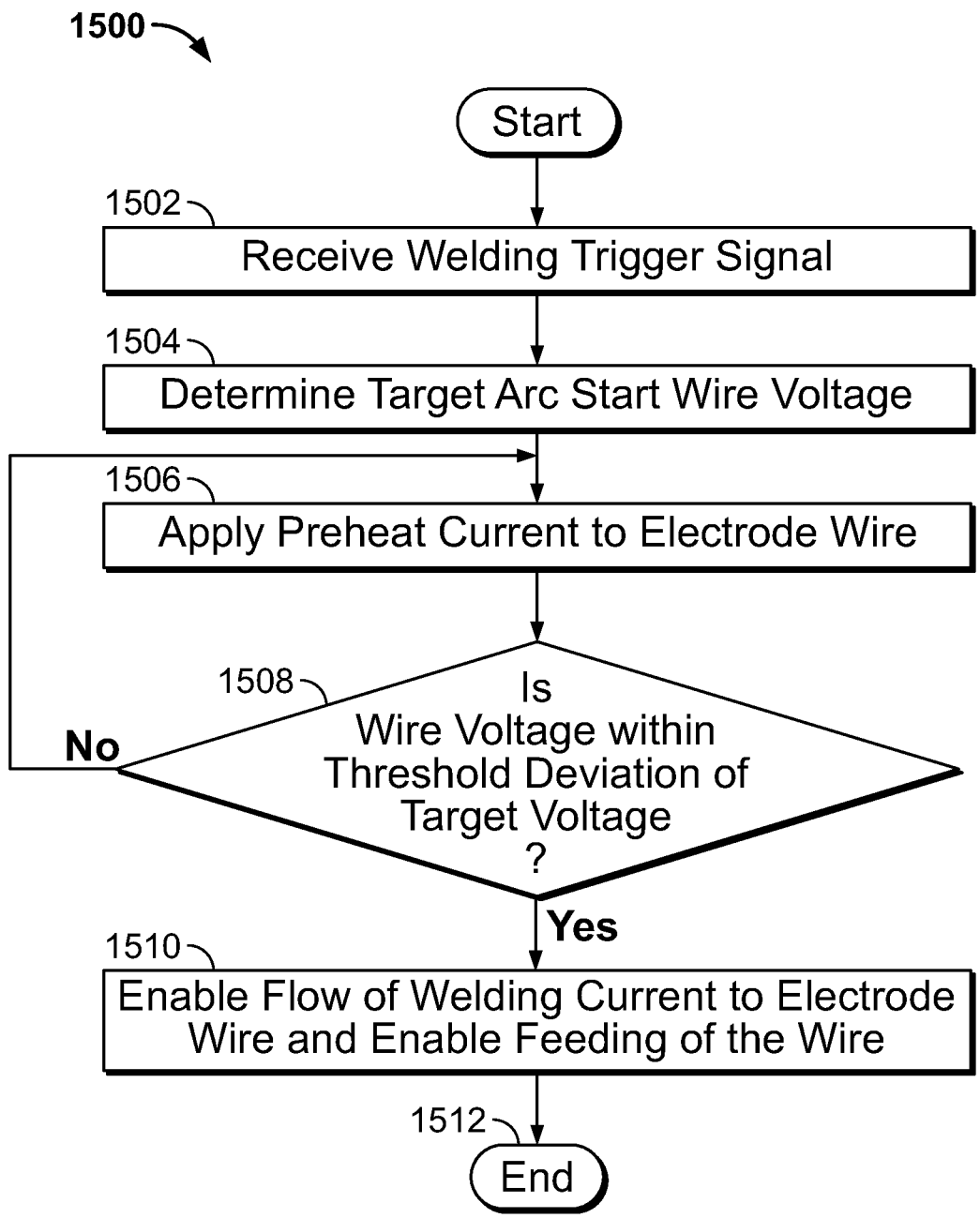
FIG. 15 is a flowchart illustrating an example method to use resistive preheating to improve arc initiation for welding.

FIG. 15 is a flowchart illustrating an example method 1500 to use resistive preheating to improve arc initiation for welding. The method 1500 may be used with any of the example assemblies 206, 1100, 1200, 1300, 1400 of FIG. 2, 11, 12, 13, or 14. In general, the example method 1500 preheats the electrode wire 114 and verifies that the electrode wire 114 it is at an elevated temperature before touching the workpiece to initiate an arc (e.g., via an operator, an automated system, etc.). When the electrode wire 114 has a higher temperature, arc initiation may be easier because the initial contact resistance is typically higher.

The method 1500 starts at block 1502 in response to, for example, activating the welding system 100 or receiving a trigger signal requesting that the welding system 100 provide a welding current to the electrode wire 114. At block 1504, the welding system 1000 determines a target arc start voltage threshold (e.g., corresponding to a temperature to which the electrode wire 114 is to be preheated prior to an arc initiation). At block 1506, the welding system 100 applies preheat current to the electrode wire 114 (e.g., via the welding power supply 302*a* and/or the preheat power supply 302*b*).

At block 1508, the welding system 100 determines whether the electrode wire voltage is within a threshold deviation of the target arc start preheat temperature. For example, the welding system 100 may measure or infer the electrode wire temperature using a sensor and/or a thermal model. If the electrode wire temperature is not within a threshold deviation of the target arc start voltage (block 1508), the method 1500 returns to block 1506 to continue applying preheat current to the electrode wire 114. Additionally, the method 1500 does not permit the advancement of the wire. The wire voltage is indicative of a resistance in the wire, which is also indicative of the preheat temperature of the wire. When the electrode wire temperature is within a threshold deviation of the target arc start voltage (block 1508), the system 100 enables flow of welding current to the electrode wire 114 (e.g., enables welding). At block 1512, the method 1500 ends.

Some examples involve using a preheated electrode wire to perform one or more pre-weld passes to lay down filler material in a joint to be welded (e.g., to lay down metal in a joint first as "pre-deposit" without an arc). After the pre-deposit pass(es), examples include performing one or more pass(es) with the arc (e.g., TIG and/or MIG), plasma, and/or laser to melt the pre-deposit material into the joint to perform the weld. In other words, the pre-deposit material may be laid down like a hot and soft "glue" with skin depth adherence to the workpiece, which may be performed with or without weave patterns. The joint could be a square joint, a butt joint, a groove joint, a fillet joint, or any other type of joint. The pre-deposit pass(es) and the welding pass(es) may be alternated, for multi-pass welding. Additionally or alternatively, the pre-deposit pass(es) and/or the welding pass(es) can have uneven numbers (e.g., lay down 2 pre-deposit pass then 1 weld pass). The pre-deposit passes can be performed using different weave patterns between pre-deposit passes (e.g., one pre-deposit pass on the left, one on the right, then a big weave of welding pass to melt both pre-deposit passes). The welding pass(es) may be performed with or without filler metal. If the welding pass(es) are performed without filler metal (e.g. TIG, plasma, and/or laser), the pre-deposit and welding operations may be done at different stations having a physical separation between the deposition step and the weld step, which enables improved process control, production flexibility, less distortion, and/or less base metal dilution. In some examples, the electrode wire that is resistively preheated by two adjacently positioned contact tips is used to deposit preheated filler metal directly into a melt pool on the workpiece created by laser, electron beam or plasma arc.

In some examples, the electrode wire preheating methods and systems disclosed herein are used in combination with spin arc for submerged arc applications to improve material deposition and/or weld speed. Additionally, spatter that is typically associated with spin arc techniques are contained under the flux used for submerged arc welding, enabling an improved weld bead appearance and adequate weld penetration.

Figure 16:
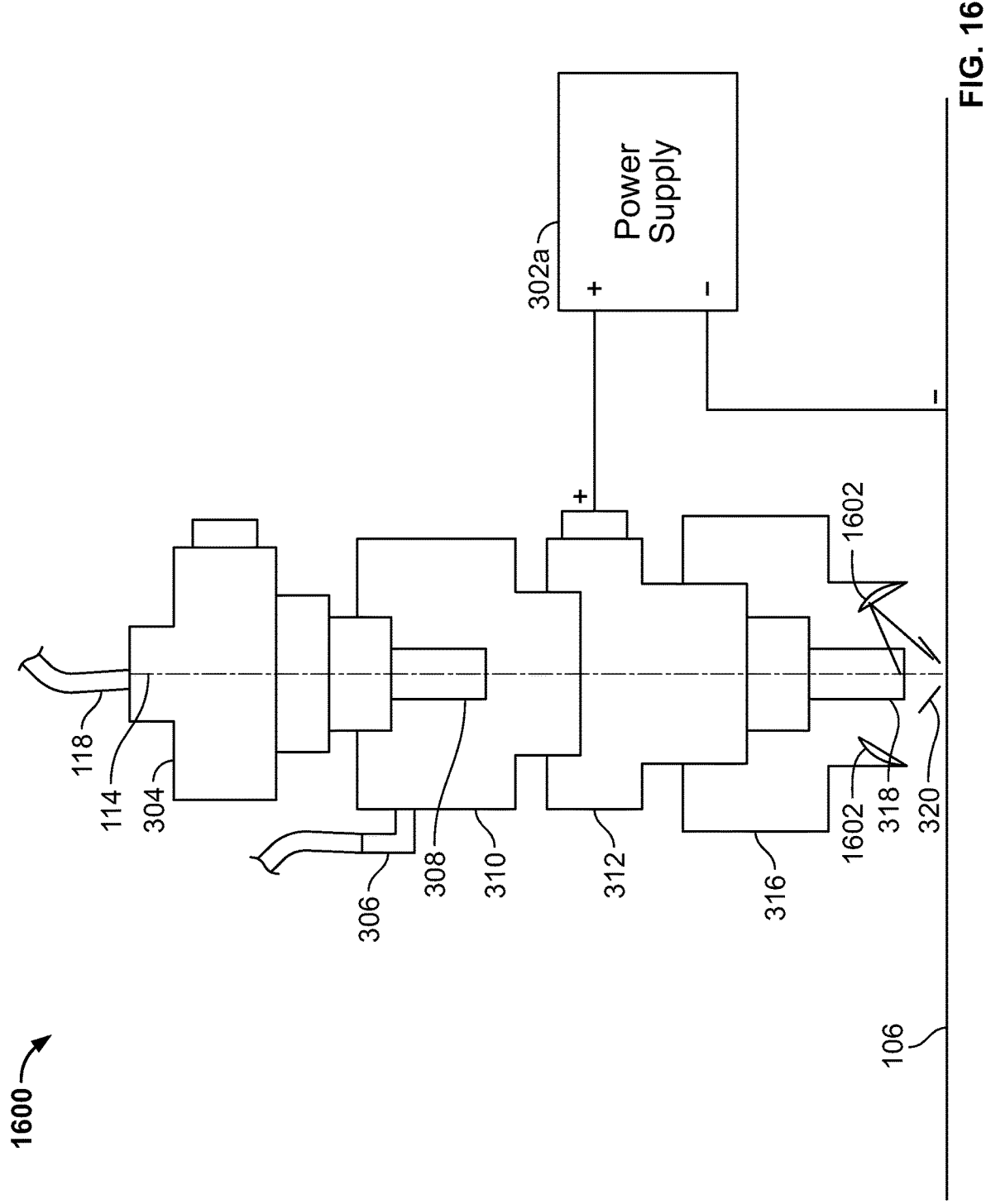
FIG. 16 illustrates an example welding assembly that uses a parabolic mirror as part of the gas nozzle to reflect arc light to preheat the electrode wire extension.

FIG. 16 illustrates an example welding assembly 1600 that uses a parabolic mirror 1602 as part of the gas nozzle 316 to reflect arc light to preheat the electrode wire 114 extension. The example parabolic mirror 1602 is configured to direct light generated by a welding arc 320 to a small area of the electrode wire 114 near the welding arc 320. In the example of FIG. 16, the preheating power supply 302*b* is omitted, but may be included to provide additional preheating when the welding arc is not present.

In some examples, after the welding system 100 detects an end of the arc welding process (e.g., release of the welding gun trigger) and after the arc power and the preheat power are stopped, the welding system 100 controls a wire feed motor to retract the electrode wire 114 at least in the amount of the distance between the two contact tips to cause the preheated section of the electrode wire 114 to be retracted past the second contact tip 318. The retraction of the preheated and softened portion of the electrode wire 114 makes it easier for an operator to pull that portion of the wire out of a potential jam in the welding gun, rather than forcing the operator to move the wire by compression.

Figure 17:
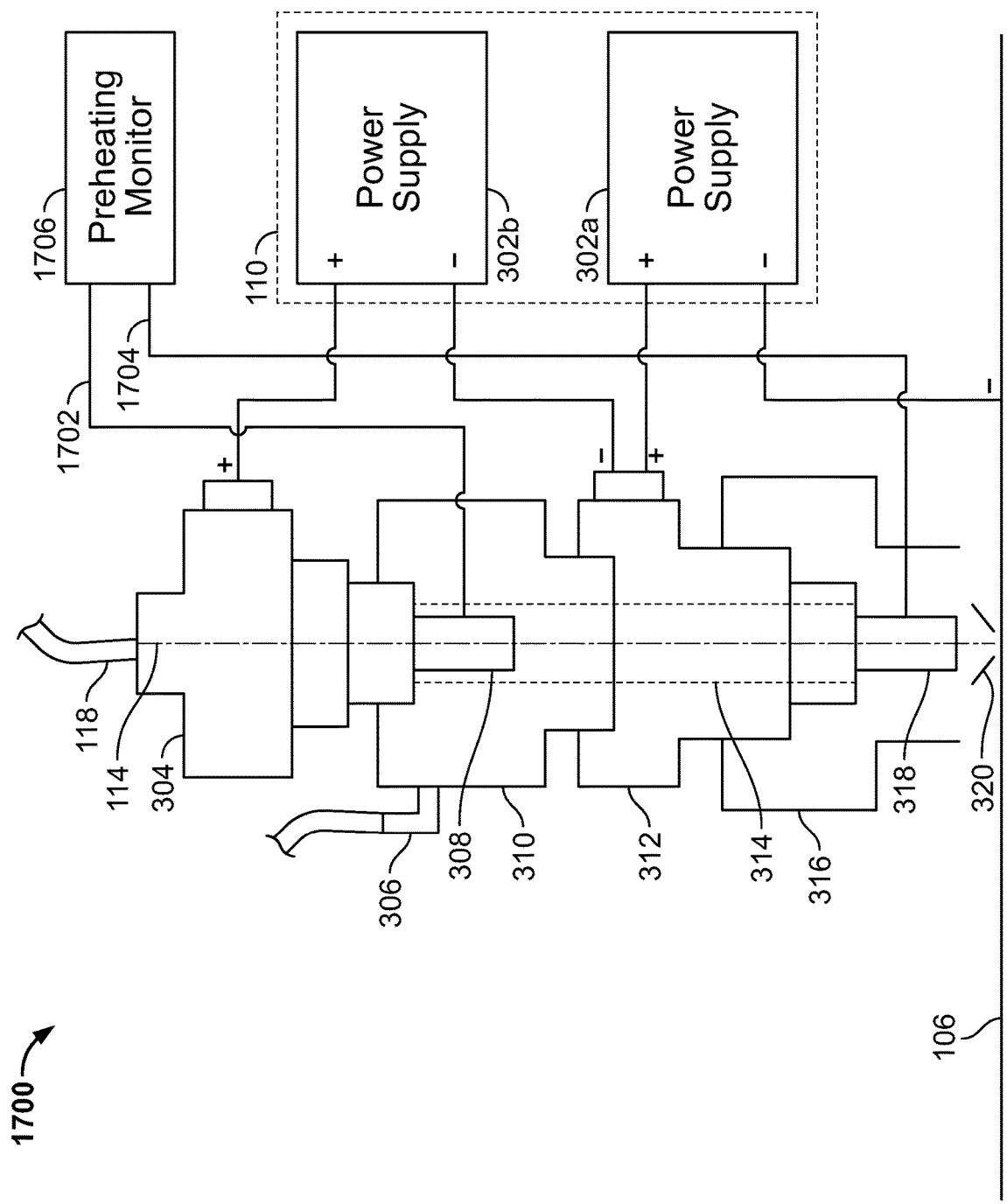
FIG. 17 illustrates an example welding assembly that includes voltage sense leads to measure a voltage drop the two contact tips used for preheating the electrode wire.

FIG. 17 illustrates an example welding assembly 1700 that includes voltage sense leads 1702, 1704 to measure a voltage drop the two contact tips 308, 318 used for preheating the electrode wire 114. A preheating monitor 1706 monitors heating anomalies by comparing the measured voltages to threshold voltage level(s), by evaluating the time derivatives and/or integrals of the measured voltages, and/or by statistical analysis (e.g., means, standard deviations, root-mean-squared (RMS) values, etc. Additionally or alternatively, the preheating monitor 1706 monitors the stability of the voltage over a longer-term history (e.g. over minutes and/or hours). Additionally or alternatively, the preheating monitor 1706 monitors preheat current, preheat power, and/or preheat circuit impedance via the preheat power supply 302*b*.

Some example welding systems 100 use radiated heating to heat the electrode wire 114 via a wire liner. An example includes constructing the coiled wire liner using a nichrome alloy, platinum, and/or another suitable material, to simultaneously physically support and/or guide the electrode wire 114 from the wire supply to the welding gun and to heat the electrode wire 114 at the same time. The wire liner is heated by the example preheat power supply 302*b*. A shorter portion of the wire liner may be heated using higher heating current, and/or a longer portion of the wire liner (e.g., most of the wire liner extending from the wire feeder to the welding torch) may be heated using a reduced heating current. The electrode wire 114 is gradually heated by the wire liner using radiated heating so that the electrode wire 114 has an elevated temperature by the time the electrode wire 114 reaches the welding torch and/or the first contact tip 318.

Additionally or alternatively, the welding system 100 may use infrared heating lamps mounted within the gun body to preheat the electrode wire 114. The infrared heating lamps are powered by the preheat power supply 302*b*.

Disclosed examples may be used to perform cladding operations with reduced dilution of the base material. In such examples, the preheat power supply 302*b* provides high preheat power to preheat wire to near melting. The welding power supply 302*a* then provides a relatively low arc current (e.g., 15-20 A) to bring the wire tip to the actual melting point. However, because the relatively low current (e.g., 15-20 A) may not be enough to cause pinching off of the melted wire to transfer the liquid metal across the arc, some such examples use a rapid-response motor to oscillate the wire. Oscillation of the wire jolts or shakes the liquid metal off of the wire tip. An example of such an oscillation technique is described by Y. Wu and R. Kovacevic, "Mechanically assisted droplet transfer process in gas metal arc welding," *Proceedings of the Institution of Mechanical Engineers Vol* 216 *Part B: J Engineering Manufacture*, p. 555, 2002, which is incorporated by reference herein in its entirety. By using low arc current, the example cladding method reduces base metal dilution and/or reduces costs of methods such as laser cladding.

In some other examples, a cladding system uses resistive preheating of the electrode wire and a laser energy source to lay the cladding down. The laser beam may be defocused, and no welding arc (e.g., electrical arc) is present during the cladding operation. In some cases, the welding arc is prevented via a voltage clamping system that clamps the voltage between the wire and the workpiece to less than an arc striking voltage. Such a clamping system may include a diode and/or a transistor.

In some examples, welding-type equipment may be used to perform metal additive manufacturing and/or additive metal coating. For example, a coating system or additive manufacturing system uses the wire preheating and a voltage clamp as described above, but omits the laser. In some other examples, the cladding system uses the wire preheating and omits both the clamp and the laser. In either case, the metal may not necessarily bond to the workpiece, but may form a coating and/or be laid on a base from which the metal can later be removed.

In some examples, a cladding system uses the resistive preheating to preheat the wire. The preheated wire is melted using a TIG welding arc.

Some example cladding systems use the preheating system to perform both pilot preheating (e.g., prior to the wire making contact to the workpiece where the two tips in the torch do the preheating) and a transferred preheating (e.g., open up the tip nearer the workpiece once current starts flowing in the work lead). The cladding system switches the preheating system between the pilot preheating mode and the transferred preheating mode.

In some cases, preheating the electrode with an extended stick out length can suffer from instability, which is caused by the short circuit control response in submerged arc welding and/or in GMAW methods. A conventional short circuit control response is to increase current to clear a detected short circuit. However, the current increase overheats the extended stick out to very high temperatures, causing the wire to loose rigidity and/or mechanical stability. As a result, the superheated wire section melts off at a higher rate than normal and may introduce arc length hunting or oscillation while the welding system 100 attempts to obtain a stable arc length or contact tip to work distance. Some examples address this instability by controlling the welding power supply 302a using a current-controlled (e.g., constant current) mode during a prolonged short circuit event (e.g., a short circuit lasting more than 5 ms). The current-controlled mode does not include a shark fin response or high artificial inductance typical of short circuit clearing methods. For example, the current-controlled mode may use a same average current as used in the spray mode for that wire feed rate (e.g., a high current) or a fixed low current (e.g., 50 A or lower). The welding system 100 also initiates wire retraction to clear the short circuit. After the short is cleared, the welding system 100 reverts the mode to voltage-controlled (e.g., constant voltage) spray and/or pulse spray mode. In such examples, the wire drive motor is highly responsive (e.g., similar to motors used in controlled short circuit (CSC) modes), but at reduced duty cycles relative to duty cycles used in CSC modes. In such examples, the motor is not used to clear shorts as quickly as in CSC modes.

Some examples increase the deposition rate of welding while reducing heat input to the workpiece using a spray mode. The welding system 100 switches between spray mode at low wire speed mode and cold wire feed at high wire speed mode. In this context, cold wire refers to non-melted wire, whether preheated or not preheated. In some such examples, the welding system 100 preheats the electrode wire 114 and performs welding in a spray mode (e.g., voltage-controlled and/or pulse), and then reduces the current to a lower current level (e.g., 50 A or less). After a period of operating in spray mode, the welding system and accelerates the wire feed rate (e.g., to the maximum motor feed rate) to input cold (e.g., non-melted) electrode wire 114 to the weld puddle. The input of the cold wire both adds filler metal and cools the weld puddle. Using preheated wire increases deposition of wire into the weld puddle before the weld puddle cools too much to further melt the wire, but preheating of the wire may be omitted. The welding system 100 then retracts the wire while maintaining the lower welding current to restart the weld arc. When the arc is restarted, the welding system 100 returns to the spray mode at the higher current and feeds the electrode wire 114 at the lower wire feed rate. In some examples, the welding system 100 maintains a higher current when feeding the cold wire into the weld puddle to increase deposition, but reduces the current (e.g., to 50 A or less) prior to retracting the wire, to reduce spatter during the arc restart. In such examples, the wire drive motor is highly responsive (e.g., similar to motors used in controlled short circuit (CSC) modes), but at reduced duty cycles relative to duty cycles used in CSC modes. In such examples, the motor is not used to clear shorts as quickly as in CSC modes.

Poor physical contact between the electrode wire 114 and the contact tip 318 can, in some cases, result in arcing between the electrode wire 114 and the contact tip 318, which can damage the contact tip 318. Disclosed examples include a clamping diode (e.g., a Zener diode) between to clamp an output voltage of the preheat power source 302b to clamp the output voltage to less than a threshold (e.g., less than 14V). Using the clamping diode reduces or eliminates the likelihood of initiating an arc between the contact tips 308, 318 and the electrode wire 114. Additionally, the clamping diode reduces the likelihood of arcing in the first contact tip 318 for the main welding current. When the physical contact is poor between the electrode wire 114 and the first contact tip 318, the arc current flow may conduct or be redirected through the clamping circuit and the second contact tip 308 to the electrode wire 114 to prevent tip burn back and extend the life of first contact tip 318. The clamping diode is selected to have a current capacity to conduct both preheat current and welding current (e.g., with few hundred nanosecond turn-on). In some examples, the clamping diode is a silicon carbide rectifier diode.

In some examples, the second contact tip 318 is used as a sensor for detecting conditions for arcing at the first contact tip 308 (e.g., without preheating the electrode wire 114). When such conditions for arcing at the first contact tip 308 are detected, the welding system 100 clamps the tip-to-wire contact voltage as described above.

While examples disclosed above include contact tips 308, 318 that are coaxially aligned, in other examples the axes of the contact tips 308, 318 are offset (e.g., parallel but not aligned) and/or tilted (e.g., not parallel). In some other examples, a curved or bent wire support (e.g., ceramic) is provided between the two contact tips 308, 318 to improve contact at the first contact tip 308. In some other examples, the first contact tip 318 is provided with a spring-loaded contact to contact the electrode wire 114, thereby ensuring contact between the first contact tip 318 and the electrode wire 114.

Figure 18:
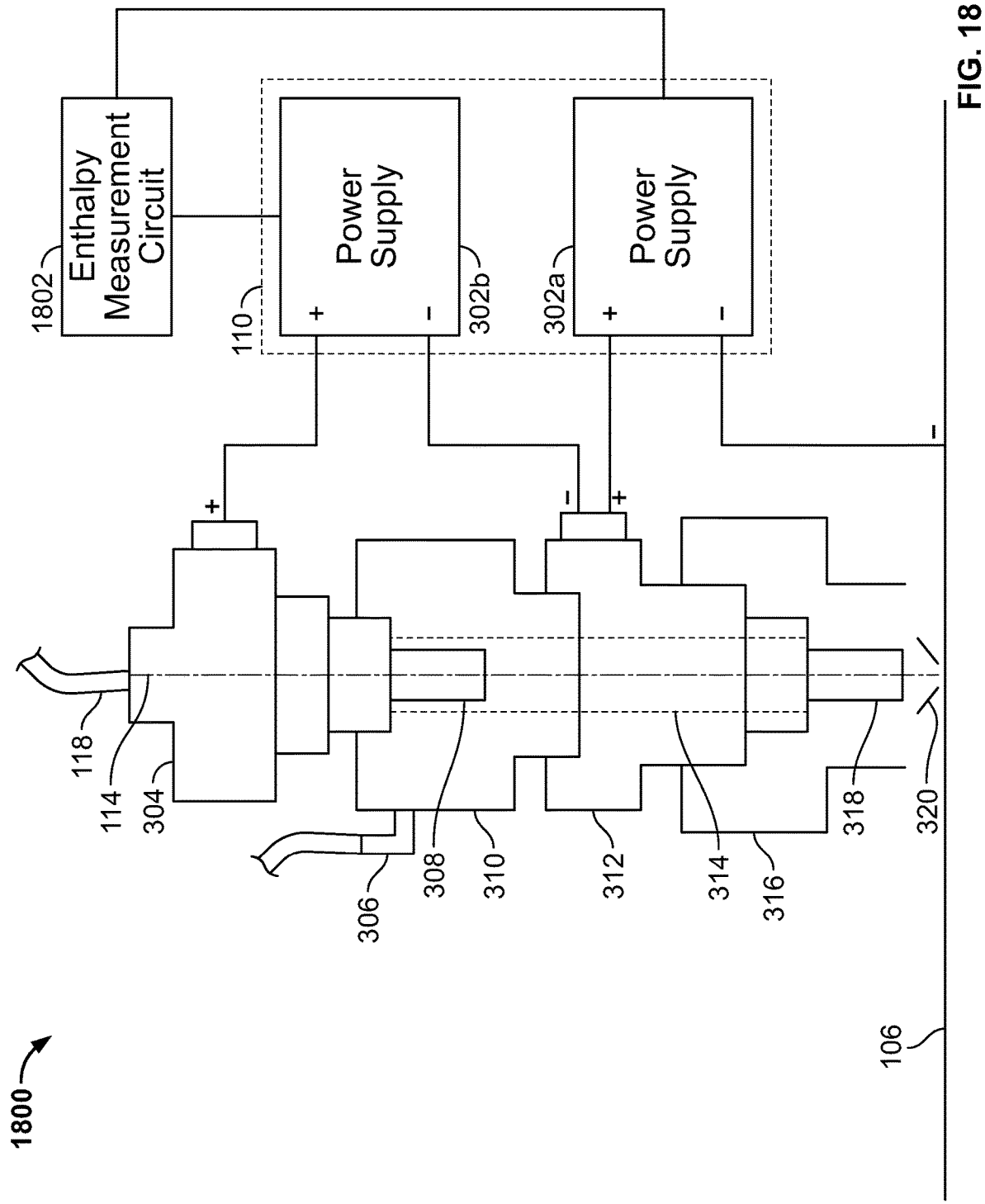
FIG. 18 illustrates an example welding assembly that includes an enthalpy measurement circuit.

FIG. 18 illustrates an example welding assembly 1800 that includes an enthalpy measurement circuit 1802. The enthalpy measurement circuit 1802 determines an enthalpy applied to the workpiece 106. The enthalpy applied to the workpiece 106 by the power supplies 302a, 302b is a sum of the enthalpy introduced to the electrode wire 114 by the preheat power source 302b and the enthalpy introduced by the welding power supply 302a. The example measurement circuit 1802 may determine the enthalpy based on the measured arc voltage, the measured welding-type current, and/or a measured preheating current, or the voltage drop across the portion of the electrode. The electrode preheating circuit 1802 controls the preheating current based on the determined enthalpy and a target enthalpy to be applied to the workpiece 106. For example, the electrode preheating circuit 1802 may reduce the preheating current provided by the preheat power supply 302b based on welding power applied by the welding power supply 302a to maintain a constant enthalpy applied to the workpiece 106. The welding power supply 302a may provide a variable power based on, for example, changes in a contact tip to work distance and/or arc length.

In some examples, the welding system 100 includes a stickout sense circuit that determines an electrode stickout distance of the electrode wire 114. The preheating power supply 302b controls the preheating current based on the electrode stickout distance. An example stickout sense circuit includes a current sensor to measure the welding current supplied by the welding power supply 302a and determines the electrode stickout distance based on the measurement of the welding-type current.

Figure 19:
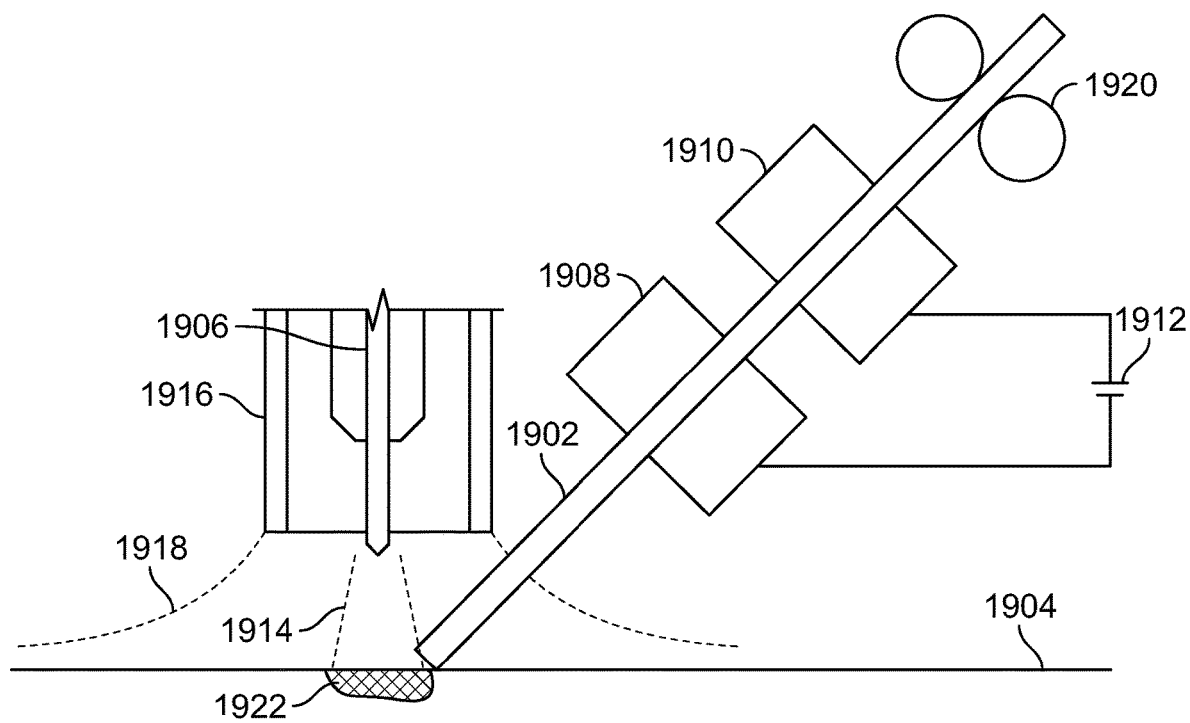
FIG. 19 illustrates an example implementation of providing a resistively preheated wire to a workpiece and providing a separate arcing source, such as a tungsten electrode, to melt the wire.

FIG. 19 illustrates an example implementation of providing a resistively preheated wire 1902 to a workpiece 1904 and providing a separate arcing source, such as a tungsten electrode 1906, to melt the wire 1902 and/or the workpiece 1904. The wire 1902 is preheated using contact tips 1908 and 1910, which are electrically coupled to a preheating power source 1912. The example contact tips 1908, 1910 and the preheating power source 1912, may be implemented as described with reference to any of the examples of FIGS. 3, 11, 12, 13, 17, and/or 18.

The tungsten electrode 1906 generates an electric arc 1914. A gas nozzle 1916 is configured in a same torch as the tungsten electrode 1906 and provides shielding gas 1918. A reciprocating wire feeder 1920 enables bidirectional travel of the wire 1902 forward and/or in reverse. The reciprocating preheated wire 1902 increases the welding or cladding travel speed and, when using certain reciprocating frequencies, produces a grain refinement effect.

For welding, the example preheating power source 1912 preheats the wire 1902 via the contact tips 1908, 1910, and the tungsten electrode 1906 provides the additional heat required to melt the wire 1902 and/or a portion of the workpiece 1904 into a weld puddle 1922. The preheated wire 1902 is melted after being submerged into the weld puddle 1922, is melted by the arc 1914, and/or both. Any of the example control processes described herein may be used to perform welding, brazing, cladding, hardfacing, metal addition, and/or any other welding-type operations.

Figure 20:
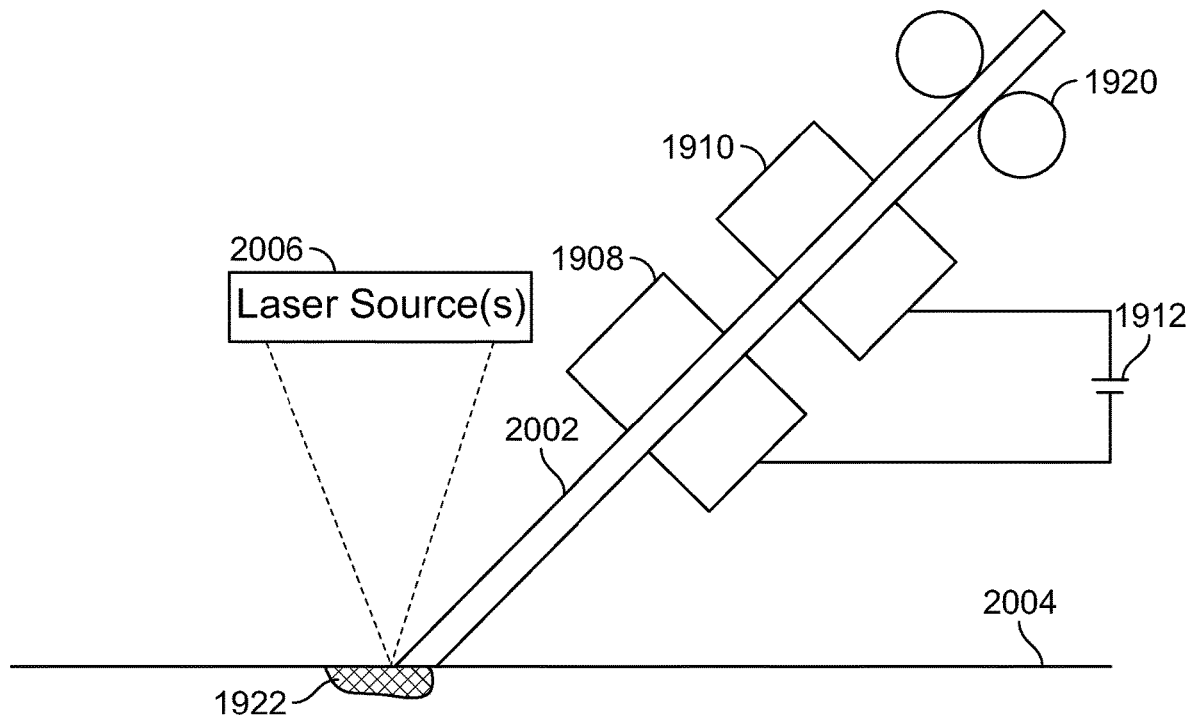
FIG. 20 illustrates an example implementation of providing a resistively preheated wire to a workpiece and providing a separate arcing source, such as one or more laser source(s), to melt the wire.

FIG. 20 illustrates an example implementation of providing a resistively preheated wire 2002 to a workpiece 2004 and providing a separate arcing source, such as one or more laser head(s) 2006, to melt the wire 2002. The example of FIG. 20 includes the contact tips 1908 and 1910, the preheating power source 1912, and the reciprocating wire feeder 1920 of FIG. 19. The example contact tips 1908, 1910 and the preheating power source 1912, may be implemented as described with reference to any of the examples of FIGS. 3, 11, 12, 13, 17, and/or 18.

Similar to the tungsten electrode 1906 of FIG. 19, the laser head(s) 2006 of FIG. 20 provide sufficient power to melt the workpiece 2004 to produce the weld puddle 1922, into which the preheated wire 2002 is submerged to melt the preheated wire 2002 for metal deposition. Use of the preheated wire 2002 involves applying less energy to the workpiece 2004 via the laser head(s) 2006 than would be required when using a cold wire. In some cases the preheated wire 1902 gets melted after submerged into the workpiece 1904 and/or the weld puddle 1922 without extra heat from the laser. In other cases, the laser adds more heat to the wire to be melted into the melt pool 1922. The reduced laser power and heat help reduce base metal dilution of the workpiece 1904 in a corrosion resistant weld overlay. As a result, the examples of FIGS. 19 and/or 20 can achieve increased deposition rates over conventional cold wire welding processes, with less likelihood of burning through the workpieces 1904, 2004.

In some examples, the welding system 100 reacts to wire short circuiting events. The example welding system 100 uses feedback to shut down pre-heat power immediately to prevent soft, preheated wire from being compressed and causing a jam between the first contact tip 318 and the second contact tip 308. The welding system 100 uses feedback such as from a wire feed motor (e.g., motor current, motor torque, etc.) and/or another wire feed force sensor between the two tips motor current or other feeding force sensor to provide rapid detection. Additionally or alternatively, the welding system 100 uses feedback such as a duration of the short circuit measurement (e.g., arc voltage) to detect a wire stubbing event (e.g., extinguishing of the arc by contacting the electrode wire 114 to the workpiece 106). In response to detecting the event, the welding system 100 shuts down or disables the preheat power supply to prevent wire noodling between the contact tips.

Figure 21:
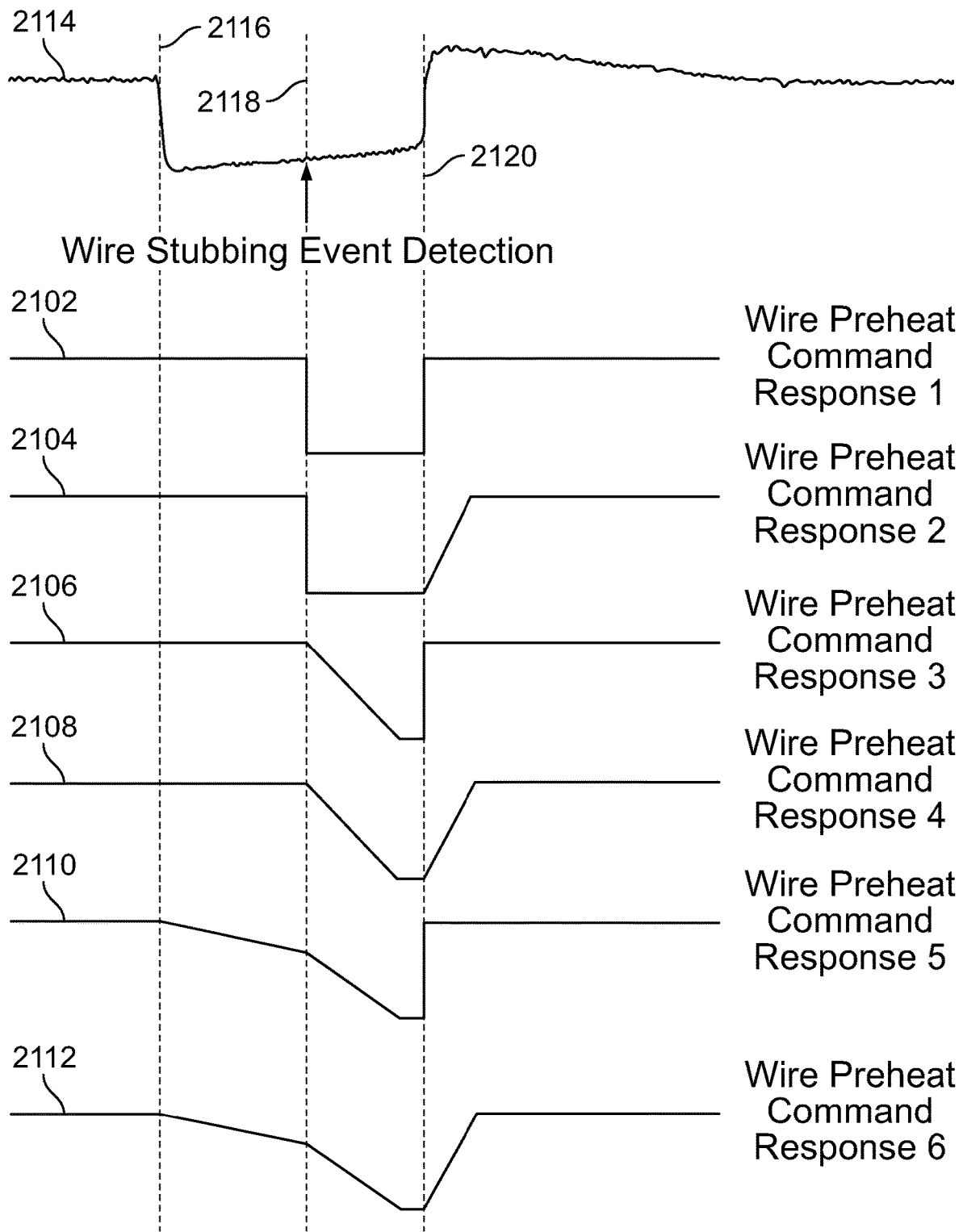
FIG. 21 illustrates example wire preheat current and/or voltage command waveforms to reduce or prevent soft, preheated wire from being compressed and causing a jam between the first contact tip and the second contact tip.

Additionally or alternatively, the welding system 100 may implement a controlled preheat response to detecting wire short circuiting events. FIG. 21 illustrates example wire preheat current and/or voltage command waveforms 2102-2112 to reduce or prevent soft, preheated wire from being compressed and causing a jam between the first contact tip 318 and the second contact tip 308. In FIG. 21, weld voltage feedback 2114 (represented by a waveform) is sensed by the welding system 100.

At a first time 2116, a wire stubbing event occurs, causing the weld voltage feedback 2114 to decrease. In the illustrated example, the control loop of the example system 100 does not identify a stubbing event immediately upon the voltage drop. As a result, the example waveforms 2102-2108 do not respond to the initial drop at the first time 2116. Conversely, the example waveforms 2110, 2112 respond to the sensed voltage drop by decreasing the preheating command at a first rate.

At a second time 2118, the control loop in the welding system 100 recognizes that the wire stubbing event has occurred. In response to the control loop recognizing the wire stubbing event, the example waveforms 2102, 2104 decrease to a reduced value, the waveforms 2106, 2108 begin ramping down to a reduced value, and the waveforms 2110, 2112 decrease the preheating command at a second rate higher than the first rate.

At a third time 2120, the wire stubbing event is cleared and the weld voltage feedback 2114 increases to the nominal value. In response to clearing the wire stubbing event, the waveforms 2102, 2106, 2110 increase to the nominal value substantially immediately. In contrast, the example waveforms 2104, 2108, 2112 ramp up to the nominal value.

While example waveforms 2102-2112 are illustrated in FIG. 21, any other waveforms may be used, including but not limited to combinations of components of the waveforms 2102-2112. Example waveforms may include varying ramp rates that may be linear and/or non-linear.

Figure 22:
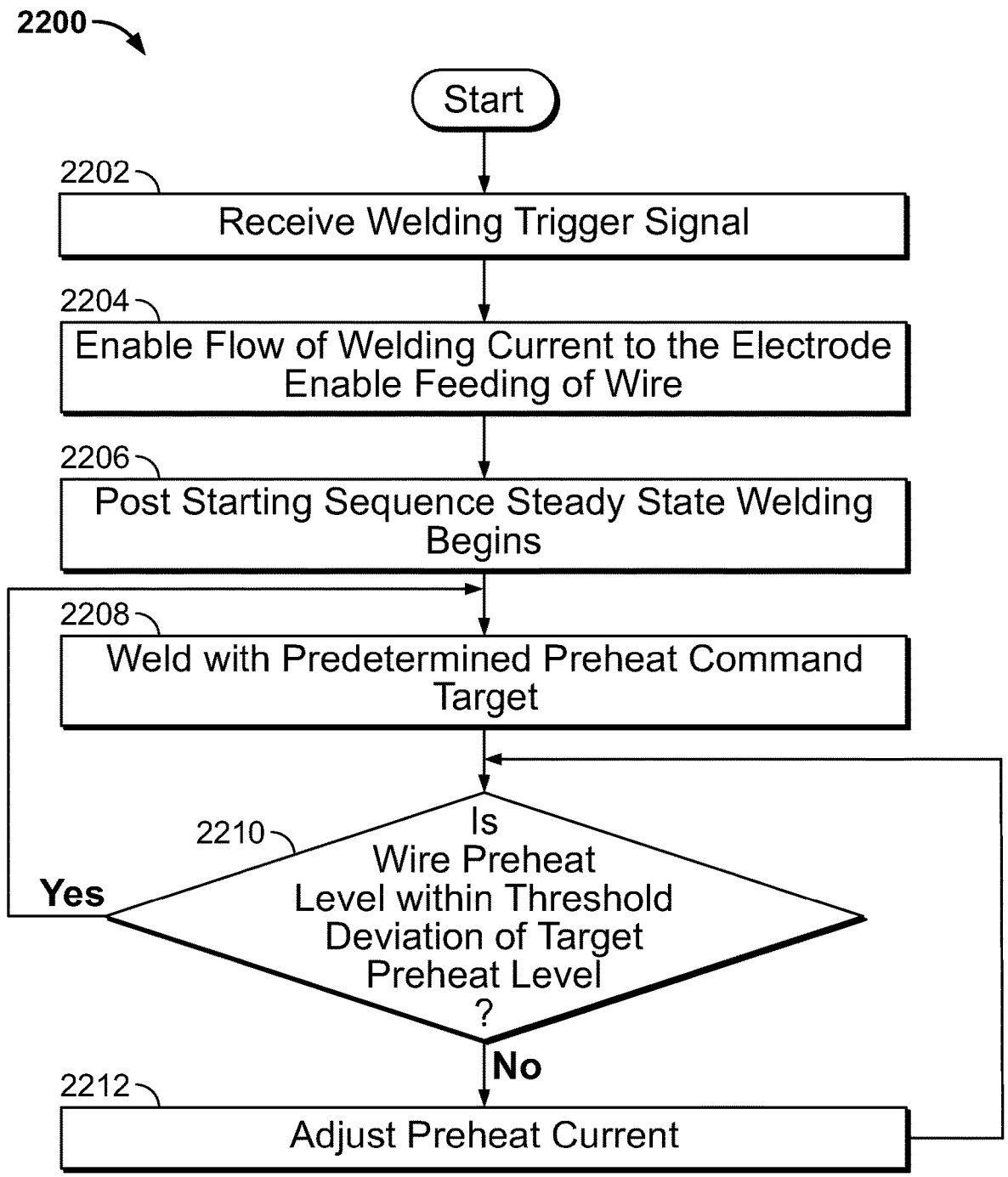
FIG. 22 is a flowchart illustrating an example method to use resistive preheating to improve arc initiation for welding.

FIG. 22 is a flowchart illustrating an example method 2200 to use resistive preheating to improve arc initiation for welding. The method 2200 may be used with any of the example assemblies 206, 1100, 1200, 1300, 1400, 1700, 1800 of FIG. 2, 11, 12, 13, 14, 17, or 18.

The method 2200 starts at block 2202 in response to, for example, activating the welding system 100 or receiving a trigger signal requesting that the welding system 100 provide a welding current to the electrode wire 114. At block 2204, the welding system 100 enables the flow of welding current in the electrode wire 114 and enables feeding of the wire 114.

At block 2206, the welding system 100 begins the post-starting-sequence steady state welding. At block 2208, the welding system welds with a predetermined preheat command target.

At block 2210, the welding system 100 determines (e.g., by measuring the temperature of the electrode wire 114 via a sensor) whether the electrode wire 114 preheat level is within a threshold deviation of the target preheat level (determined in block 2208). If the electrode wire 114 preheat level is within a threshold deviation of the target preheat level (block 2210), control returns to block 2208 to continue welding.

If the electrode wire 114 preheat level is not within a threshold deviation of the target preheat level (e.g., is too cold or too hot) (block 2210), at block 2212 the welding system 110 adjusts the preheat current and returns control to block 2210 to check whether the preheat level is within the threshold deviation of the target preheat level.

In some examples, the welding equipment 110 includes or is in communication with a user interface device to enable a user to adjust one or more preheat effects and/or parameters. FIG. 23 illustrates an example user interface device 2300 that may be used to implement the user interface of the welding equipment. The example user interface 2300 may be implemented alone or as part of a larger welding user interface that permits control of other aspects of the welding equipment 110, such as voltage, current, and/or wire feed speed setpoints, among other things.

The welding equipment 110 may use default voltage command(s), default current command(s), default power command(s), and/or default enthalpy command(s) to the preheating power source (e.g., the power sources 302a, 302b) for corresponding wire speeds, joint thicknesses, and/or joint geometry. However, such default commands may not always be the user-desired amount for all situations. For example, the operator may desire to change the command slightly to control the amount of penetration and/or heat input which, in turn, may mitigate weld distortion. The example user interface 2300 enables the user to fine tune the preheat section of the weld condition to satisfy a particular application.

The example user interface 2300 includes a preheat adjustment device 2302 and one or more preheat indicator devices 2304, 2306. In the example of FIG. 23, the preheat adjustment device 2302 is a dial that permits the user to increase and/or decrease the preheat level implemented by the welding equipment 110 (e.g., by any of the example assemblies 206, 1100, 1200, 1300, 1400, 1700, 1800 of FIG. 2, 11, 12, 13, 14, 17, or 18).

The graphic preheat indicator 2304 device graphically indicates to a user the preheat level 2308 selected via the preheat adjustment device 2302, relative to a default preheat level 2310 and relative to a permitted range of the preheat level. The graphic preheat indicator 2304 also includes identifiers indicating the effects of adjusting the preheating level on weld penetration and/or other effects. For example, the graphic preheat indicator 2304 indicates that, as the preheat level is increased, the weld penetration decreases and, conversely, the weld penetration increases as the preheat level is decreased. As illustrated in FIGS. 24A, 24B, and 24C, the preheat level 2308 is graphically represented as shifting left and right as the graphic preheat indicator 2304 is adjusted.

In the example of FIG. 23, the digital preheat indicator 2306 indicates a numerical representation of the effect(s) on the weld of changing the preheat level 2308 via the preheat adjustment device 2302. For example, the digital preheat indicator 2306 displays an average heat input to the weld based on the preheat level 2308. FIGS. 24A, 24B, and 24C illustrate example average heat inputs for different preheat levels. Other example numerical representations include the voltage command, the preheat current, the total energy of the system, and/or efficiency.

Figure 25:
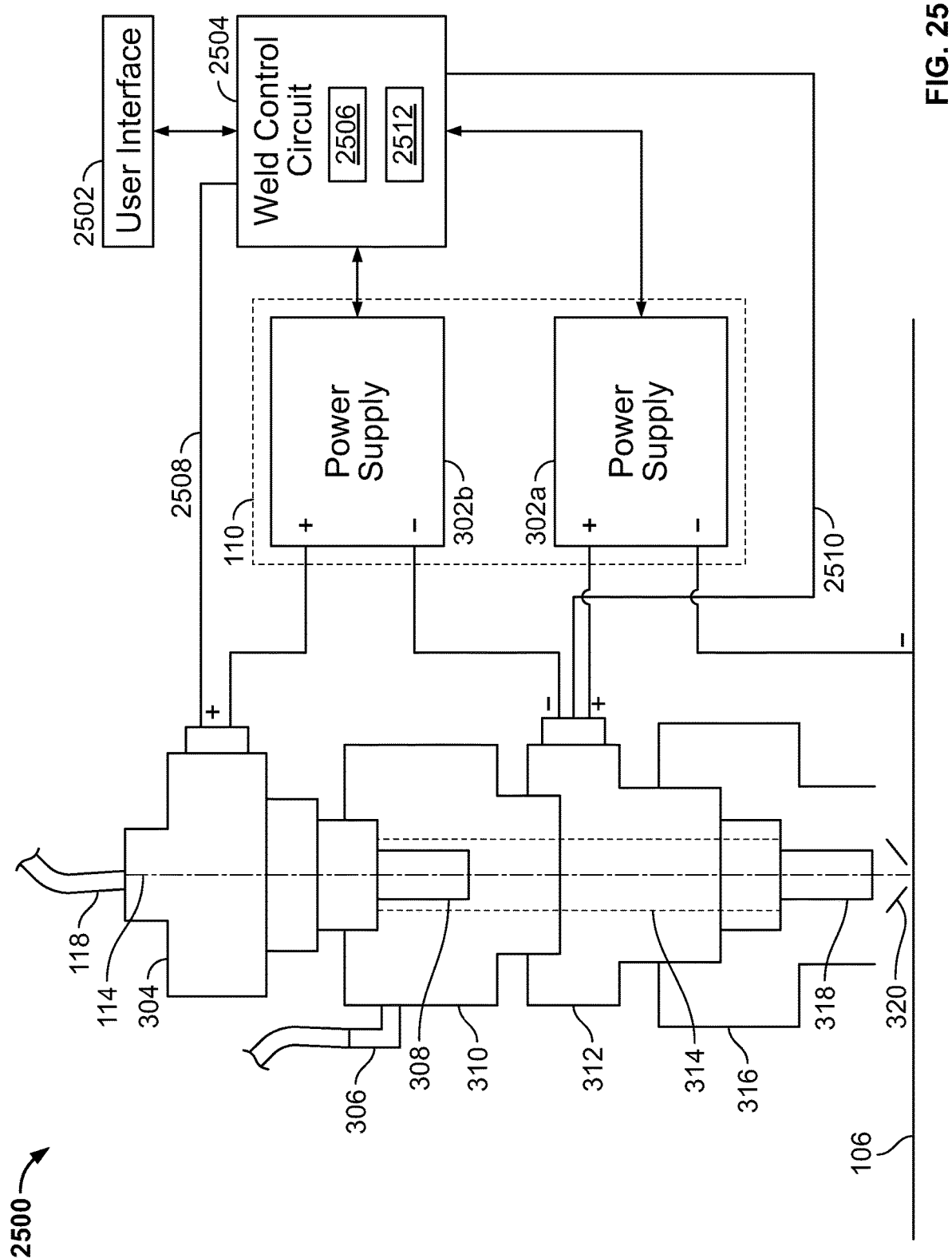
FIG. 25 illustrates an example welding assembly that uses includes a user interface and a weld control circuit that implements a preheat control loop.
Figure 26:
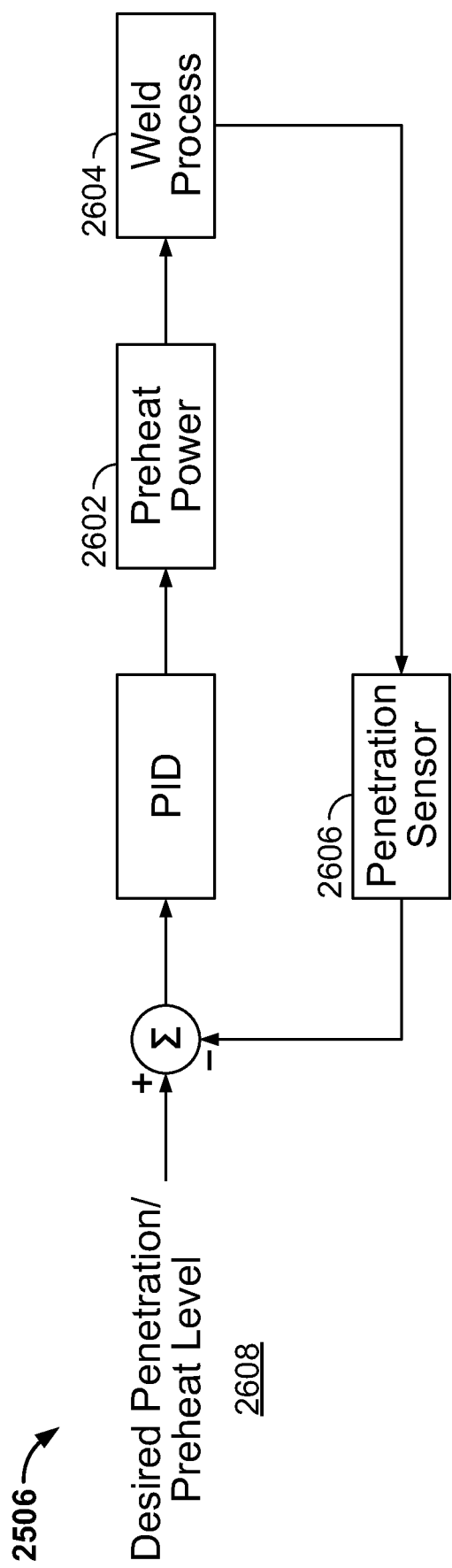
FIG. 26 is a block diagram of an example implementation of the preheat control loop of FIG. 25.

FIG. 25 illustrates an example welding assembly 2500 that uses includes a user interface 2502 and a weld control circuit 2504 that implements a preheat control loop 2506. FIG. 26 is a block diagram of an example implementation of the preheat control loop 2506. The user interface 2502 includes the user interface 2300 of FIG. 23 or another interface to enable a user of the welding assembly 2500 to adjust a preheat level. The weld control circuit 2504 receives a preheat level selected via the user interface 2502 and controls the power supply 302b to change the preheat level. The weld control circuit 2504 may further control the power supply 302a to adjust one or more aspects of the welding power based on the preheat level selected to improve performance at the selected preheat level. The weld control circuit 2504 may also implement an electrode preheat control circuit.

The example preheat control loop 2506 of FIG. 26 automatically controls preheat power 2602 to a weld process 2604 to maintain constant penetration by using feedback from a penetration sensor 2606. An example penetration sensor uses weld current as a measure of weld penetration. Pulse voltage signature disruption by metal vapor pressure can be an advance indication of burn-through. The example preheat control loop 2506 uses the penetration sensor 2606 as close-loop feedback (e.g., subtractive feedback from a desired penetration and/or preheat level 2608 input from the user interface 2502). The preheat control loop 2506 may improve poor penetration (e.g. partial penetration) and/or prevent burn-through by detecting penetration and then using preheat power to adjust the penetration independently without introducing process instability. Other example penetration sensors that may be used include infrared sensors external to the welding arc and the weld pool.

Returning to FIG. 25, the example assembly 2500 further includes voltage sense leads 2508, 2510 to measure a voltage across the preheated portion of the electrode wire 114. The voltage sense leads 2508, 2510 may be coupled, for example, to the two contact tips 308, 318, a wire liner, a wire drive motor, a diffuser in the weld torch, and/or any other substantially electrically equivalent points). The weld control circuit 2504 controls the preheat power supply 302b using a preheat control loop 2512. The preheat control loop 2512 uses the voltage sensed via the leads 2508, 2510 and the current output by the power supply 302b to maintain a commanded power input, current input, voltage input, enthalpy, and/or impedance to the section of the electrode wire 114. In the example of FIG. 25, the preheat control loop 2512 uses an error between a commanded preheat voltage and the voltage sensed via the sense leads 2508, 2510 to adjust the preheat current, the preheat voltage, and/or the preheat power.

In some examples, the weld control circuit 2504 further receives weld voltage feedback from the workpiece 106 and determines voltage drops between the workpiece 106 and one or both of the contact tips 308, 318. The weld control circuit 2504 may calculate the total heat being input to the electrode wire 114 and/or to the workpiece 106 by the power supplies 302a, 302b using the voltage feedback including the contact tips 308, 318 and the workpiece 106, and/or control the voltages and/or currents output by the power supplies 302a, 302b.

A current present in a preheat circuit path (e.g., the power supply 302b, the contact tips 308, 318, and the section of the electrode wire 114 between the contact tips 308, 318), and any other connecting circuitry and/or conductors) produces a voltage drop based on the amount of current and the amount of resistance in the circuit (e.g., in the section of the electrode wire 114) where the voltage is being measured (e.g., via the voltage sense leads 2508, 2510). If a current is present but no voltage is measured, a conventional voltage controlled process would increase the current command until the voltage error is zero (e.g., voltage error=voltage command−voltage feedback) and the command is satisfied. Any loss of the voltage feedback (e.g., by disconnection of either of the sense leads 2508, 2510, by short circuiting of the sense leads 2508, 2510, etc.) in a conventional voltage controlled process could cause the preheat current to increase high enough to melt or vaporize open the section of the electrode wire being preheated. Such an event could result in a failure or destruction of a number of welding torch components.

The example weld control circuit 2504 detects and mitigates the loss of voltage feedback to the preheat control loop 2512 by reducing the current command to the preheat power supply 302b and/or turning off the output of the preheat power supply 302b. For example, the weld control circuit 2504 may monitor the voltage and current in the preheat section of the electrode wire 114 to determine whether the voltage and current are greater than respective thresholds (e.g., based on an expected minimum voltage drop during preheating). If the threshold voltage and current are not both present, the weld control circuit 2504 suspends or modifies the preheat control loop 2512 to reduce the current command (e.g., to zero or to a predetermined safe level), cause the welding power supply 302a to turn off welding power, and/or cause the preheat power supply 302b to turn off the preheat power. The weld control circuit 2504 may also indicate to the operator (e.g., via the user interface 2502) that the sense lead connection has been lost (e.g., via displaying a message on a display device of the user interface 2502). The response to the loss of the preheat voltage feedback protects the torch and the torch components (contact tip(s), gas nozzle, etc.), and reduces or prevents damage to the part being welded.

In some examples, the weld control circuit 2504 synchronizes the welding-type current and the preheating current to reduce the net current (and, thus, net heat) at the contact tips 308, 318. For example, the welding-type current and the preheating current may be alternating current, and the weld control circuit 2504 controls the preheating current and/or the welding-type current to be synchronous such that corresponding polarities of the welding type current and the preheating current result in reducing or canceling a net current at the contact tip 318.

In some examples, the weld control circuit 2512 permits the welding power supply 302a continue to provide welding power to weld without preheating, but will weld at a higher weld current than when preheating is enabled. The higher current could, depending on a number of factors such as wire speed, material thickness, and/or travel speed, cause excessive penetration and/or damage the part being welded. The weld control circuit 2504 may monitor the current from the welding power source 302a and be compared to a current limit (e.g., a current greater than the expected average current). If the current limit is exceeded, the weld control circuit 2504 turns off the weld power supply 302a to avoid excessive penetration and/or workpiece damage.

As mentioned above, the user interface 2502 may output the heat input to the workpiece 106 by the weld (e.g., based on the preheat level selected via the user interface 2502). The example weld control circuit 2504 of FIG. 25 calculates the heat input based on the preheat voltage, preheat current, preheat power, weld voltage, weld current, and/or weld power output by the power supplies 302a, 302b. Due to heat losses between the location in the assembly 2500 where the electrode wire 114 is preheated and the location of the arc, the example weld control circuit 2504 includes a loss factor in the heat input calculation. The example weld control circuit 2504 also includes an efficiency factor in the calculation, where the efficiency factor compensates for inefficiencies in the power delivery to the electrode wire 114 and/or measurements of the voltage(s), current(s), and/or power(s) used to calculate the heat input. The weld control circuit 2504 may calculate the heat input using the example Equation 1 below:

$$\int (\alpha I_{weld}(t) * V_{weld}(t)) dt \quad \text{Equation 1}$$

In Equation 1, α represents the efficiency and/or power losses in the welding portion. The user interface 2502 may display the heat input and/or the weld control circuit 2504 may use the calculated heat input to control the preheat heat input and/or the weld heat input. The heat input may be used in conjunction with, for example, penetration sensing to determine which of the preheating and/or welding power should be increased and/or decreased to achieve a desired weld result.

Figure 27:
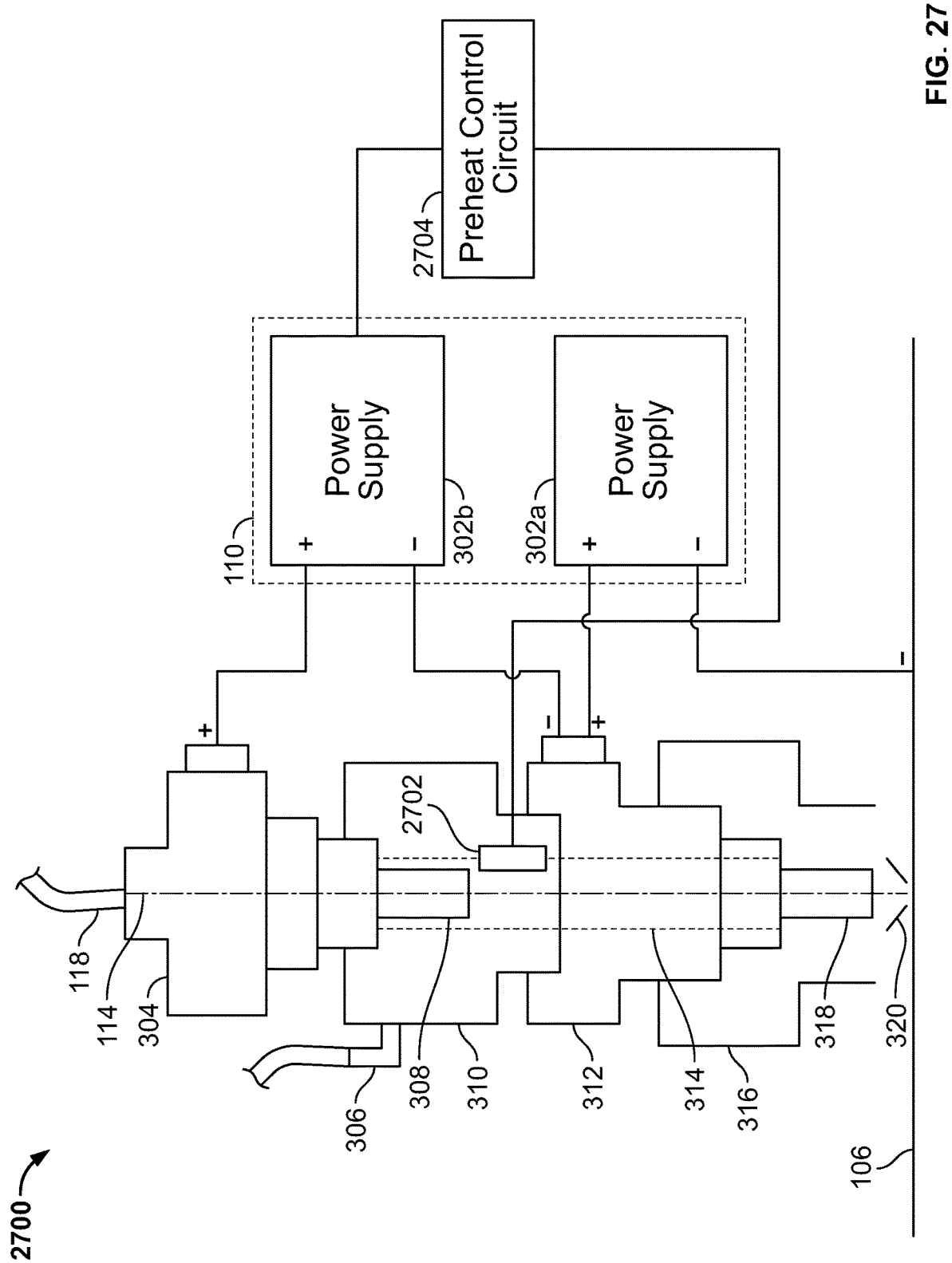
FIG. 27 is a block diagram of an example assembly to monitor hydrogen levels in the electrode wire and preheat a section of the electrode wire to reduce hydrogen prior to welding.

As mentioned above, the example system 100 may preheat a section of the electrode wire 114 to reduce the presence of hydrogen in the electrode wire 114 prior to welding. FIG. 27 is a block diagram of an example assembly 2700 to monitor hydrogen levels in the electrode wire 114 and preheat a section of the electrode wire 114 to reduce hydrogen prior to welding. The assembly 2700 includes a hydrogen sensor 2702 and a preheat controller 2704. The preheat controller 2704 receives a hydrogen measurement signal from the hydrogen sensor 2702 and adjusts the preheat parameters (e.g., current, voltage, power, enthalpy, etc.) of the preheat power supply 302b and/or the welding parameters of the welding power supply 302a.

By preheating the electrode wire 114 to a desired temperature at speed at which the electrode wire 114 is feeding out of the assembly 2700, relative to the amount of hydrogen present or allowable, the assembly 2700 more easily reduces and/or eliminates excess hydrogen than conventional methods of hydrogen reduction.

The preheat controller 2704 controls the preheat parameters, such as preheat power, current, voltage and/or joule heating, based on observed baking effectiveness for the type of electrode wire to reduce moisture in the type of electrode wire, and based on the feed speed of the electrode wire 114. For instance, a higher feed rate of the electrode wire 114 may require higher preheat power. Welding with tubular electrodes on butt joints may require less preheat power than tubular electrodes with a joggle joint. Larger diameter tubular wire with more cross-sectional area may require higher preheat power. The example preheat controller 2704 may use a look-up table or other memory structure to retrieve preheat parameters based on the type of tubular wire and wire feed rate input to the preheat controller 2704 (e.g., via a user interface) or another input method. In such examples, the preheat controller 2704 may operate without the hydrogen sensor 2702 and rely on predetermined preheat parameters.

The hydrogen sensor 2702 monitors the level of hydrogen on and/or proximate to the electrode wire 114. For example, the hydrogen sensor 2702 may be a Palladium (Pd) based sensor such as a Palladium-functionalized carbon nanotube (CNT). Another example implementation of the hydrogen sensor 2702 is as a diode-based Schottkey sensor with a Pd-alloy gate. Additionally or alternatively, highly-ordered vertically oriented titanium dioxide ($TiO_2$) nanotube microelectromechanical systems (MEMS) sensors may be incorporated in the welding torch to detect low levels (e.g., in parts per million, parts per billion, etc.) of hydrogen in or proximate to the electrode wire 114. The preheat controller 2704 performs closed-loop control of the preheat power source 302b based on the hydrogen measurement received from the hydrogen sensor 2702. The hydrogen sensor 2702 may also be placed near a preheat chamber as a measure of hydrogen level before depositing the electrode wire 114 into the weld pool at the workpiece 106 to form the weld metal. A moisture sensor may be used instead of or as a complement to the hydrogen sensor 2702.

The example assembly 2700 allows a tubular electrode to be produced at low cost and yet achieve low hydrogen performance. The assembly 2700 may also reduce the cost of reducing or preventing hydrogen pick up during production of the electrode wire 114, such as the costs associated with strip steel quality, drawing lube, flux sourcing and storage, and/or other production, storage and/or procurement costs can be minimized. Furthermore, the cost of packaging and/or storage against moisture pick up in the electrode wire 114 can be reduced and the shelf life of the electrode wire 114 can be extended.

Because hydrogen reduction is improved, a greater variety of tubular wires can be selected by fabricators for mechanical properties with hydrogen immunity provided by the example assembly providing wire preheating at the weld torch. The reduction of hydrogen is made easier because it is not dependent on stickout length as in conventional techniques. End users cannot typically regulate stickout length in a consistent manner, so performing hydrogen reduction via preheating allows for a fixed, self-regulated preheat length so that the wire heating will be consistent and not reliant on stickout length. The shorter stickout length also improves the CTWD and improves the response to shorting and/or stubbing events by the welding power supply 302a. The preheat hydrogen reduction method further eliminates the need to pre-bake the electrode wire 114 for a significant period of time before using the wire 114. The preheat hydrogen reduction method can heat the electrode wire 114 more than possible when using a traditional extended stickout method, further reducing hydrogen levels prior to introduction to the weld than conventional methods.

In some examples, the welding-type electrode is a tubular-type electrode, and diffusible hydrogen in the electrode is burned off substantially by preheating the electrode to prevent at least a portion of the hydrogen from being introduced into the weld metal. Thus, examples reduce the tendency of hydrogen induced cracking, stress corrosion cracking, and hydrogen embrittlement in resulting welds.

Figure 28:
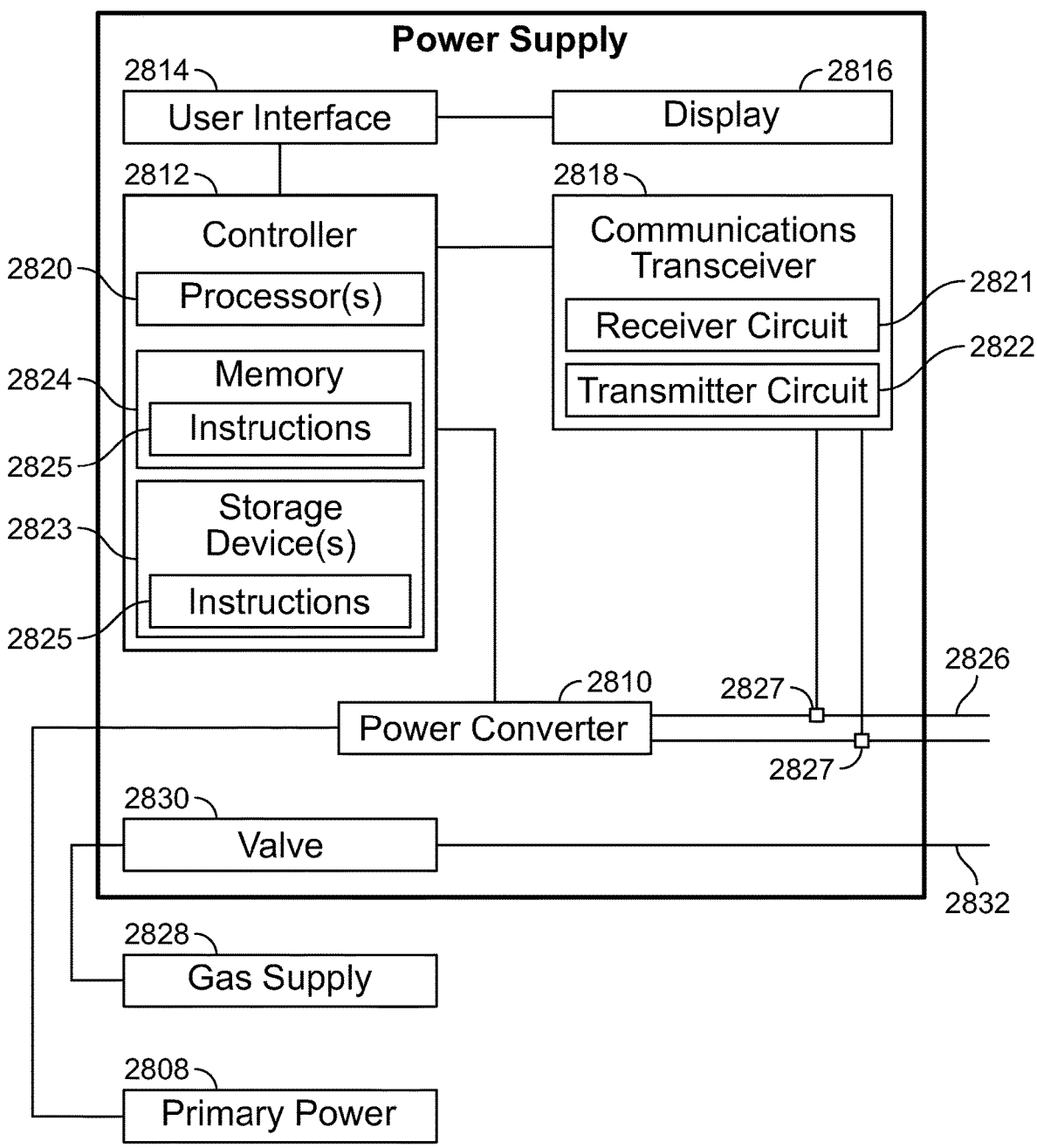
FIG. 28 is a block diagram of an example implementation of the power supplies of FIGS. 2, 11, 12, 13, 14, 17, 18, 25, and/or 27.

FIG. 28 is a block diagram of an example implementation of the power supplies 302a, 302b of FIGS. 2, 11, 12, 13, 14, 17, 18, 25, and/or 27. The example power supply 302a, 302b powers, controls, and supplies consumables to a welding application. In some examples, the power supply 302a, 302b directly supplies input power to the welding torch 108. In the illustrated example, the welding power supply 302a, 302b is configured to supply power to welding operations and/or preheating operations. The example welding power supply 302a, 302b also provides power to a wire feeder to supply the electrode wire 114 to the welding torch 108 for various welding applications (e.g., GMAW welding, flux core arc welding (FCAW)).

The power supply 302a, 302b receives primary power 2808 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 2808 may be supplied from an offsite location (e.g., the primary power may originate from the power grid). The welding power supply 302a, 302b includes a power converter 2810, which may include transformers, rectifiers, switches, and so forth, capable of converting the AC input power to AC and/or DC output power as dictated by the demands of the system (e.g., particular welding processes and regimes). The power converter 2810 converts input power (e.g., the primary power 2808) to welding-type power based on a weld voltage setpoint and outputs the welding-type power via a weld circuit.

In some examples, the power converter 2810 is configured to convert the primary power 2808 to both welding-type power and auxiliary power outputs. However, in other examples, the power converter 2810 is adapted to convert primary power only to a weld power output, and a separate auxiliary converter is provided to convert primary power to auxiliary power. In some other examples, the power supply 302a, 302b receives a converted auxiliary power output directly from a wall outlet. Any suitable power conversion system or mechanism may be employed by the power supply 302a, 302b to generate and supply both weld and auxiliary power.

The power supply 302a, 302b includes a controller 2812 to control the operation of the power supply 302a, 302b. The welding power supply 302a, 302b also includes a user interface 2814. The controller 2812 receives input from the user interface 2814, through which a user may choose a process and/or input desired parameters (e.g., voltages, currents, particular pulsed or non-pulsed welding regimes, and so forth). The user interface 2814 may receive inputs using any input device, such as via a keypad, keyboard, buttons, touch screen, voice activation system, wireless device, etc. Furthermore, the controller 2812 controls operating parameters based on input by the user as well as based on other current operating parameters. Specifically, the user interface 2814 may include a display 2816 for presenting, showing, or indicating, information to an operator. The controller 2812 may also include interface circuitry for communicating data to other devices in the system, such as the wire feeder. For example, in some situations, the power supply 302*a*, 302*b* wirelessly communicates with other welding devices within the welding system. Further, in some situations, the power supply 302*a*, 302*b* communicates with other welding devices using a wired connection, such as by using a network interface controller (NIC) to communicate data via a network (e.g., ETHERNET, 10baseT, 10base100, etc.). In the example of FIG. 1, the controller 2812 communicates with the wire feeder via the weld circuit via a communications transceiver 2818.

The controller 2812 includes at least one controller or processor 2820 that controls the operations of the welding power supply 2802. The controller 2812 receives and processes multiple inputs associated with the performance and demands of the system. The processor 2820 may include one or more microprocessors, such as one or more "general-purpose" microprocessors, one or more special-purpose microprocessors and/or ASICS, and/or any other type of processing device. For example, the processor 2820 may include one or more digital signal processors (DSPs).

The example controller 2812 includes one or more storage device(s) 2823 and one or more memory device(s) 2824. The storage device(s) 2823 (e.g., nonvolatile storage) may include ROM, flash memory, a hard drive, and/or any other suitable optical, magnetic, and/or solid-state storage medium, and/or a combination thereof. The storage device 2823 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 2824 may include a volatile memory, such as random access memory (RAM), and/or a nonvolatile memory, such as read-only memory (ROM). The memory device 2824 and/or the storage device(s) 2823 may store a variety of information and may be used for various purposes. For example, the memory device 2824 and/or the storage device(s) 2823 may store processor executable instructions 2825 (e.g., firmware or software) for the processor 2820 to execute. In addition, one or more control regimes for various welding processes, along with associated settings and parameters, may be stored in the storage device 2823 and/or memory device 2824, along with code configured to provide a specific output (e.g., initiate wire feed, enable gas flow, capture welding current data, detect short circuit parameters, determine amount of spatter) during operation.

In some examples, the welding power flows from the power converter 2810 through a weld cable 2826. The example weld cable 2826 is attachable and detachable from weld studs at each of the welding power supply 302*a*, 302*b* (e.g., to enable ease of replacement of the weld cable 2826 in case of wear or damage). Furthermore, in some examples, welding data is provided with the weld cable 2826 such that welding power and weld data are provided and transmitted together over the weld cable 2826. The communications transceiver 2818 is communicatively coupled to the weld cable 2826 to communicate (e.g., send/receive) data over the weld cable 2826. The communications transceiver 2818 may be implemented based on various types of power line communications methods and techniques. For example, the communications transceiver 2818 may utilize IEEE standard P1901.2 to provide data communications over the weld cable 2826. In this manner, the weld cable 2826 may be utilized to provide welding power from the welding power supply 302*a*, 302*b* to the wire feeder and the welding torch 108. Additionally or alternatively, the weld cable 2826 may be used to transmit and/or receive data communications to/from the wire feeder and the welding torch 108. The communications transceiver 2818 is communicatively coupled to the weld cable 2826, for example, via cable data couplers 2827, to characterize the weld cable 2826, as described in more detail below. The cable data coupler 2827 may be, for example, a voltage or current sensor.

In some examples, the power supply 302*a*, 302*b* includes or is implemented in a wire feeder.

The example communications transceiver 2818 includes a receiver circuit 2821 and a transmitter circuit 2822. Generally, the receiver circuit 2821 receives data transmitted by the wire feeder via the weld cable 2826 and the transmitter circuit 2822 transmits data to the wire feeder via the weld cable 2826. As described in more detail below, the communications transceiver 2818 enables remote configuration of the power supply 302*a*, 302*b* from the location of the wire feeder and/or compensation of weld voltages by the power supply 302*a*, 302*b* using weld voltage feedback information transmitted by the wire feeder 104. In some examples, the receiver circuit 2821 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 302*a*, 302*b* (e.g., the wire feeder) while the weld current is flowing through the weld circuit Example implementations of the communications transceiver 2818 are described in U.S. Pat. No. 9,012,807. The entirety of U.S. Pat. No. 9,012,807 is incorporated herein by reference. However, other implementations of the communications transceiver 2818 may be used.

The example wire feeder 104 also includes a communications transceiver 2819, which may be similar or identical in construction and/or function as the communications transceiver 2818.

In some examples, a gas supply 2828 provides shielding gases, such as argon, helium, carbon dioxide, and so forth, depending upon the welding application. The shielding gas flows to a valve 2830, which controls the flow of gas, and if desired, may be selected to allow for modulating or regulating the amount of gas supplied to a welding application. The valve 2830 may be opened, closed, or otherwise operated by the controller 2812 to enable, inhibit, or control gas flow (e.g., shielding gas) through the valve 2830. Shielding gas exits the valve 2830 and flows through a cable 2832 (which in some implementations may be packaged with the welding power output) to the wire feeder which provides the shielding gas to the welding application. In some examples, the welding system 302*a*, 302*b* does not include the gas supply 2828, the valve 2830, and/or the cable 2832.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A consumable wire-fed welding system, comprising:
   a welding power source configured to provide welding current to a welding circuit, the welding circuit comprising a welding wire and a first contact point of a welding torch; and
   an electrode preheating circuit configured to supply preheating current through a plurality of sections in the welding wire to create a plurality of preheated regions in the welding wire that are spaced apart, wherein the plurality of preheated sections in the welding wire are separated by colder sections in the welding wire.

2. The consumable wire-fed welding system as defined in claim 1, wherein the welding power source is configured to provide the welding current using a controlled waveform.

3. The consumable wire-fed welding system as defined in claim 1, wherein the plurality of preheated regions in the welding wire are spaced by cooler regions in the welding wire.

4. The consumable electrode-fed wire-fed welding system as defined in claim 3, wherein the electrode preheating circuit and the welding power source are configured to cause the preheated regions in the welding wire to melt prior to a cooler region in the welding wire that is closer to an arc formed by the welding current than the melted preheated region.

5. The consumable wire-fed welding system as defined in claim 1, wherein the electrode preheating circuit is configured to create the plurality of preheated regions in the welding wire by generating increased current intervals and applying the increased current to the welding wire.

6. The consumable wire-fed welding system as defined in claim 5, wherein the electrode preheating circuit comprises a capacitor bank configured to generate the increased current intervals by discharging the capacitor bank.

7. The consumable wire-fed welding system as defined in claim 5, wherein the electrode preheating circuit is configured to generate the increased current intervals to be at least 500 Amperes.

8. The consumable wire-fed welding system as defined in claim 5, wherein the electrode preheating circuit is configured to conduct the increased current intervals through the welding wire via the first contact point and a workpiece.

9. The consumable wire-fed welding system as defined in claim 5, further comprising a wire feeder configured to feed the welding wire to the welding torch, wherein the wire feeder is configured to feed the welding wire at a first feed rate during the increased current intervals to the welding wire and to feed the welding wire at a second feed rate at times other than the increased current intervals.

10. The consumable wire-fed welding system as defined in claim 5, wherein the electrode preheating circuit is configured to generate the increased current intervals as at least one of a current spike or a current pulse.

11. The consumable wire-fed welding system as defined in claim 1, wherein the electrode preheating circuit is configured to supply the preheating current to the welding wire via the first contact point and a second contact point of the welding torch.

12. The consumable wire-fed welding system as defined in claim 11, wherein the first contact point is positioned closer to an arc end of the welding wire than the second contact point.

13. The consumable wire-fed welding system as defined in claim 11, wherein the first contact point comprises a first contact tip and the second contact point comprises a second contact tip.

14. The consumable electrode-fed wire-fed welding system as defined in claim 1, further comprising a wire feeder configured to feed the welding wire to the welding torch, wherein the wire feeder is configured to feed the welding wire at a constant feed rate.

15. The consumable wire-fed welding system as defined in claim 1, where the welding system is configured to perform at least one of a gas metal arc welding process or a submerged arc welding process.

16. The consumable electrode-fed wire-fed welding system as defined in claim 1, wherein the electrode preheating circuit is configured to control the preheating current based on a melting temperature of the welding wire.

17. The consumable wire-fed welding system as defined in claim 1, further comprising a stickout sense circuit to determine a stickout distance of the welding wire, the electrode preheating circuit to control the preheating current through the plurality of sections in the welding wire based on the stickout distance.

18. The consumable wire-fed welding system as defined in claim 17, wherein the stickout sense circuit comprises a welding current sensor to measure the welding current, the stickout sense circuit to determine the stickout distance based on the measurement of the welding current.

19. The consumable wire-fed welding system as defined in claim 1, wherein the welding power supply is configured to control a welding parameter associated with the welding current based on the preheating current.

20. The consumable wire-fed welding system as defined in claim 1, wherein the electrode preheating circuit is configured to control a preheating parameter associated with the preheating current based on the welding current.

21. The consumable wire-fed welding system as defined in claim 1, wherein the electrode preheating circuit is configured to supply the preheating current to the welding wire via a second contact point of the welding torch and a third contact point of the welding torch.

* * * * *